(12) United States Patent
Miyasaka et al.

(10) Patent No.: US 7,860,663 B2
(45) Date of Patent: Dec. 28, 2010

(54) ABNORMALITY DIAGNOSING APPARATUS AND ABNORMALITY DIAGNOSING METHOD

(75) Inventors: Takanori Miyasaka, Fujisawa (JP); Yasushi Mutoh, Fujisawa (JP); Juntaro Sahara, Fujisawa (JP)

(73) Assignee: NSK Ltd., Tokyo (JP)

( * ) Notice: Subject to any disclaimer, the term of this patent is extended or adjusted under 35 U.S.C. 154(b) by 1194 days.

(21) Appl. No.: 10/586,996

(22) PCT Filed: Sep. 13, 2005

(86) PCT No.: PCT/JP2005/016845
§ 371 (c)(1),
(2), (4) Date: Jul. 21, 2006

(87) PCT Pub. No.: WO2006/030786
PCT Pub. Date: Mar. 23, 2006

(65) Prior Publication Data
US 2008/0234964 A1    Sep. 25, 2008

(30) Foreign Application Priority Data

| Sep. 13, 2004 | (JP) | 2004-265009 |
|---|---|---|
| Sep. 13, 2004 | (JP) | 2004-265219 |
| Jan. 11, 2005 | (JP) | 2005-004128 |
| Jan. 26, 2005 | (JP) | 2005-018338 |
| Jan. 26, 2005 | (JP) | 2005-018339 |
| Jan. 26, 2005 | (JP) | 2005-018340 |
| Jun. 8, 2005 | (JP) | 2005-168204 |
| Jun. 16, 2005 | (JP) | 2005-176505 |
| Jun. 16, 2005 | (JP) | 2005-176507 |

(51) Int. Cl.
*G06F 11/30* (2006.01)

(52) U.S. Cl. .............. 702/35; 702/33; 702/66; 702/113; 702/183; 702/185; 73/593; 73/659; 73/660

(58) Field of Classification Search ............. 702/33–35, 702/113, 183, 185, 66; 318/806; 73/593, 73/650–660
See application file for complete search history.

(56) References Cited

U.S. PATENT DOCUMENTS

| 5,433,111 A | 7/1995 | Hershey et al. |
| 6,199,018 B1 * | 3/2001 | Quist et al. ............. 702/34 |

FOREIGN PATENT DOCUMENTS

EP    1 338 873 A1    8/2003

(Continued)

OTHER PUBLICATIONS

Japanese Office Action issued May 18, 2010 in Japanese application No. 2004-265009.

(Continued)

*Primary Examiner*—Drew A Dunn
*Assistant Examiner*—Hien X Vo
(74) *Attorney, Agent, or Firm*—Sughrue Mion, PLLC

(57) ABSTRACT

A abnormality diagnosing apparatus used in a machine equipment including a rotating or sliding part relative to a stationary member includes a detecting portion 31 fixed to the rotating or sliding part or the stationary member and including a vibration sensor 32 and a temperature sensor 33, and a signal processing portion 81 for determining a state of the part from a detecting signal outputted by the detecting portion 31. The signal processing portion 81 determines presence or absence of a abnormality, or presence or absence of the abnormality and a degree of a damage of the part based on a combination of a measured result by the vibration sensor 32 and a measured result by the temperature sensor 33.

5 Claims, 32 Drawing Sheets

FOREIGN PATENT DOCUMENTS

| | | | |
|---|---|---|---|
| EP | 1 548 419 A1 | 6/2005 |
| JP | 55-023432 A | 2/1980 |
| JP | 61-038426 A | 2/1986 |
| JP | 62-270820 A | 11/1987 |
| JP | 01-221633 A | 9/1989 |
| JP | 01-232230 A | 9/1989 |
| JP | 4-148839 A | 5/1992 |
| JP | 9-500452T | 1/1997 |
| JP | 9-79915 A | 3/1997 |
| JP | 9-113416 A | 5/1997 |
| JP | 10-274558 A | 10/1998 |
| JP | 11-125244 A | 5/1999 |
| JP | 2001-159586 A | 6/2001 |
| JP | 2002-22617 A | 1/2002 |
| JP | 2002-131187 A | 5/2002 |
| JP | 2003-202276 A | 7/2003 |
| JP | 2003-535755T A | 12/2003 |
| JP | 2004-93256 A | 3/2004 |
| JP | 2004-150974 A | 5/2004 |
| JP | 2004-170318 A | 6/2004 |
| JP | 2004-177359 A | 6/2004 |
| JP | 2004-184400 A | 7/2004 |
| JP | 2004-211813 A | 7/2004 |
| JP | 2004-233284 A | 8/2004 |
| JP | 2004-257836 A | 9/2004 |
| WO | WO 01/94175 A | 12/2001 |

OTHER PUBLICATIONS

Japanese Office Action issued May 12, 2010 in Japanese application No. 2005-176505.

Japanese Office Action issued May 18, 2010 in Japanese application No. 2005-004128.

Japanese Office Action issued May 18, 2010 in Japanese application No. 2005-176507.

Japanese Office Action issued May 18, 2010 in Japanese application No. 2005-168204.

* cited by examiner

FIG. 5

| PORTION OF BEARING (Sx) | FREQUENCY CORRESPONDING TO THE PORTION |
|---|---|
| INNER RING (Si) | $Zf_i = \dfrac{fr}{2}\left(1 + \dfrac{Da}{dm}\cdot\cos\alpha\right)Z$ |
| OUTER RING (So) | $Zf_c = \dfrac{fr}{2}\left(1 - \dfrac{Da}{dm}\cdot\cos\alpha\right)Z$ |
| ROLLING ELEMENT (Sb) | $2f_b = fr\left(1 - \dfrac{Da^2}{dm^2}\cdot\cos^2\alpha\right)\dfrac{dm}{Da}$ |
| RETAINER (Sc) | $f_c = \dfrac{fr}{2}\left(1 - \dfrac{Da\cdot\cos\alpha}{dm}\right)$ | fr : INNER (OUTER) RING ROTATIONAL SPEED [Hz]
fc : RETAINER ROTATIONAL SPEED [Hz]
fb : ROLLING MEMBER ROTATING SPEED [Hz]
dm : ROLLING ELEMENT PITCH CIRCLE DIAMETER [mm]
Z : NUMBER OF ROLLING ELEMENT
fi : fr−fc
Da : ROLLING MEMBER DIAMETER [mm]
$\alpha$ : CONTACT ANGLE [rad]

MESH FREQUENCY COMPONENT : $Sg = Z_1 \times \dfrac{N_1}{60}$ or $Sg = Z_2 \times \dfrac{N_2}{60}$ $N_1$: ROTATIONAL SPEED OF LARGE GEAR (min$^{-1}$)
$N_2$: ROTATIONAL SPEED OF SMALL GEAR (min$^{-1}$)
$Z_1$: TEETH NUMBER OF LARGE GEAR
$Z_2$: TEETH NUMBER OF SMALL GEAR

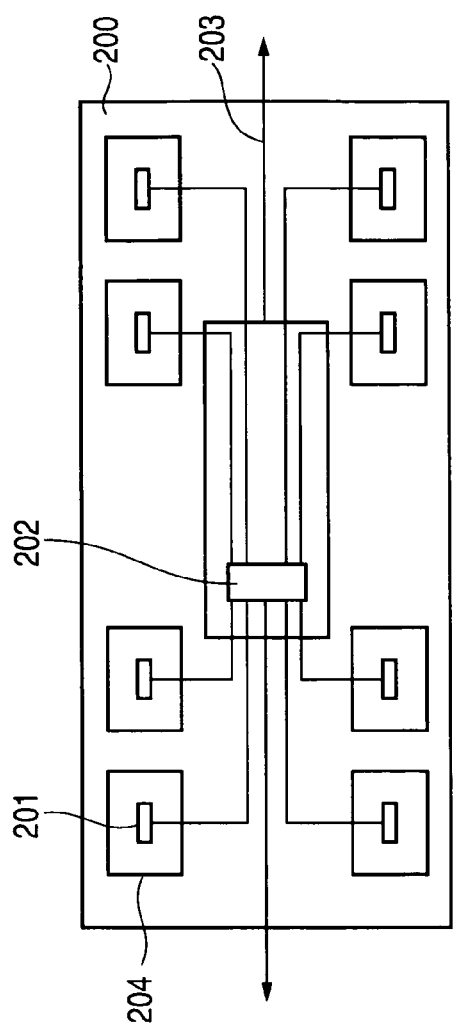
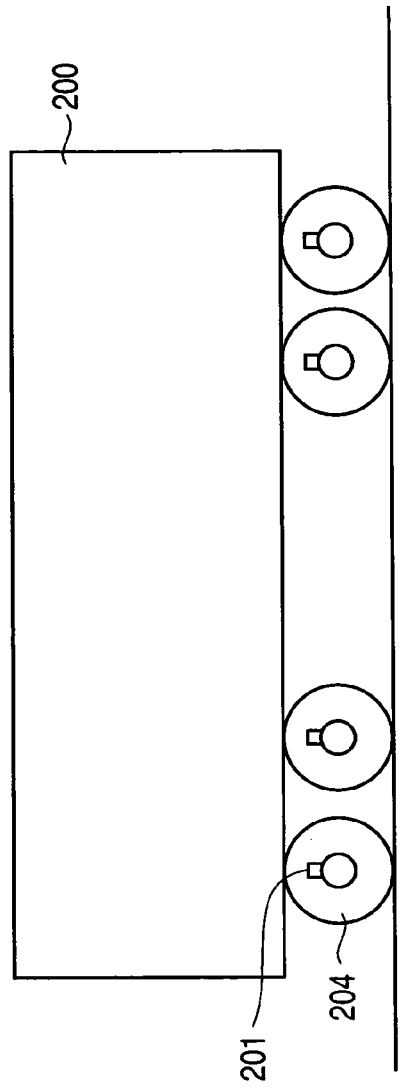
FIG. 20 (a)
FIG. 20 (b)

t, sec t, sec

SHOCK WAVES ARE GENERATED BY THREE TIMES IN ONE SECOND

ABNORMALITY DIAGNOSING APPARATUS AND ABNORMALITY DIAGNOSING METHOD

TECHNICAL FIELD

The present invention relates to a abnormality diagnosing apparatus and a abnormality diagnosing method of a rotating or a sliding part used in a machine equipment of, for example, an axle or a gear box of a railway vehicle or a reduction gear of a power generating windmill. Particularly, the present invention relates to a abnormality diagnosing apparatus and a abnormality diagnosing method of specifying presence or absence of the abnormality or a premonitory sign of the abnormality of the part, or a failed portion thereof.

BACKGROUND ART

Conventionally, in a rotating part of a railway vehicle, a power generating windmill or the like, after having been used for a constant period of time, presence or absence of a abnormality of damage, wear or the like is periodically inspected with regard to a bearing or other rotating part. The periodic inspection is carried out by disassembling a machine equipment integrated with the rotating part, and damage or wear brought about at the rotating part is discovered by inspection by optical observation of the person in charge. Further, as a main defect discovered by the inspection, in the case of a bearing, there is a indentation produced by biting a foreign matter, and flaking by rolling fatigue, other wear or the like, in the case of a gear, there is fracture, wear or the like of a teeth portion, in the case of a wheel, there is wear of flat or the like, and in any of the cases, when roughness, wear or the like which is not present in a new product is discovered, then the product is interchanged by the new product.

However, in the method of disassembling a total of the machine equipment and inspecting by the person in charge by optical observation, enormous labor is required in a disassembling operation of removing a rotating part or a sliding part from an apparatus, or an operation of re-assembling the rotating part or the sliding part as inspected again to the apparatus to pose an undesirability of bringing about a significant increase in maintenance cost of the apparatus.

Further, in re-assembling the apparatus, there is a possibility that the inspection per se causes to bring about a defect of the rotating part or the sliding part such that a dent which has not been present before inspection is produced in the rotating part or the sliding part or the like. Further, when a number of bearings are inspected by optical observation in a limited period of time, there also poses a subject that a possibility of overlooking the defect remains. Further, there is an individual difference in determining a degree of the defect, even when the defect is not substantially present, the part is interchanged and therefore, wasteful cost is taken.

Hence, there have been proposed various methods of diagnosing a abnormality of a rotating part in an actually operating state without disassembling a machine equipment integrated with the rotating part (refer to, for example, Patent References 1 through 7). As the most general method, as described in Patent Reference 1, there is known a method of carrying out a diagnosis by installing an acceleration meter at a bearing portion, measuring acceleration of vibration of the bearing portion, and sampling a signal of a vibration generating frequency component by processing the signal by FFT (fast Fourier transformation).

According to the apparatus described in Patent Reference 2, in a railway vehicle, a abnormality of a bearing is monitored by mounting a temperature sensor at a bearing box thereof and outputting an abnormality signal to a driver's cab when a detecting temperature rises to a reference value or a higher, or measuring a temperature from a ground side. Further, according to the apparatus described in Patent Reference 3, in a general machine equipment, a condition of a bearing is always monitored by a vibration or temperature sensor, when respective measured values rise to reference values or higher, a abnormality alarm is outputted, or operation of the apparatus is stopped.

Further, there have variously been proposed a method of detecting a flat portion referred to as flat wheel, which is produced at a rolling face of a wheel of a railway vehicle by friction of wear with a rail by locking or sliding the wheel by erroneous operation of a brake or the like (refer to, for example, Patent References 8 through 12). Patent Reference 8 proposes an apparatus of detecting a defect state of a railway/vehicle wheel and a rail track on which a train passes by a vibration sensor, a rotation measuring apparatus or the like.

Patent Reference 1: Japanese Patent Unexamined Publication No. JP-A-2002-22617

Patent Reference 2: Japanese Patent Unexamined Publication No. JP-A-9-79915

Patent Reference 3: Japanese Patent Unexamined Publication No. JP-A-11-125244

Patent Reference 4: Japanese Patent Unexamined Publication No. JP-A-2003-202276

Patent Reference 5: European Patent Unexamined Publication No. 1338873 specification (European Patent Application Publication corresponding to Patent Reference 4)

Patent Reference 6: Japanese Patent Unexamined Publication No. JP-A-2004-257836

Patent Reference 7: European Patent Application Publication No. 1548419 specification (European Patent Application Publication corresponding to Patent Reference 6)

Patent Reference 8: Japanese Patent Unexamined Publication No. JP-T-9-500452

Patent Reference 9: U.S. Pat. Examined Publication No. 5,433,111 (U.S. Patent Publication corresponding to Patent Reference 8)

Patent Reference 10: Japanese Patent Unexamined Publication No. JP-A-4-148839

Patent Reference 11: Japanese Patent Unexamined Publication No. JP-T-2003-535755

Patent Reference 12: PCT Patent Publication No. WO01/94175 pamphlet (International Patent Application Publication corresponding to Patent Reference 11)

DISCLOSURE OF THE INVENTION

Subjects that the Invention is to Solve

Meanwhile, according to the apparatus described in Patent Reference 3, only either one sensor of a temperature sensor and a vibration sensor is installed and therefore, there poses a subject that when a abnormality is detected, a degree of damage of a rotating part has frequently become terrible and the rotating part cannot be used continuously, and a machine equipment needs to be stopped urgently. The subject is similarly posed also to the apparatus described in Patent Reference 2 in which presence or absence of a abnormality is determined by whether the temperature of the bearing rises to the reference value or higher.

Specifically, according to the apparatus described in Patent Reference 3, presence or absence of a abnormality of a rotating part is determined based on a signal by either one sensor of the temperature sensor and the vibration sensor. Therefore, for example, in the case of seizure of a bearing, it is difficult to catch the abnormality before the bearing is overheated by bringing about a temperature rise. Further, there poses a subject that a stable operation is prevented such that an erroneous operation is brought about by an influence of abrupt disturbance noise or the like to output a abnormality alarm. In addition thereto, according to the apparatus, there poses a subject that even when the abnormality alarm is outputted and operation of the machine equipment is stopped, an abnormal portion cannot be specified.

Further, according to the apparatus described in Patent Reference 3, the apparatus integrated with the rotating part is mounted with rotation driving means of a motor or the like for transmitting a rotation drive force to the rotating part. Therefore, there poses a subject that the stable operation is prevented such that in driving a motor, electric noise of electromagnetic sound or the like is abruptly produced, an SN ratio (signal to noise ratio) with regard to abnormality diagnosis is deteriorated, and the abnormality alarm is outputted by erroneous diagnosis.

An apparatus integrated with a rotating part is frequently used in a wide zone of a rotational speed, that is, the rotating part is used at from low speed to high speed. For example, in a bearing for an axle of a railway vehicle, the bearing is inspected periodically intervals by low speed rotation in a wheel set test or the like. In this case, a rigidity of a housing integrated with a bearing is high and therefore, for example, even when a raceway surface of the bearing is damaged, an impact force by passing a rolling element of a roller or the like on the damage is small and there is a possibility of overlooking the damage of the bearing. On the other hand, in the case of high speed, sound or vibration or the like from rotation driving means becomes large and therefore, an SN ratio with regard to abnormal diagnosis is deteriorated, and there is a possibility of overlooking the damage of the bearing similarly in the case of low speed.

Further, even in the method of diagnosing abnormality described in Patent Reference 1, depending of a way of setting a determination reference value, diagnosis accuracy is deteriorated by an influence of noise or the like and there poses a subject of preventing a stable operation such that the abnormality alarm is outputted by erroneous diagnosis.

Further, although according to the abnormality diagnosing method described in Patent Reference 1, the vibration generating frequency component is calculated based on the rotational speed, in a case in which an actual rotational speed cannot directly be inputted, when rotational speed data used in the calculation is shifted from the actual rotational speed, there poses a subject that the diagnosis accuracy is deteriorated.

Further, in a machine equipment using a number of bearings as rotating parts, when inner and outside diameters, width dimensions of the bearings are the same among each rotating parts, even though various other elements of design dimensions at insides thereof differ, the bearings may be used together. In this case, when the various other elements of design dimensions of the bearings differ, also set values, which are used in abnormality diagnosis, differ, thus the diagnosis becomes complicated. Therefore, there is a case of integrating parts having the same various elements of design dimensions at specified portions to pose a subject that an operational efficiency in assembling is deteriorated.

Further, according to the above-described abnormality diagnosing method, a large amount of a diagnosis result is accumulated, and forming a report based on the large amount of diagnosis result constitutes an excessive workload.

Further, according to an apparatus of detecting a defect state described in Patent Reference 8, there poses a subject that it cannot be identified that a defect indicating an abnormal vibration in a railway vehicle is derived from a wheel, an axle bearing, or a railway or other abnormality.

The invention has been carried out in view of the above-described situation and it is an object thereof to provide a abnormality diagnosing apparatus and a abnormality diagnosing method of diagnosing a abnormality of a rotating or a sliding part while ensuring a diagnosis accuracy in an actually operating state without disassembling a machine equipment integrated with the rotating or sliding part.

Particularly, it is a first object of the invention to provide a abnormality diagnosing apparatus capable of simultaneously diagnosing presence or absence of a part and a degree of damage thereof in an actual operating state without disassembling a machine equipment comprising a rotating or a sliding part and capable of carrying out abnormality diagnosis having high SN ratio and high reliability by preventing erroneous diagnosis by an influence of an abrupt noise or the like.

It is a second object of the invention to provide a abnormality diagnosing apparatus and a abnormality diagnosing method capable of specifying presence or absence of a abnormality and an abnormal portion while ensuring a diagnosis accuracy even when an actual rotational speed cannot directly be inputted.

It is a third object of the invention to provide a abnormality diagnosing apparatus capable of specifying presence or absence of abnormality or an abnormal portion even when a plurality of rotating parts, which have various elements of design dimensions different from each other, are integrated to arbitrary portions.

It is a fourth object of the invention to provide a abnormality diagnosing apparatus and a abnormality diagnosing method capable of lightening a work load of forming a report of a diagnosis result.

It is a fifth object of the invention to provide a abnormality diagnosing apparatus and a abnormality diagnosing method capable of accurately detecting a state of bringing about a abnormality of part such as flat of a wheel of a railway vehicle or the like, and also specifying the wheel.

Means for Solving the Subjects

The object of the invention is achieved by constitutions described below.

(1) An abnormality diagnosing apparatus used in a machine equipment including a rotating or sliding part relative to a stationary member, the abnormality diagnosing apparatus comprising:

a detecting portion fixed to the rotating or sliding part or the stationary member and including at least one vibration system sensor of a vibration sensor, a sound sensor, an ultrasonic sensor and an AE sensor; and a temperature sensor; and a signal processing portion for determining a state of the part from a detecting signal outputted by the detecting portion;

wherein the signal processing portion determines presence or absence of a abnormality of the part, or presence or absence of the abnormality of the part and a degree of a damage based on a combination of a measured result by the vibration system sensor and a measured result by the temperature sensor.

(2) The abnormality diagnosing apparatus according to (1), wherein measured values by the vibration system sensor and the temperature sensor or rates of changes of the measured values per time are calculated at least by once;

wherein the signal processing portion includes a abnormality determining portion for determining presence or absence of the abnormality, or presence or absence of the abnormality determining portion and the degree of the damage by comparing the measured values or the rates of the changes with predetermined values.

(3) A abnormality diagnosing apparatus used in a machine equipment including a rotating or sliding part relative to a stationary member, the abnormality diagnosing apparatus comprising:
a driving unit for driving the rotating or sliding part;
a detecting portion fixed to the part or the stationary member and including at least one of at least one vibration system sensor of a vibration sensor, a sound sensor, an ultrasonic sensor and an AE sensor; and a temperature sensor; and
a signal processing portion for determining a state of the part from a detecting signal outputted by the detecting portion;
wherein the signal processing portion diagnoses a abnormality of the part based on the detecting signal of a vibration or a temperature by the detecting portion when the part is moved by inertia within a predetermined speed zone when a power of the driving unit is turned off.

(4) A abnormality diagnosing apparatus used in a machine equipment including a rotating part relative to a stationary member, the abnormality diagnosing apparatus comprising:
a driving unit for driving to rotate the part;
a detecting portion fixed to the part or the stationary member and including at least one of:
at least one of vibration system sensor of a vibration sensor, a sound sensor, an ultrasonic sensor and an AE sensor; and
a temperature sensor; and
a signal processing portion for determining a state of the part from a detecting signal outputted by the detecting portion;
wherein the signal processing portion diagnosis a abnormality of the part based on the detecting signal of a vibration or a temperature by the detecting portion when the part is rotated within a rotational speed zone 100 min$^{-1}$ or faster and 1500 min$^{-1}$ or slower.

(5) The abnormality diagnosing apparatus according to (4), wherein the signal processing portion diagnoses the abnormality of the part based on the detecting signal of the vibration or the temperature by the detecting portion when the part is rotated by inertia within the rotational speed zone without turning off a power of the driving unit.

(6) The abnormality diagnosing apparatus according to (3) or (5), wherein the driving unit is used by repeatedly turning on and off the power of driving unit, and the part is movable by inertia without turning on the power of the driving unit.

(7) The abnormality diagnosing apparatus according to any one of (3), (5) and (6), wherein a state of moving the part by inertia without turning on the power of driving unit is detected based on an OFF signal of the driving unit.

(8) The abnormality diagnosing apparatus according to any one of (3) through (7), further comprising:
a rotational speed sensor for detecting a rotational speed of the driving unit,
wherein the abnormality of the part is diagnosed in cooperation with a detecting signal of the rotational speed by the rotational speed sensor and the detecting signal of the vibration or the temperature by the detecting portion.

(9) The abnormality diagnosing apparatus according to any one of (1) through (8), wherein the signal processing portion includes:

a comparing and checking portion for comparing a frequency component owing to damage of the part calculated based on the rotational speed signal and a frequency component of measured data based on the signal detected by the vibration system sensor; and
a abnormality determining portion for determining presence or absence of the abnormality of the part and specifying a damaged portion.

(10) The abnormality diagnosing apparatus according to (9), wherein the signal processing portion includes:
a filter processing portion for removing an unnecessary frequency band from a signal waveform detected by the vibration system sensor;
an envelope processing portion for detecting an absolute value of the waveform which after being subjected to a filter processing transmitted from the filter processing portion; and
a frequency analyzing portion for analyzing a frequency of the waveform transmitted from the envelope processing portion.

(11) A abnormality diagnosing apparatus used in a machine equipment including at least one rotating or sliding part, the abnormality diagnosing apparatus comprising:
at least one detecting portion for outputting a signal generated from the machine equipment as an electric signal; and
a signal processing portion for:
analyzing a frequency of a waveform of the electric signal;
sampling a peak of a spectrum larger than a reference value calculated based on the spectrum provided by analyzing the frequency;
comparing and checking a frequency between the peaks and a frequency component owing to a damage of the part calculated based on a rotational speed signal or a moving speed signal; and
determining presence or absence of a abnormality of the part and an abnormal portion based on a result of the checking.

(12) The abnormality diagnosing apparatus according to (11), wherein the signal processing portion subjects the detected signal to at least one of an amplifying processing and a filter processing and the signal processing portion subjects thus processed waveform to an envelope processing.

(13) A abnormality diagnosing apparatus used in a machine equipment including at least one rotating or sliding part, the abnormality diagnosing apparatus comprising:
at least one detecting portion for outputting a signal generated from the machine equipment as an electric signal; and
a signal processing portion for determining presence or absence of a abnormality and an abnormal portion of the part based on a frequency of a shockwave in which a waveform of the electric signal per unit time exceeds a threshold, and a rotational speed signal or a moving speed signal.

(14) The abnormality diagnosing apparatus according to (13), wherein the signal processing portion subjects the waveform of the electric signal to a filter processing and converts the waveform to an all time rectified waveform,
whenever the waveform exceeding the threshold, the signal processing portion makes a waveform which is converted so as to hold the waveform at a value exceeding the threshold for a predetermined period of time according to the rotational speed signal, and
the processing portion informs a possibility of bringing about the abnormality in the part according to a number of times in which the waveform exceeds the threshold per a predetermined rotational number.

(15) The abnormality diagnosing apparatus according to (14), wherein the signal processing portion determines true or false of the possibility of bringing about the abnormality in the part according to the number of times in which the waveform converted to hold the threshold exceeds the threshold per the predetermined rotational number by a plurality of times of statistical determinations.
(16) The abnormality diagnosing apparatus according to any one of (11) through (15), wherein the signal processing portion is executed when a rotational speed of the part is substantially constant.
(17) A abnormality diagnosing apparatus used in a machine equipment including at least one rotating or sliding part, the abnormality diagnosing apparatus comprising:
at least one detecting portion for outputting a signal generated from the machine equipment as an electric signal; and
a signal processing portion for:
analyzing a frequency of a waveform of the electric signal,
comparing and checking a frequency component of a measured spectrum data provided by analyzing the frequency and a frequency component owing to the part with a variable allowable width; and
determining presence or absence of a abnormality and an abnormal portion of the part based on a result of the checking.
(18) A abnormality diagnosing apparatus used in a machine equipment including a rotating part, the abnormality diagnosing apparatus comprising:
at least one detecting portion for outputting a signal generated from the machine equipment as an electric signal; and
a signal processing portion for:
analyzing a frequency of a waveform of the electric signal,
comparing and checking a frequency component of a measured spectrum data provided by analyzing the frequency and a frequency component owing to the rotating part with an allowable width; and
determining presence or absence of a abnormality and an abnormal portion of the rotating part based on a result of the checking;
wherein a zone having an upper limit and lower limit, both of which are calculated from the rotational speed of the rotating part and dimensional specification of the rotating part, is divided into at least one zone, a central value in the divided zone is calculated, and the allowable width is set as at least a zone having an arbitrary size which is given with respect to the central value, and
wherein the signal processing portion compares and checks the frequency component of the measured spectrum data and the frequency component owing to the rotating part at least at each of the allowable width.
(19) The abnormality diagnosing apparatus according to (18), wherein the allowable width is given to at least one of a case where the rotating part includes a plurality of rotating parts having different dimensional specification design from each other; and a case where the rotational speed of the rotating part is varied.
(20) The abnormality diagnosing apparatus according to any one of (17) through (19), wherein the allowable width is increased as the frequency component becoming a high frequency component.
(21) The abnormality diagnosing apparatus according to any one of (17) through (20), wherein the allowable width is increased or decreased in accordance with a frequency band of the frequency component.
(22) The abnormality diagnosing apparatus according to (17) or (18), wherein the allowable width is increased or decreased in accordance with the rotational speed.
(23) A abnormality diagnosing apparatus used in a machine equipment having at least one rotating or sliding part, the abnormality diagnosing apparatus comprising:
at least one detecting portion for outputting a signal generated from the machine equipment as an electric signal; and
a signal processing portion for:
analyzing a frequency of a waveform of the electric signal;
comparing and checking a frequency component of a measured spectrum data provided by analyzing the frequency and a frequency component owing to the part; and
determining presence or absence of a abnormality and an abnormal portion of the part based on a result of the checking;
wherein a reference value used for the comparing and checking is calculated based on a limited frequency range of the measured spectrum data.
(24) A abnormality diagnosing apparatus used in a machine equipment including at least one rotating or sliding part, the abnormality diagnosing apparatus comprising:
at least one detecting portion for outputting a signal generated from the machine equipment as an electric signal;
a signal processing portion for analyzing a frequency of a waveform of the electric signal; comparing and checking a frequency component of a measured spectrum data provided by analyzing the frequency and a frequency component owing to the part; and determining presence or absence of a abnormality and an abnormal portion of the part based on a result of the checking;
a storing portion for storing a result of a diagnosis diagnosed by the signal processing portion;
an outputting portion for outputting the result of the diagnosis in a predetermined style; and
a report forming portion for forming a report from an outputted result outputted by the outputting portion based on at least one program.
(25) The abnormality diagnosing apparatus according to any one of (11) through (24), wherein the detecting portion includes an integrated type sensor, in which at least one of the temperature sensor for detecting the temperature of the machine equipment and a rotational speed sensor for detecting the rotational speed of the rotating part, is installed in a single case in addition to a sensor for detecting a vibration generated from the machine equipment.
(26) The abnormality diagnosing apparatus according to (25), wherein the machine equipment includes a bearing constituting the rotating part and a bearing box for fixing the bearing;
wherein the integrated type sensor is fixed to a flat portion of the bearing box.
(27) The abnormality diagnosing apparatus according to any one of (1) through (26), further comprising data transmitting unit which transmits a result of a determination by the signal processing portion.
(28) The abnormality diagnosing apparatus according to any one of (1) through (27), further comprising a microcomputer which carries out a processing by the signal processing portion, and a processing of outputting the result of the determination to a control system.
(29) The abnormality diagnosing apparatus according to any one of (1) through (28), wherein the machine equipment is a bearing unit for a railway vehicle.
(30) The abnormality diagnosing apparatus according to any one of (1) through (28), wherein the machine equipment is a bearing unit for a windmill.
(31) The abnormality diagnosing apparatus according to any one of (1) through (28), wherein the machine equipment is a bearing unit for a spindle of a machine tool.

(32) A abnormality diagnosing method used in a machine equipment including at least one rotating or sliding part, the abnormality diagnosing method comprising the steps of:

detecting a signal generated from the machine equipment and outputting the signal as an electric signal;

analyzing a frequency of a waveform of the detected signal;

a step of sampling a peak of a spectrum larger than a reference value calculated based on the spectrum provided by the analyzing step, and comparing and checking a frequency between the peaks and a frequency component owing to a damage of the part calculated based on a rotational speed signal or a moving speed signal; and determining presence or absence of a abnormality and an abnormal portion of the part based on a result of checking at the comparing step.

(33) A abnormality diagnosing method used in a machine equipment including at least one rotating or sliding part, the abnormality diagnosing method comprising the steps of:

detecting a signal generated from the machine equipment and outputting the signal as an electric signal; and detecting presence or absence of a abnormality of the part based on a frequency of a shockwave in which a waveform per a unit time period of the electric signal exceeds a threshold, and a rotational speed signal or a moving speed signal.

(34) A abnormality diagnosing method used in a machine equipment including at least one rotating or sliding part, the abnormality diagnosing method comprising the steps of:

detecting a signal generated from the machine equipment and outputting the signal as an electric signal;

analyzing a frequency of a waveform of the detected signal;

comparing and checking a frequency component of a measured spectrum data provided at the analyzing step and a frequency component owing to the part with a variable allowable width; and determining presence or absence of a abnormality and an abnormal portion of the part based on a result of the checking at the comparing step.

(35) A abnormality diagnosing method used in a machine equipment including a rotating part, the abnormality diagnosing method comprising the steps of:

detecting a signal generated from the machine equipment and outputting the signal as an electric signal;

analyzing a frequency of a waveform of the detected signal;

setting at least one allowable width such that: a zone having an upper limit and lower limit, both of which are calculated from the rotational speed of the rotating part and dimensional specification design of the rotating part, is divided into at least one zone, a central value in the divided zone is calculated, and the allowable width is set as at least a zone having an arbitrary size which is given with respect to the central value comparing and checking a frequency component of a measured spectrum data provided by analyzing the frequency and a frequency component owing to the rotating part at each of at least one of the allowable width; and determining presence or absence of a abnormality and an abnormal portion of the rotating part based on a result of the checking at the comparing step.

(36) A abnormality diagnosing method used in a machine equipment including at least one rotating or sliding part, the abnormality diagnosing method comprising the steps of:

detecting a signal generated from the machine equipment and outputting the signal as an electric signal;

analyzing a frequency of a waveform of the detected signal;

comparing and checking a frequency component of a measured spectrum data provided at the analyzing step and a frequency component owing to the part; and determining presence or absence of a abnormality and an abnormal portion of the part based on a result of the checking at the comparing step;

wherein a reference value used in the comparing and checking is calculated based on a limited frequency range of the measured spectrum data.

(37) A abnormality diagnosing method used in a machine equipment including at least one rotating or sliding part, the abnormality diagnosing method comprising the steps of:

detecting a signal generated from the machine equipment and outputting the signal as an electric signal;

analyzing a frequency of a waveform of the detected signal;

comparing and checking a frequency component of a measured spectrum data provided at the analyzing step and a frequency component owing to the part;

determining presence or absence of a abnormality and an abnormal portion of the part based on a result of the checking at the comparing step;

storing a result of a diagnosis provided by at least by one of the analyzing, comparing and determining steps;

outputting the result of the diagnosis in a predetermined style; and forming a report from a result of an output outputted by the outputting step based on at least one program.

ADVANTAGE OF THE INVENTION

According to the invention of (1), information of temperature and vibration, which is generated in accordance with a state of rotating the rotating part or a state of sliding the sliding part, are simultaneously detected; presence or absence of the abnormality and the degree of the damage are simultaneously determined based on the combination of the measured result by the vibration system sensor and the measured result by the temperature sensor. Therefore, the degree of the damage utilizing a characteristic of an abnormal mode of the rotating or sliding part with regard to the vibration and temperature, can be determined. Further, the abnormality diagnosis having high reliability can be carried out by preventing an erroneous diagnosis by an influence of abrupt disturbance noise or the like. Furthermore, since presence or absence of the abnormality and the degree of the damage can simultaneously be inspected in an actual operating state without disassembling the machine equipment comprising the rotating or sliding part, an optimum timing of interchanging the rotating part can be known, and efficient maintenance can be carried out.

According to the invention of (3), the abnormality of the part is diagnosed based on the detecting signal of vibration or temperature by the sensor when the rotating or sliding part is operated by inertia within the predetermined speed range when a power of the driving unit is turned off. Therefore, the abnormality of the part can be diagnosed in the actual operating state without disassembling the machine equipment comprising the rotating or sliding part, the signal can be detected with high sensitivity and high SN ratio (signal to noise ratio) by restraining the electric disturbance noise of the driving unit.

Further, according to the invention of (4), when the rotating part is rotated within the rotational speed zone equal to or faster than $100\ min^{-1}$ and equal to or slower than $1500\ min^{-1}$, the abnormality of the rotating part is diagnosed based on the detecting signal of vibration or temperature by the sensor.

Therefore, since the abnormality of the rotating part can be diagnosed in the actual operating state without disassembling the machine equipment integrated with the rotating part, a vibrating force by a damage of flaking of the bearing or flat wear of a wheel or the like can be detected with high SN ratio, thus the abnormality diagnosis having high reliability can be carried out.

According to the invention of (11) and (32), a peak of the spectrum larger the reference value, which is calculated based on the spectrum provided by analyzing the frequency, is sampled; the frequency between the peaks and the frequency component owing to the damage of the rotating or sliding part calculated based on the rotational speed signal or the moving speed signal are compared and checked; and presence or absence of the abnormality and the abnormal portion of the part are determined based on a result of the checking. Therefore, in a case in which the actual rotational speed cannot directly be inputted, even when the rotational speed data used for the calculation is deviated from the actual rotational speed, presence or absence of the abnormality and the abnormal portion can accurately be specified. Further, presence or absence of the abnormality and the abnormal portion can be specified without disassembling the machine equipment comprising the rotating or sliding part by a simple constitution, labor required for disassembling or integrating the apparatus can be alleviated, and the part can be prevented from being damaged in accordance with disassembling or assembling.

Further, according to the invention of (13) and (33), presence or absence of the abnormality and the abnormal portion of the part are determined based on the frequency of the shockwave in which the waveform per a unit time period of the electric signal outputted from the signal generated from the machine equipment exceeds the threshold and the rotational speed signal or the moving speed signal. Therefore, by accurately detecting a state of bringing about the abnormality of the part of flat of the wheel in the railway vehicle or the like, the wheel can be specified.

According to the invention of (17) and (34), the frequency component of the measured spectrum data provided by analyzing the frequency and the frequency component owing to the rotating or sliding part are compared and checked with the variable allowable width, presence or absence of the abnormality and the abnormal portion of the part are determined based on the result of the checking. Therefore, in a case in which the actual rotational speed cannot directly inputted, even when the rotational speed data used for the calculation is deviated from the actual rotational speed, presence or absence of the abnormality or the abnormal portion can accurately be specified. Further, presence or absence of the abnormality and the abnormal portion can be specified without disassembling the machine equipment comprising the rotating or sliding part by a simple constitution, labor required in disassembling or integrating the apparatus can be alleviated, and the part can be prevented from being damaged in accordance with disassembling or assembling.

Further, according to the invention of (18) and (35), the zone having the upper limit value and the lower limit value calculated from the rotational speed of the rotating part and the dimensional specification of the rotating part is divided into at least one zone, a central value of each of the divided zone is calculated, and comparing and checking are carried out with at least one allowable width having an arbitrary size with respect to the central value. Therefore, presence or absence of the abnormality and the abnormal portion can be specified even when a plurality of rotating parts having dimensional specification different from each other are integrated to arbitrary portions or even when the rotational speed is varied.

According to the invention of (23) and (36), when the frequency component of the measured specter data and the frequency component owing to the rotating or sliding part are compared and checked, the reference value used in comparing and checking is calculated based on the limited frequency range of the measured spectrum data. Therefore, accuracy of diagnosis can be promoted by making an influence of noise difficult to be effected, presence or absence of the abnormality and the abnormal portion can be specified. Further, presence or absence of the abnormality and the abnormal portion can be specified without disassembling the machine equipment comprising the rotating or sliding part by a simple constitution, labor required for disassembling or integrating the apparatus can be alleviated, and the damage of the part accompanied by disassembling or assembling can be prevented.

Further, according to the invention of (24) and (37), a result of the diagnosis of presence or absence of the abnormality, the abnormal portion, the spectrum waveform (measured spectrum data) in the diagnosis are outputted in the predetermined style, and the report is formed by the result of the output based on at least one program. Therefore, operation of forming the report based on the result of the diagnosis is facilitated.

BRIEF DESCRIPTION OF THE DRAWINGS

FIG. 5 is a diagram showing a relationship between a portion of a damage of a rolling bearing and a vibration generating frequency generated owing to the damage;

FIG. 20 are an outline diagram of a abnormality diagnosing apparatus according to a ninth embodiment of the invention;

Figure 1:
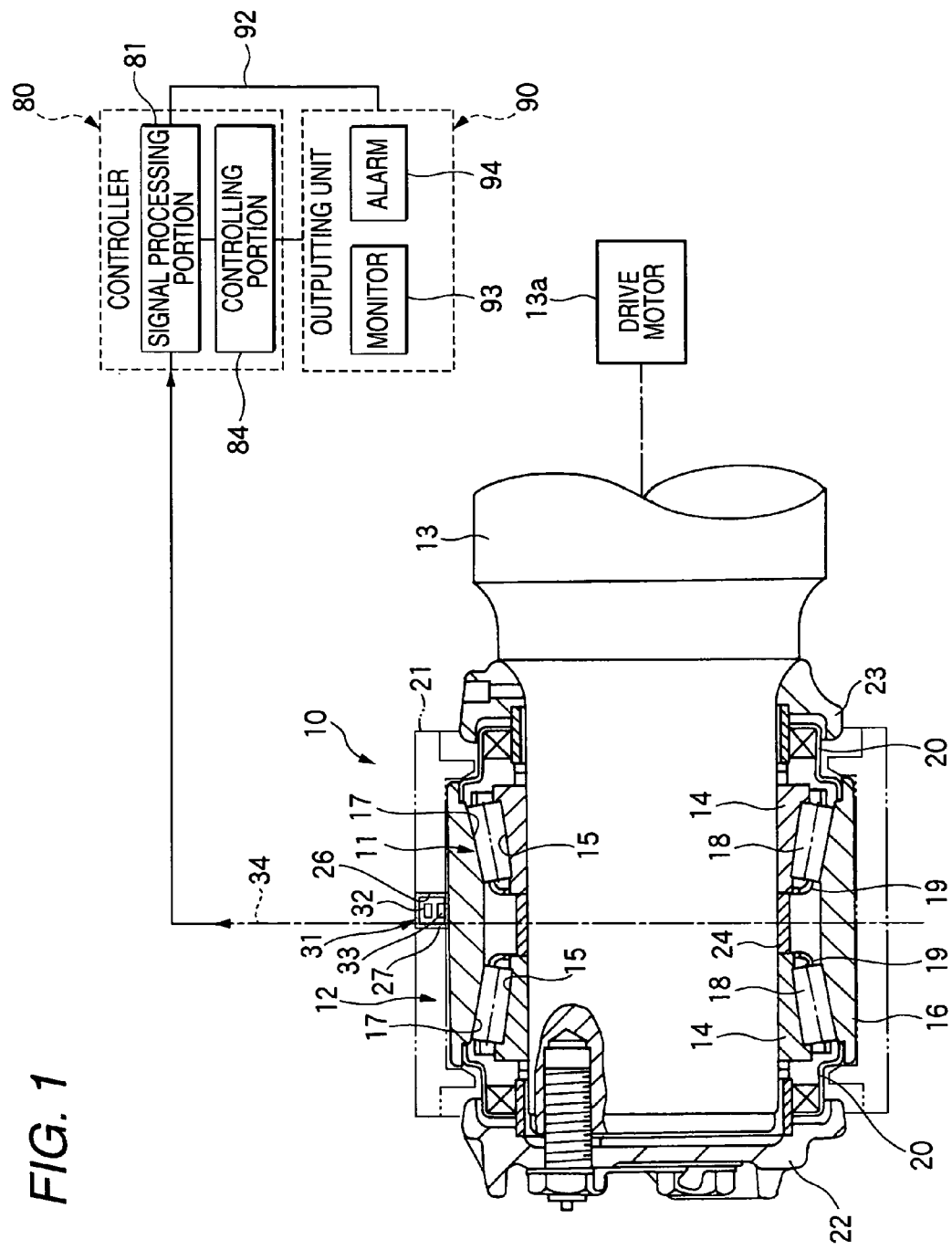
FIG. 1 is an outline view of a abnormality diagnosing apparatus in which a diagnosis object according to a first embodiment of the invention is targeted to a rolling bearing unit for a railway vehicle including a double row tapered roller bearing.

| Description of Reference Numerals and Signs | |
|---|---|
| 10 | rolling bearing unit (machine equipment) |
| 11 | double row tapered roller bearing (rotating part) |
| 12 | bearing box (stationary member) |
| 31, 70 | detecting portions |
| 32 | vibrating sensor (vibrating system sensor) |
| 33 | temperature sensor |
| 35 | filter processing portion |
| 37 | envelope processing portion |
| 38 | frequency analyzing portion |
| 39 | comparing and checking portion |
| 42 | abnormality determining portion |
| 52 | rotational state determining portion |
| 60, 120 | machine equipments |
| 62 | rolling bearing (rotating part) |
| 72 | sensor |
| 80 | controller |
| 81, 82 | signal processing portions |
| 84 | controlling portion |
| 90 | outputting apparatus |
| 93 | monitor |
| 94 | alarm |
| 95 | report forming portion |
| 96 | storing portion |
| 97 | data outputting portion |
| 100 | data accumulating and distributing portion |
| 102 | rotation analyzing portion |
| 104 | filter processing portion |
| 106 | vibration analyzing portion |
| 108 | comparing and determining portion |
| 110 | inner data holding portion |
| 200 | railway vehicle (machine equipment) |
| 201 | vibration sensor |
| 202, 220, 230 | abnormality diagnosing module |
| 203 | communication network |
| 204 | wheel (rotating or sliding part) |
| 205 | digital processing module |
| 206 | rotational speed sensor |
| 207, 236 | LPF |
| 208 | ADC |
| 209 | waveform shaping circuit |
| 210 | TCNT |
| 211 | CPU |
| 212 | communication protocol IP |
| 213 | SIO |
| 214 | line driver |
| 215 | envelope circuit |
| 216, 235 | HPF |
| 217 | all wave rectifying circuit |
| 218 | peak hold |
| 219, 231 | digital processing portions |
| 232 | envelope processing |
| 233 | Hilbert transformation |
| 234 | amplitude decode |
| 237 | threshold count |
| 238 | diagnosing portion |

BEST MODE FOR CARRYING OUT THE INVENTION

A detailed explanation will be given of a abnormality diagnosing apparatus and a abnormality diagnosing method according to respective embodiments of the invention in reference to the drawings as follows.

First Embodiment

First, an explanation will be given of a abnormality diagnosing apparatus according to a first embodiment of the invention in reference to FIG. 1 through FIG. 6.

As shown by FIG. 1, the rolling bearing unit 10 for a railway vehicle including a machine equipment applied with a abnormality diagnosing apparatus includes: a double row tapered roller bearing 11 constituting a rotating part; and a bearing box 12 constituting a stationary member constituting a portion of a carriage for the railway vehicle. Further, the abnormality diagnosing apparatus includes: a detecting portion 31 for detecting a signal generated from the rolling bearing unit 10; a controller 80 including a signal processing portion 81 for determining a state of a abnormality or the like of the double row tapered roller bearing 11 from an electric signal outputted by the detecting portion 31; a controlling portion 84 for controlling to drive the roller bearing unit 10; and the outputting unit 90 of the monitor 93, the alarm 94 or the like.

The double row tapered roller bearing 11 includes: a pair of inner rings 14, 14 rotatably supporting an axle 13 of the railway vehicle constituting a rotating shaft driven to rotate by a drive motor 13a constituting a driving unit and having inner raceway surfaces 15, 15 inclined in a shape of a conical outer face at an outer peripheral surface thereof; a single outer ring 16 having a pair of outer raceway surfaces 17, 17 inclined in a shape of a tapered inner surface at an inner peripheral surface thereof; tapered rollers 18, 18 constituting rolling elements arranged in double rows and by a plurality thereof between the inner raceway surfaces 15, 15 of the inner rings 14, 14 and the outer raceway surfaces 17, 17 of the outer ring 16; pressed retainers 19, 19 in a ring-like shape for rollably retaining the tapered rollers 18, 18; and a pair of seal members 20, 20 respectively mounted to both end portions in an axial direction of the outer ring 16. Further, the drive motor 13a is used by repeating turning ON and turning OFF, and when electricity is not energized to the drive motor 13a, the double row tapered roller bearing 11 is rotated by inertia along with the axle 13.

The bearing box 12 includes a housing 21 constituting a side frame of the carriage for the railway vehicle. The housing 21 is formed in a cylindrical shape to cover an outer peripheral surface of the outer ring 16. Further, a front lid 22 is arranged on a side of a front end portion in an axial direction of the housing 21, and a rear lid 23 is arranged on a side of a rear end portion in the axial direction of the housing 21.

An inner ring spacer 24 is arranged between the pair of inner rings 14, 14. The axle 13 is press-fitted to the pair of inner rings 14, 14 and the inner ring spacer 24, and the outer ring 16 is fitted to the housing 21. The double row tapered roller bearing 11 is loaded with a radial load by weights of various members or the like and an arbitrary axial load, and an upper side portion in a peripheral direction of the outer ring 16 constitutes a loaded zone. Here, the loaded zone refers to a zone in which the load is applied to the rolling element.

One seal member 20 arranged on the side of the front end portion of the axle 13 is integrated between an outer side end portion of the outer ring 16 and the front lid 22, and other seal member 20 arranged on the side of the rear end portion is integrated between an outer side end portion of the outer ring 16 and the rear lid 23.

A through hole 26 penetrated in a diameter direction is formed at an outer peripheral portion of the housing 21 at a position substantially at a center portion in the axial direction of the double row tapered roller bearing 11, and the through hole 26 is fixed with the detecting portion 31 constituting a portion of the abnormality diagnosing apparatus in a state of being contained in a single case 27.

The detecting portion 31 is a composite integrated type sensor in which a vibration system sensor capable of detecting vibration of at least one of a vibration sensor, an AE (acoustic emission), a sound sensor, an ultrasonic sensor and a temperature sensor are integrally contained to be fixed at inside of the case 27. Further, the detecting portion 31 shown in FIG. 1 includes the vibration sensor 32 and the temperature sensor 33.

The vibration sensor 32 is a vibration measuring element of a piezoelectric element or the like and is used for detecting: flaking of the inner and the outer raceway surface 15, 15, 17, 17 of the double row tapered roller bearing 11; fracture of a gear; flat wear of a wheel or the like. Further, the vibration sensor 32 may be able to form an electric signal from vibration of acceleration, speed or displacement type or the like and when attached to a machine equipment full of noise, it is preferable to use an insulating type since an influence of noise is not effected thereon. Further, as a sound sensor, a microphone capable of collecting sound emitted from an axle portion or the like as a sound wave to be formed into an electric signal may be used, and a microphone having a directivity is preferable for collecting sound.

The temperature sensor 33 is a temperature measuring element of a non-contact type of a thermistor temperature measuring element, a platinum temperature measuring resistor, a thermocouple or the like, and is arranged at a vicinity of the outer peripheral surface of the outer ring 16 at inside of the case 27. Further, as the temperature sensor 33, there can be used a temperature fuse which is not turned on by separating a contact of a bimetal or melting to cut the point when an ambient temperature exceeds a rectified value. In that case, a abnormality in temperature is detected by breaking down the turning on of the temperature fuse when the temperature of the rolling bearing unit 10 exceeds the rectified value.

Further, the detecting portion 31 is attached to the load zone of the radial load of the bearing box 12 fitted to a non-rotational side ring of the double row tapered roller bearing 11. Therefore, for example, when the bearing raceway surface is damaged, an impact force produced when the rolling element passes through the damaged portion is larger in the loaded zone than in a non-loaded zone and the side of the bearing loaded zone can detect abnormal vibration with excellent sensitivity.

Further, the detecting portion 31 can detect vibration and temperature of a gear or a wheel (both of which are not illustrated) in accordance with a constitution of a machine equipment other than a rolling bearing such as the double row tapered roller bearing 11.

Further, the embodiment is provided with a rotational speed sensor 40 (refer to FIG. 2) of an encoder or the like for detecting a rotational speed of the double row tapered roller bearing 11.

Figure 2:
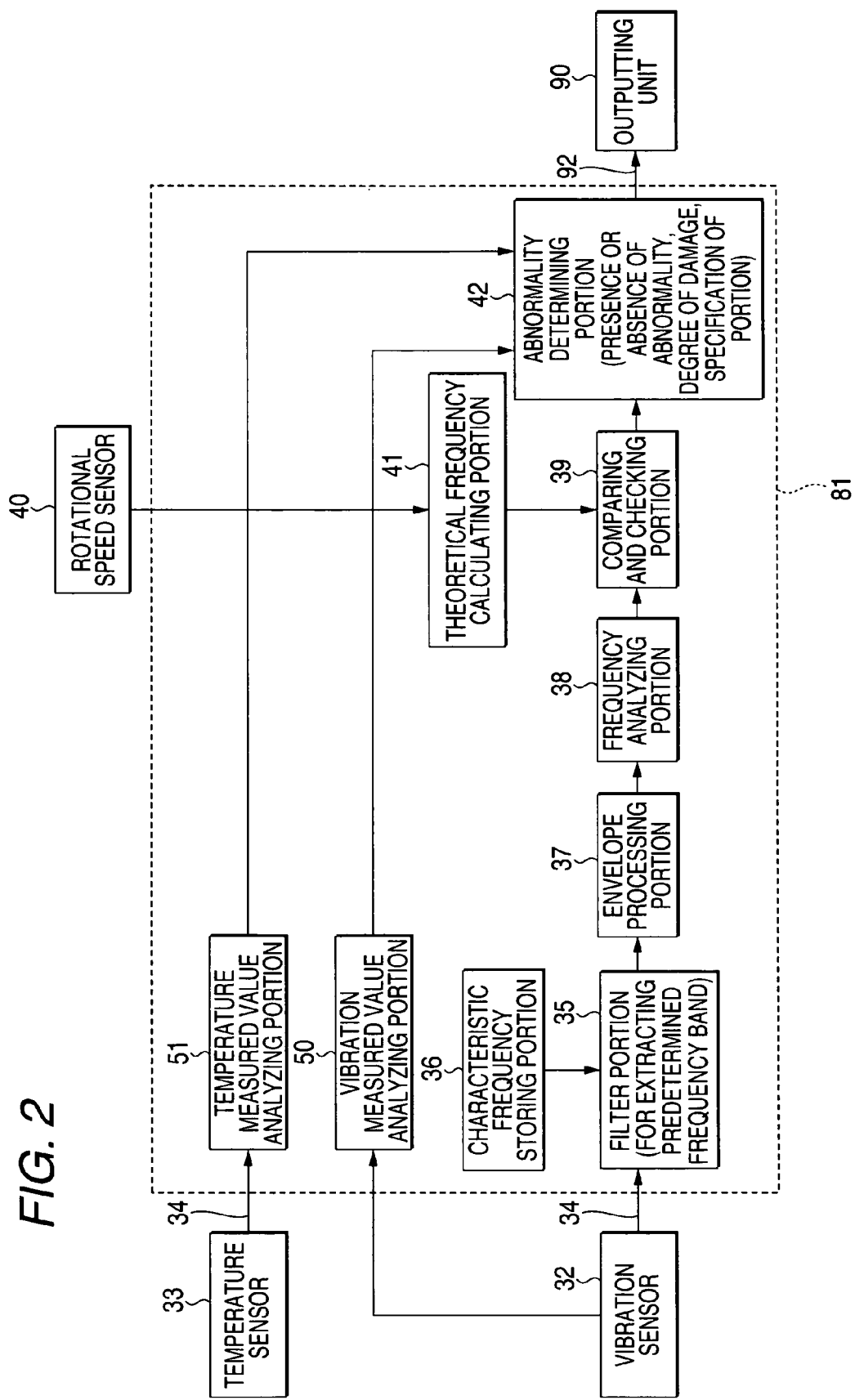
FIG. 2 is a block diagram of a signal processing route of a abnormality diagnosing apparatus.

According to the signal processing portion 81, as shown by FIG. 2, simultaneously with outputting a vibration signal by the vibration sensor 32 to the abnormality determining portion 42 by way of a vibration measured value analyzing portion 50 after amplifying a vibration signal, a temperature signal by the temperature sensor 33 is outputted to the abnormality determining portion 42 by way of a temperature measured value analyzing portion 51 after amplifying the temperature signal. The abnormality determining portion 42 determines presence or absence of a abnormality and a degree of damage of the double row tapered roller bearing 11 based on a combination of respective change rates of respective measured values of vibration and temperature over time.

Here, the respective measured values may be average root-mean-square values or peak values at arbitrary time.

That is, when an flaking damage is brought about at the bearing raceway surface, an impact is produced at each time of passing the rolling element through the damaged portion and therefore, a change in the vibration value becomes large. However, the temperature is hardly changed at a premonitory sign thereof or immediately thereafter. On the other hand, when a seizure is brought about at the bearing, as the premonitory sign, there is a characteristic of increasing the changes in vibration and temperature over a measured period of time. In this way, according to the embodiment, there is utilized the characteristic of an abnormal mode of the rotating part in which ways of changing vibration and temperature differ by the kind of the abnormality, and presence or absence of the abnormality and the degree of damage of the double row tapered roller bearing 11 can be determined by combining the respective change rates of the respective measured values of vibration and temperature over time.

Figure 3:
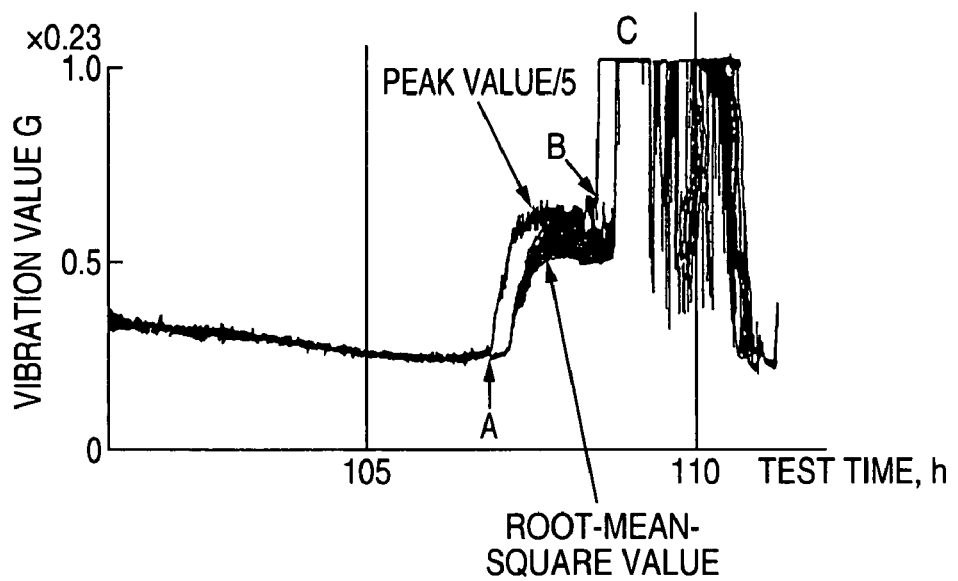
FIG. 3 is a graph showing an aging change of a vibration value when a seizure of a bearing is brought about.
Figure 4:
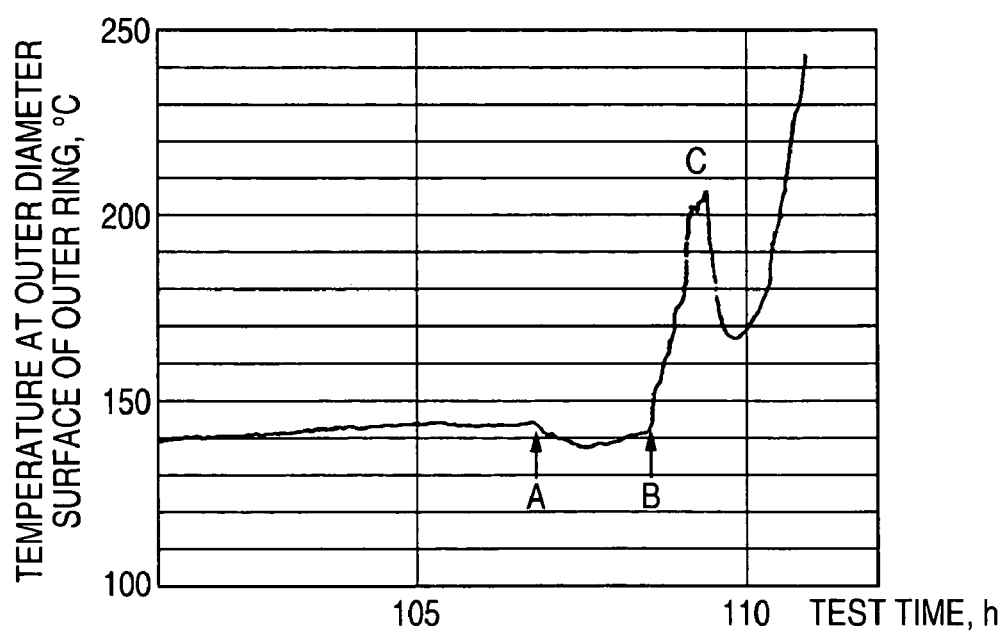
FIG. 4 is a graph showing an aging change of a temperature of an outer peripheral surface of an outer ring when a seizure of a bearing is brought about.

FIG. 3 shows an aging change of vibration until bringing about a seizure at the bearing, and FIG. 4 shows an aging change of temperature until bringing about the seizure at the bearing.

In reference to FIG. 3 and FIG. 4, as the premonitory sign of bringing about seizure at the bearing, vibration is rapidly increased from point A, however, temperature is hardly changed. Thereafter, vibration is further increased from point B and temperature rises from the same time point. It is known that after further increasing vibration, seizure is brought about at point C, temperature after seizure further rises and the bearing is overheated.

Therefore, presence or absence of the abnormality and the degree of damage of the double row tapered roller bearing 11 is determined by calculating the change rates of the measured values of vibration and temperature at points A, B, C or over time based on a measured result shown in FIG. 3 and FIG. 4 and comparing the values with a previously set predetermined values.

Further, according to the embodiment, with regard to information of vibration by the vibration sensor 32, a frequency analysis is carried out by subjecting a vibration waveform to filter processing, thereafter, an envelope processing to be able to determine presence or absence of the damage of the bearing or the like and specify the damaged portion to thereby ensure reliability of abnormality diagnosis.

That is, as shown by FIG. 2, the vibration signal generated by the vibration sensor 32 is a amplified and converted by A/D conversion by way of wired or wireless signal transmitting unit 34 and thereafter transmitted to the filter portion 35. The filter portion 35 samples only a predetermined frequency band in correspondence with a characteristic frequency from the vibration signal based on the characteristic frequency of the double row tapered roller bearing 11 stored to a characteristic frequency storing portion 36. Further, amplification and A/D conversion of the vibration signal may be carried out before transmission and an order of amplification and A/D conversion may be reversed.

The characteristic frequency can easily be calculated by vibrating the double row tapered roller bearing 11 as a measured object by subjecting a vibration detector attached to the measured object or sound emitted by striking as a frequency analysis. Further, when the measured object is the double row tapered roller bearing, the measured object is provided with a characteristic frequency owing to any one of the inner ring, the outer ring, the rolling element, the retainer and the like. Generally, a plurality of natural frequencies of a machine part are present, and an amplitude level at the characteristic frequency is increased and therefore, a sensitivity of measurement is excellent.

Thereafter, at the envelope processing portion 37, an absolute value detecting processing for detecting an absolute value of a waveform is carried out for the predetermined frequency band sampled by the filter portion 35. Further, a processing of analyzing the frequency of the waveform is carried out at the frequency analyzing portion 38 and measured value data is transmitted to the comparing and checking portion 39.

Figure 6:
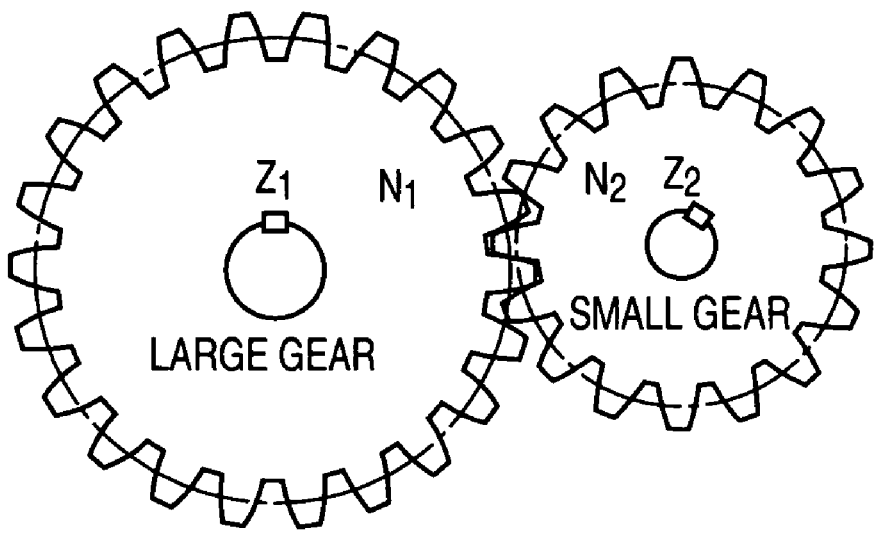
FIG. 6 is a diagram for explaining a relationship of an abnormal vibration frequency generated by bringing gears in mesh with each other.

On the other hand, at a theoretical frequency calculating portion 41, calculated value data of a frequency owing to damage of a rotating part of flaking of the bearing, fracture of a gear, flat of a wheel or the like calculated based on the rotational speed sensor 40 is transmitted to the comparing and checking portion 39. Further, when a rotating part is a roller bearing, the calculation value data becomes frequency data owing to damage of the inner ring, the outer ring, the rolling element, the retainer as shown by FIG. 5. Further, when a rotating part is a gear, the calculation value data becomes a frequency data owing to damage as shown by FIG. 6.

Further, the measured value data and the calculation value data are compared and checked at the comparing and checking portion 39, and at the abnormality determining portion 42, presence or absence of abnormality is determined, an abnormal portion is specified, and a degree of damage is determined. The outputting unit 90 outputs a result of determining presence or absence of abnormality, the degree of damage of the double row tapered roller bearing 11 and specifying the abnormal portion and outputs warning of an alarm or the like when abnormality is detected and inputs the result of determination to a storing portion. Here, information is transmitted from the abnormality determining portion 42 to the outputting unit 90 by wired or wireless data transmitting unit 92. Further, the result of determination may be outputted to the controlling portion 84 for controlling operation of a mechanism of driving the roller bearing unit 10 and a control signal in accordance with the result of determination may be fed back.

Further, according to the vibration signal processing after amplification, various data processing and operation are carried out, for example, a computer or an exclusive microchip or the like can be used therefor. Further, the operation processing may be carried out after storing the detected signal to storing means of a memory or the like.

In this way, according to the embodiment, information of vibration and temperature in accordance with a state of rotating the double row tapered roller bearing 11 constituting the rotating part are simultaneously detected, presence or absence of abnormality and the degree of damage are simultaneously determined based on a combination of the measured result by the vibration system sensor of vibration sensor, sound sensor, ultrasonic wave sensor, or AE sensor or the like and the measured result by the temperature sensor and therefore, the degree of damage can be determined by utilizing the characteristic of the abnormal mode of the double row tapered roller bearing 11 with regard to vibration and temperature. Further, the abnormality diagnosis having high reliability can be carried out by preventing erroneous diagnosis by influence of abrupt disturbance noise or the like. Further, presence or absence of abnormality and the degree of damage of the double row tapered roller bearing 11 can simultaneously be inspected in the actual operating state without disassembling the rolling bearing unit 10 for the railway vehicle integrated with the double row tapered roller bearing 11. As a result, an optimum timing of interchanging the double row tapered roller bearing 11 is known and efficient maintenance can be carried out. Particularly, according to the invention, by combining the measured values or the change rates of vibration and temperature, presence or absence of abnormality is diagnosed to determine by a plurality of times.

Further, with regard to information of vibration, by comparing the frequency component owing to damage of the double row tapered roller bearing 11 calculated based on the rotational speed signal and the frequency component of the measured data provided by subjecting the vibration waveform of the signal detected by the vibration sensor 32 to the filter processing and the envelope processing, presence or absence of abnormality of the double row tapered roller bearing 11 can be determined and the damaged portion can be specified, and reliability of abnormality diagnosis can further be ensured.

Second Embodiment

Next, a abnormality diagnosing apparatus according to a second embodiment of the invention will be explained in details in reference to FIG. 7 and FIG. 8. Further, portions equivalent to those of the first embodiment are attached with the same notations and an explanation thereof will be omitted or simplified.

According to the embodiment, a state of rotating the double row tapered roller bearing 11 by inertia in a predetermined rotational speed zone when turning off the drive motor 13a (refer to FIG. 1) is detected by the signal processing portion 81 based on an OFF signal of the drive motor 13a, and the rotational speed sensor 40 and in the detecting, a abnormality of the double row tapered roller bearing 11 is diagnosed based on detecting signals by the vibration sensor 32 and the temperature sensor 33.

Figure 7:
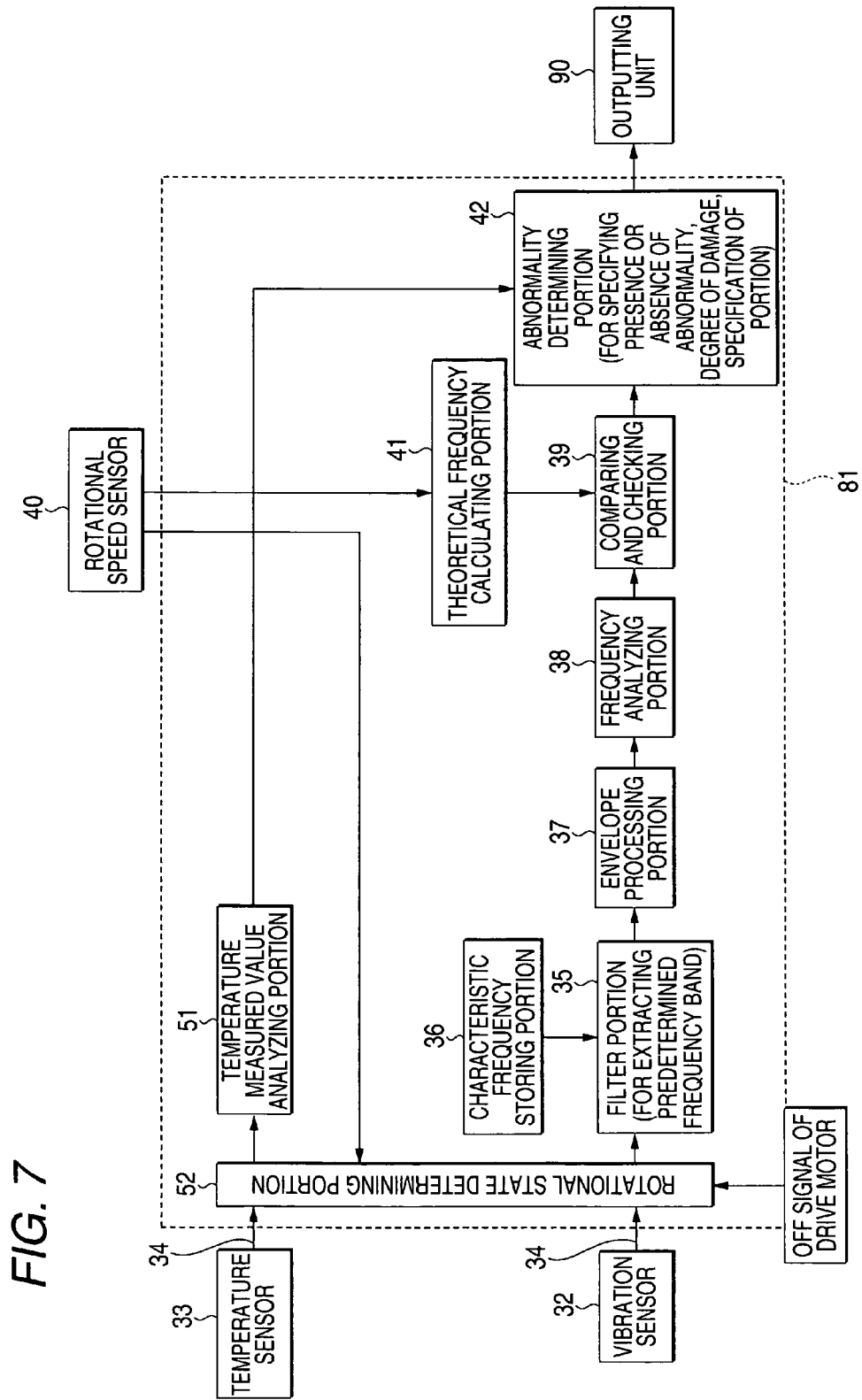
FIG. 7 is a block diagram of a signal processing route of a abnormality diagnosing apparatus according to a second embodiment of the invention.
Figure 8:
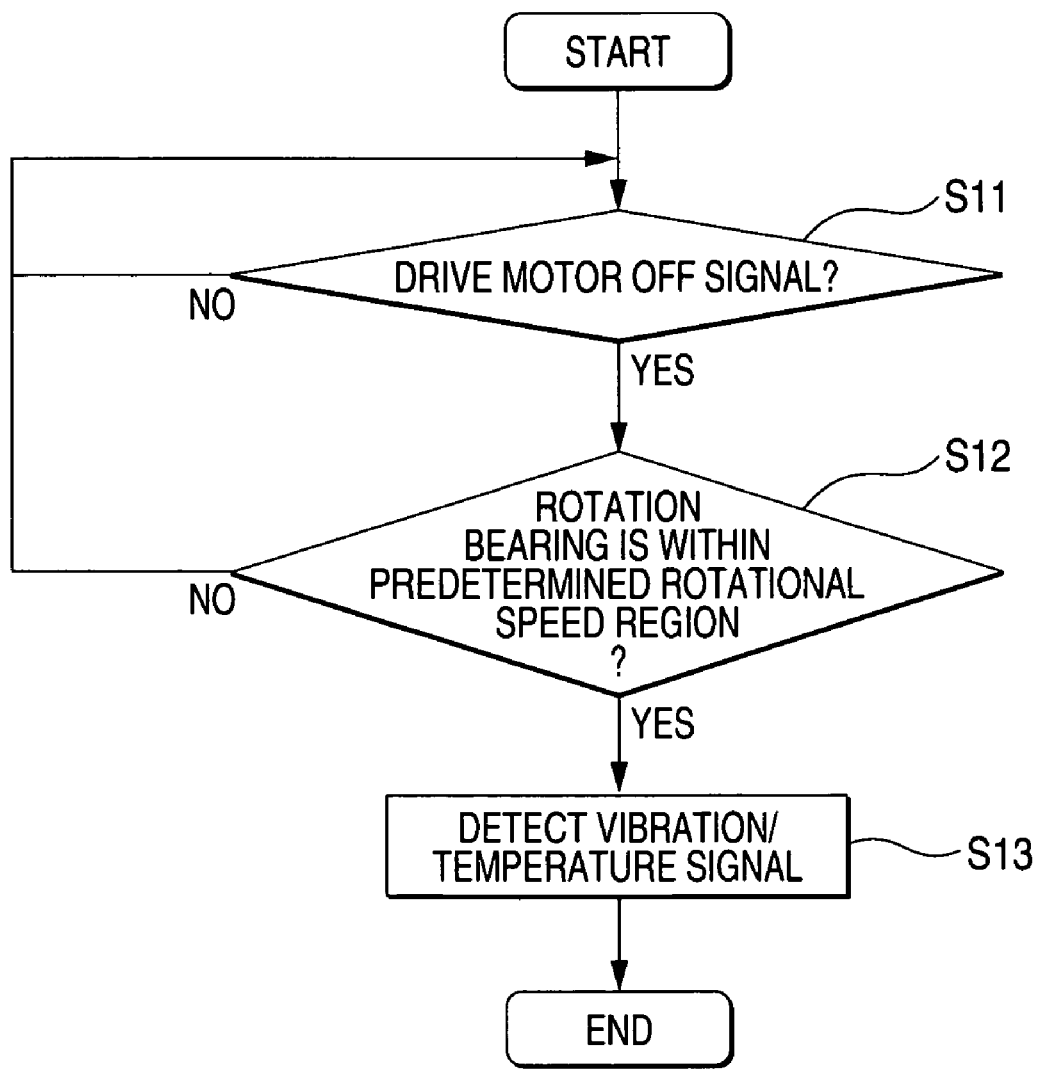
FIG. 8 is a flowchart showing a processing flow of a rotational state determining portion according to the second embodiment.

First, as shown by FIG. 7, the vibration signal generated by the vibration sensor 32, the temperature signal generated by the temperature sensor 33 are transmitted to the rotational speed determining portion 52 after amplification and A/D conversion by way of the signal transmitting unit 34. Further, amplification and A/D conversion of the vibration signal may be carried out before transmission, further, an order of amplification and A/D conversion may be reversed.

The rotational state determining portion 52 determines whether the drive motor 13a falls in the rotational speed zone by inertia in which electricity is not energized to the drive motor 13a after driving to operate the drive motor 13a within the predetermined rotational speed zone. For example, as shown by a processing flow of FIG. 8, the rotational state determining portion 52 determines whether an OFF signal on a side of the drive motor is outputted (step S11) and determines whether information of the rotational speed of the double row tapered roller bearing 11 from the rotational speed sensor 40 falls in a previously set predetermined rotational speed zone (step S12). Further, when the OFF signal (turning off) on the side of the drive motor is not outputted, or information of the rotational speed of the double row tapered roller bearing 11 from the rotational speed sensor 40 does not fall in the previously set predetermined rotational speed zone, the operation returns to step S11 to repeat processing. On the other hand, when the OFF signal on the side of the drive motor is outputted to the rotational speed determining portion 52 and information of the rotational speed of the double row tapered roller bearing 11 from the rotational speed sensor 40 falls in the previously set predetermined rotational speed zone, the vibration signal and the temperature signal at the time point are detected and transmitted to the filter portion 35, the temperature measured value analyzing portion 51 (step S13).

Further, the rotational speed determining portion 52 may detect the vibration signal and the temperature signal based on the output of the OFF signal of the drive motor when it is confirmed that information of the rotational speed of the double row tapered roller bearing 11 falls in the rotational speed zone. Or, when it is determined that the drive motor 13a is brought into turning off state by a change in information of the rotational speed by the rotational speed sensor 40, a abnormality of the rotating part may be diagnosed in corporation with the detecting signal of the rotational speed by the rotational speed sensor 40 and the detecting signal of vibration or a temperature by the detecting portion 31.

Further, when the drive motor 13a is brought into the turned off state, information of vibration is processed similar to the first embodiment as shown by FIG. 7, and the abnormality determining portion 42 determines presence or absence of the abnormality in vibration of the double row tapered roller bearing 11 and specifies the abnormal portion. The outputting unit 90 outputs a result of determining the abnormality in the double row tapered roller bearing 11 and specifying the abnormal portion, a warning of an alarm or the like is outputted, or the result of determination is inputted to a storing portion.

On the other hand, the temperature signal detected when the OFF signal on the side of the drive motor is outputted and information of the rotational speed of the double row tapered roller bearing 11 falls in the previously set predetermined rotational speed zone is processed by the temperature measured value analyzing portion 51 and thereafter outputted to the abnormality determining portion 42.

The abnormality determining portion 42 determines whether a previously set threshold is exceeded, when the threshold is not exceeded, it is determined that a abnormality is not brought about at the bearing, when the threshold is exceeded, it is determined that a abnormality of seizure or the like is brought about at the bearing, a result of determining the abnormality in the double row tapered roller bearing 11 is outputted by the outputting unit 90, and a warning of an alarm or the like is outputted.

In this way, according to the embodiment, the signal processing portion 81 determines the abnormality in the double row tapered roller bearing 11 based on the detecting signals of the vibration sensor 32 and the temperature sensor 33 in the state of rotating the double row tapered roller bearing 11 by inertia in the predetermined rotational speed zone when the drive motor 13a is brought into the turning off state and therefore, the abnormality of the double row tapered roller bearing 11 can be diagnosed in an actual operating state without disassembling the roller bearing unit 10 for the railway vehicle integrated with the double row tapered roller bearing 11, a signal of a high SN ratio (signal to noise ratio) can be detected with high sensitivity by restraining electric disturbance noise of electromagnetic sound or the like in driving the drive motor 13a, and the abnormality can be diagnosed with high reliability.

According to the embodiment, in driving the drive motor 13a, an influence of electric disturbance noise of electromagnetic sound or the like is larger in the vibration sensor 32 than in the temperature sensor 33 and therefore, at least the signal from the vibration sensor 32 may be transmitted to the rotational state determining portion 52 by way of the signal transmitting unit 34, and the signal from the temperature sensor 33 may be transmitted to the temperature measured value analyzing portion 51 without passing the rotational state determining portion 52.

Further, other constitution and operation are similar to those of the first embodiment.

Third Embodiment

Next, a abnormality diagnosing apparatus according to a third embodiment of the invention will be explained in reference to FIG. 9. Further, portions equivalent to those of the second embodiment are attached with the same notations and an explanation thereof will be omitted or simplified.

Figure 9:
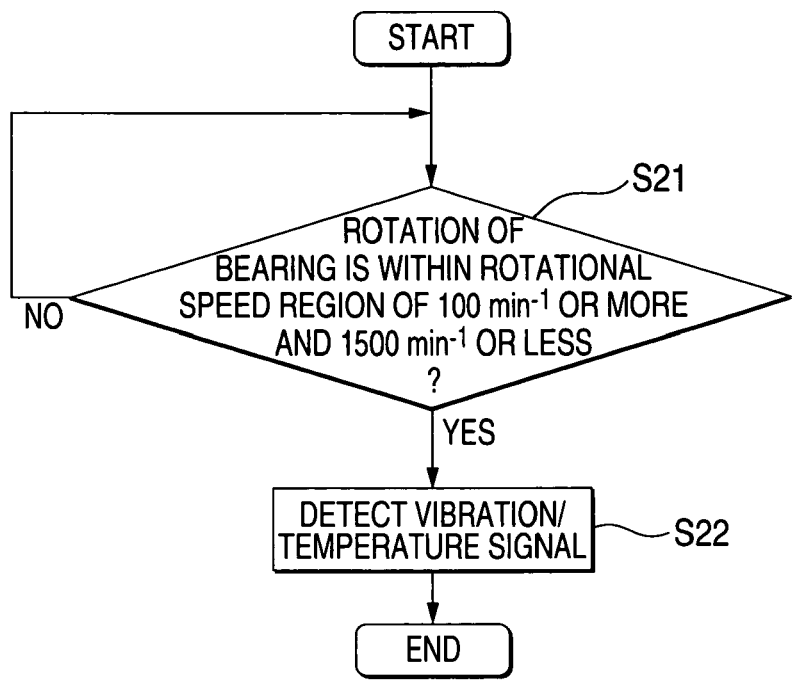
FIG. 9 is a flowchart showing a processing flow of a rotational state determining portion of a abnormality diagnosing apparatus according to a third embodiment of the invention.

According to the abnormality diagnosing apparatus of the embodiment, as shown by a flowchart of FIG. 9, the rotational state determining portion 52 (refer to FIG. 7) determines whether information of the rotational speed of the double row tapered roller bearing 11 from the rotational speed sensor 40 falls in a zone of the rotational speed equal to or faster than 100 min$^{-1}$ and equal to or slower than 1500 min$^{-1}$ (step S21). Further, when information of the rotational speed of the double row tapered roller bearing 11 is outside of the zone of the rotational speed equal to or faster than 100 min$^{-1}$ and equal to or slower than 1500 min$^{-1}$, the operation returns to step S21 to repeat processing. On the other hand, when information of the rotational speed of the double row tapered roller bearing 11 falls in the zone of the rotational speed equal to or faster than 100 min$^{-1}$ and equal to or slower than 1500 min$^{-1}$, the vibration signal and the temperature signal at the time point are detected and transmitted to the filter portion 35, the temperature measured value analyzing portion 51 (step S22).

Therefore, according to the abnormality diagnosing apparatus of the embodiment, the rotational speed determining portion 52 of FIG. 7 is constituted to determine whether the double row tapered roller bearing 11 falls in the zone of the rotational speed equal to or faster than 100 min$^{-1}$ and equal to or slower than 1500 min$^{-1}$ without using the output of the OFF signal of the drive motor 13a.

However, also in the abnormality diagnosing apparatus of the embodiment, similar to the second embodiment, the rotational state determining portion 52 may determine that the drive motor 13a is brought into the turning off state by using the output of the OFF signal of the drive motor 13a, or by the change in information of the rotational speed by the rotational speed sensor 40. Therefore, by detecting the vibration signal and the temperature signal when the double row tapered roller bearing 11 is rotated by inertia within the zone of the rotational speed equal to or faster than 100 min$^{-1}$ and equal to or slower than 1500 min$^{-1}$, the influence of the electromagnetic component in conducting electricity to the drive motor 13a is eliminated, and the abnormality can be diagnosed with higher accuracy.

Therefore, according to the abnormality diagnosing apparatus of the embodiment, when the double row tapered roller bearing 11 is rotated within the zone of the rotational speed equal to or faster than 100 min$^{-1}$ and equal to or slower than 1500 min$^{-1}$, the abnormality of the double row tapered roller bearing 11 is diagnosed based on the detecting signals of the vibration sensor 32 and the temperature sensor 33 and therefore, the abnormality of the double row tapered roller bearing 11 can be diagnosed in an actual operating state without disassembling the rolling bearing unit 10 for a railway vehicle integrated with the double row tapered roller bearing 11, the vibrating force by flaking of the double row tapered roller bearing 11 by damage or flat wear of the wheel or the like can be detected by the high SN ratio without being influenced by the disturbance noise or the like, as a result, the abnormality can be diagnosed with high reliability.

Particularly, in the roller bearing unit 10 of the railway vehicle integrated with the double row tapered roller bearing 11 having an outside diameter equal to or larger than φ200 mm (inside diameter φ100 mm, width 150 mm), by diagnosing the abnormality when the double row tapered roller bearing 11 is rotated within the rotational speed zone, the abnormality can be diagnosed with high reliability.

Other constitution and operation are similar to those of the second embodiment.

Further, there is a case in which depending on a machine equipment, mesh of a gear train is intermittently carried out by using a clutch mechanism or the like, in addition to the second and the third embodiments, by diagnosing the abnormality of the double row tapered roller bearing 11 based on the detecting signals by the vibration sensor 32 and the temperature sensor 33 when mesh of the gear train by the clutch is separated, influence of mechanical noise of mesh of the gear train and electric noise is not effected, and the abnormality can be diagnosed with higher SN ratio. Further, when a signal is outputted to the side of the drive motor in separating mesh of the gear train and the signals of vibration and the temperature are detected and the abnormality is diagnosed after the drive motor is brought into the turning off state, efficient formation of the diagnosis can be achieved.

Further, when used by the railway vehicle, in addition to the second and the third embodiments, similar operation and effect can be achieved by diagnosing the abnormality of the double row tapered roller bearing 11 based on the detecting signals by the vibration sensor 32 and the temperature sensor 33 when there is not a joint or a switch of a railway track and a railway vehicle is running on a straight line. In this case, efficient formation of the diagnosis can be achieved when signals of vibration and temperature are detected and the abnormality is diagnosed after the drive motor is brought into the turning off state when a signal is outputted to a side of the driver's cab or the side of the drive motor, when, for example, the railway vehicle passes a location from which the railway vehicle runs on the straight line.

Fourth Embodiment

Figure 10:
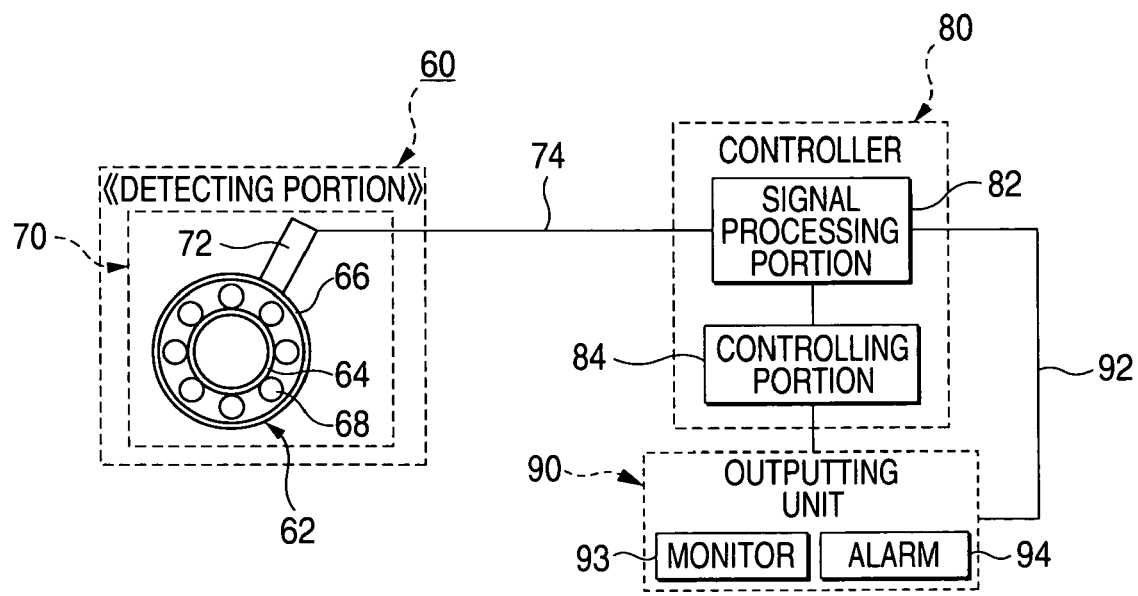
FIG. 10 is an outline diagram of a abnormality diagnosing apparatus according to a fourth embodiment of the invention.

Next, a abnormality diagnosing apparatus according to a fourth embodiment will be explained in reference to FIGS. 10 through 12. As shown by FIG. 10, the abnormality diagnosing apparatus includes a detecting portion 70 for detecting a signal generated from the machine equipment 60, the controller 80 including the signal processing portion 82 for determining a abnormality or the like of a rotating part of the machine equipment 60 from an detecting signal outputted by the detecting portion 70 and the controlling portion 84 for controlling to drive the machine equipment 60, and the outputting unit 90 of the monitor 93, the alarm 94 and the like.

The machine equipment 60 is provided with the rolling bearing 62 constituting a rotating part as an example, and the rolling bearing 62 includes an inner ring 64 constituting a rotating ring outwardly fitted to a rotating shaft (not illustrated), an outer ring 66 constituting a fixed ring inwardly fitted to a housing (not illustrated), balls 68 constituting a plurality of rolling elements arranged between the inner ring 64 and the outer ring 66, and a retainer (not illustrated) for rollably holding the ball 68.

The detecting portion 70 includes a sensor 72 for detecting vibration generated from the machine equipment 60 in operating the machine equipment 60. The sensor 72 is fixed to the housing at a vicinity of the outer ring by fixing by a bolt, adhering, fixing by a bolt and adhering, or embedding by a mold member. Further, when fixed by a bolt, a function of stopping to rotate may be provided. Further, when the sensor 72 is molded, waterproof performance is achieved, vibration isolating performance is promoted against vibration from outside and therefore, reliability of the sensor 72 per se can remarkably be promoted.

Further, the sensor 72 may be a vibration system sensor capable of detecting vibration and may be able to convert vibration into an electric signal of a vibration sensor, and AE (acoustic emission) sensor, an ultrasonic sensor, a shock pulse sensor or the like, or of acceleration, speed, strain, stress, displacement type or the like. Further, when attached to a machine equipment frequent of noise, it is preferable to use an insulating type since the insulating type is less effected with an influence of noise. Further, when the sensor 72 uses a vibration detecting element of a piezoelectric element or the like, the element may be constituted by being molded by plastic or the like. In addition thereto, according to the machine equipment 60 of the embodiment, other than the rolling bearing 62, vibration of a gear or a wheel (also which are not illustrated) or the like can be detected by the sensor 72.

Further, similar to the detecting portion 31 of FIG. 1, the detecting portion 70 may be an integrated type sensor for containing the sensor 72 for detecting vibration generated from the machine equipment, a temperature sensor for detecting a temperature of the machine equipment and the rotational speed sensor in a single case. In this case, it is preferable to fix the integrated sensor to a flat portion of a bearing box for fixing the rolling bearing 62 (refer to FIG. 18). The temperature sensor may be a temperature fuse of a type in which turning off by separating a contact of a bimetal or melting the contact when the temperature becomes a certain predetermined value. Thereby, when a temperature equal to or higher than a certain predetermined value, the temperature fuse is turned off the electricity and therefore, a abnormality can be detected.

The controller 80 including the signal processing portion 82 and the controlling portion 84 is constituted by a microcomputer (IC chip, CPU, MPU, DSP or the like) for receiving an electric signal from the sensor 72 by way of digital transmitting unit 74.

Figure 11:
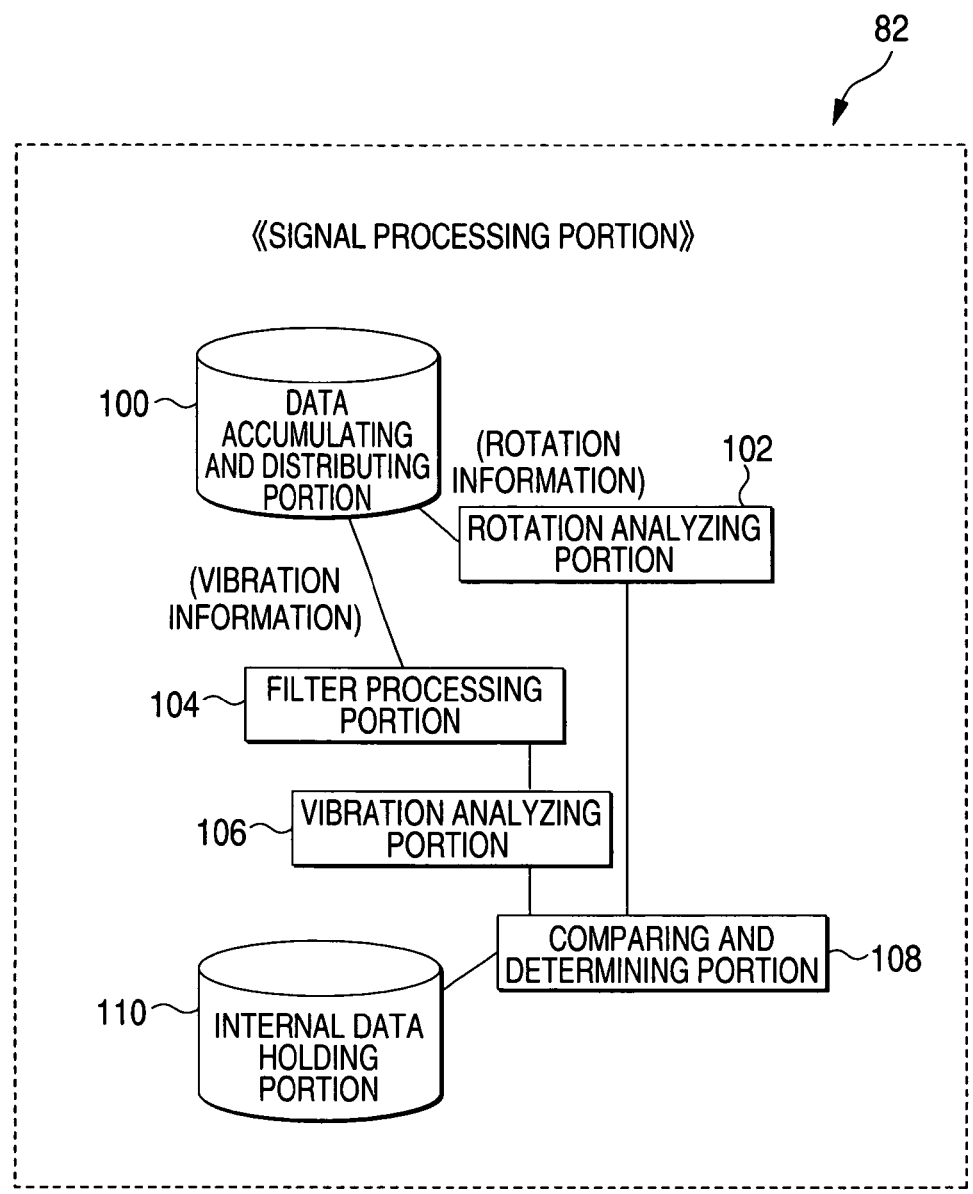
FIG. 11 is a block diagram of a signal processing portion of FIG. 10.
Figure 12:
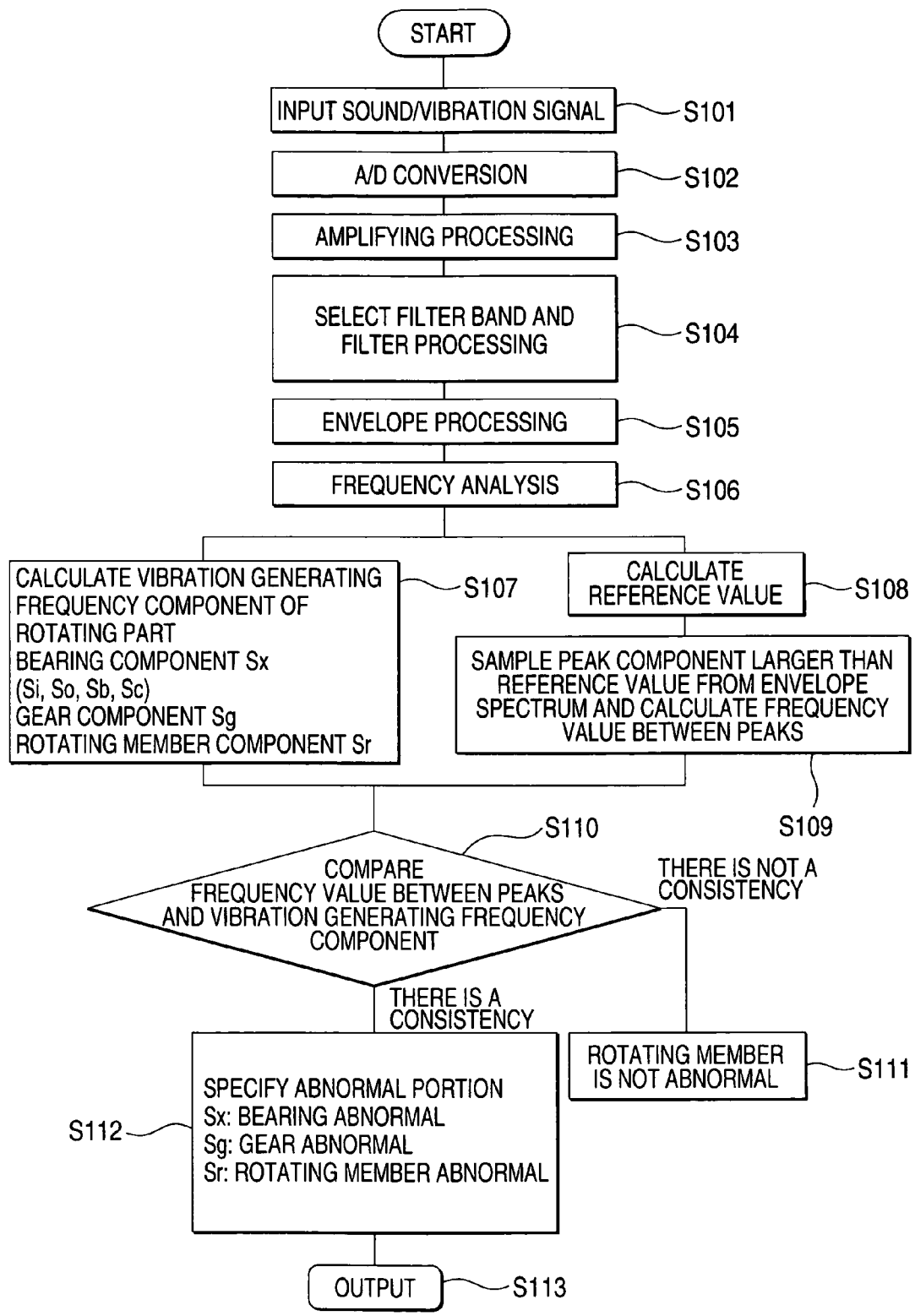
FIG. 12 is a flowchart showing a processing flow of a abnormality diagnosing method according to a fourth embodiment of the invention.

As shown by FIG. 11, the signal processing portion 82 includes a data accumulating and distributing portion 100, the rotation analyzing portion 102, the filter processing portion 104, the vibration analyzing portion 106, the comparing and determining portion 108, the inner date holding portion 110. The data accumulating and distributing portion 100 is provided with a collecting and distributing function for receiving an electric signal from the sensor 72 and an electric signal with regard to a rotational speed to temporarily store and distributing the signals to either of the analyzing portions 102, 106 in accordance with kinds of the signals. The various signals are converted to digital signals by A/D conversion by an AD converter, not illustrated, before being transmitted to the date accumulating and distributing portion 100 and transmitted to the data accumulating and distributing portion 100 after having been amplified by an amplifier, not illustrated. Further, an order of A/D conversion and amplification may be reversed.

The rotation analyzing portion 102 calculates a rotational speed of the inner ring 64, that is, the rotating shaft based on an output signal from a sensor (not illustrated) for detecting a rotational speed and transmits the calculated rotational speed to the comparing and determining portion 108. Further, when the detecting element is constituted by an encoder attached to the inner ring 64 and a magnet and a magnetic detecting element attached to the outer ring 66, a signal outputted by the detecting element becomes a pulse signal in accordance with a shape and a rotational speed of the encoder. The rotation analyzing portion 102 is provided with a predetermined conversion function or conversion table in accordance with a shape of the encoder and calculates the rotational speed of the inner ring 64 and the rotating shaft from the pulse signal in accordance with the function or table.

The filter processing portion 104 samples only a predetermined frequency band in correspondence with a characteristic frequency from the vibration signal based on the characteristic frequency of the rolling bearing 62, a gear, a wheel or the like constituting a rotating part and eliminates an unnecessary frequency band. The characteristic frequency can easily be calculated by vibrating the rotating part as a measured object by a striking method and subjecting a vibration detector attached to the measured object or sound emitted by striking to frequency analysis. Further, when the measured object is a rolling bearing, a characteristic frequency owing to any of the inner ring, the outer ring, the rolling element, the retainer or the like is provided. Generally, a plurality of natural frequencies of mechanical parts are present, further, an amplitude level at the characteristic frequency is high and therefore, a sensitivity of measurement is excellent.

The vibration analyzing portion 106 analyzes a frequency of vibration generated at the bearing 62, a gear, or a wheel based on an output signal from the sensor 72. Specifically, the vibration analyzing portion 106 is an FFT calculating portion for calculating a frequency spectrum of the vibration signal and calculates the frequency spectrum of the vibration based on an algorism of FFT. The calculated frequency spectrum is transmitted to the comparing and determining portion 108. Further, the vibration analyzing portion 106 may carry out an absolute value processing or an envelope processing as a pretreatment of carrying out FFT to convert only to a frequency component necessary for diagnosis. The vibration analyzing portion 106 outputs also envelope data after the envelope processing to the comparing and determining portion 108 as necessary.

The comparing and determining portion 108 compares the frequency spectrum of the vibration by the vibration analyzing portion 106 and a reference value used for analyzing a abnormality calculated from the frequency spectrum, samples a peak component larger than the reference value from the frequency spectrum and calculates the frequency value between peaks. On the other hand, the comparing and determining portion 108 calculates vibration generating frequency components of rotating parts generated owing to abnormalities of the respective rotating parts from the relationships shown in FIG. 5 and FIG. 6, that is, frequency component of damages Sx of the bearing (inner ring frequency component of damage Si, outer ring frequency component of damage So, rolling element frequency component of damage Sb and retainer frequency component of damage Sc), a frequency component of damage Sg in correspondence with mesh of gears, wear of a rotating member of a wheel or the like or an unbalance component Sr thereof and compares the vibration generating frequency components and frequency values between peaks. Further, the comparing and determining portion 108 determines presence or absence of the abnormality and specifies the abnormal portion based on a result of the determination.

Further, calculation of the vibration generating frequency components may be carried out therebefore, and when a similar diagnosis is carried out therebefore, data may be stored to the inner date holding portion 110 and the data may be used. Further, various elements data of design of the respective rotating parts used for calculation is inputted and stored beforehand.

Further, a result of determination at the comparing and determining portion 108 may be held at the inner data holding portion 110 of a memory, HDD or the like, or may be transmitted to the outputting unit 90 by way of the data transmitting unit 92. Further, the result of determination may be outputted to the controlling portion 84 for controlling operation of the mechanism of driving the machine equipment 60 and a control signal in accordance with the result of determination may be fed back.

Further, the outputting unit 90 may display the result of a determination to a monitor or the like in real time, or may notify abnormality by using an alarm, a buzzer or the like when the abnormality is detected. Further, the data transmitting unit 74, 92 may be able to transmit and receive signals precisely, may be wired, or may utilize wireless in consideration of a network.

Next, an explanation will be given of a specific example of a processing flow of a abnormality diagnosis based on the vibration signal in reference to FIG. 12.

First, the sensor 72 detects vibrations of respective rotating parts (step S101). The detected vibration signals are converted into digital signals by an A/D converter (step S102), amplified by a predetermined amplification factor (step S103), thereafter, the filter processing of sampling only predetermined frequency bands in correspondence with the natural frequencies of rotating parts by the filter processing portion 104 is carried out (step S104). Thereafter, at the vibration analyzing portion 106, the envelope processing is carried out for the digital signals after the filter processing (step S105), and frequency spectra of digital signals after the envelope processing are calculated (step S106).

Next, from the relationships shown in FIG. 5 and FIG. 6, the frequency components (bearing frequency component of damages Sx (inner ring frequency component of damage Si, outer ring frequency component of damage So, rolling element frequency component of damage Sb and retainer frequency component of damage Sc), frequency component of damage Sg in correspondence with mesh of gears, wear of a rotating member of a wheel or the like and unbalance component Sr) generated owing to abnormalities of rotating parts are calculated based rotational speed signals (step S107).

On the other hand, reference values (for example, sound pressure level or voltage level) used for abnormality diagnosis are calculated from the frequency spectra provided by the vibration analyzing portion 106 (step S108). Further, the reference values may be root-mean-square values or peak values of digital signals of measured spectra data at arbitrary time, or may be calculated based on the values.

Next, peak components larger than the reference values calculated at step S108 are sampled from the frequency spectra provided at step S106 and frequency values between peaks are calculated (step S109). Further, the frequency values between peaks and vibration generating frequency components of rotating parts at step S107 are compared (step S110), and when all of components do not coincide, it is determined that there is not a abnormality in the rotating parts (step S111). On the other hand, when any of the components coincides therewith, it is determined that a abnormality is present and the abnormal portion is specified (step S112) and a result of the checking is outputted to the control portion 84, and the outputting unit 90 of the monitor 93, the alarm 94 and the like (step S113).

In this way, according to the embodiment, the peaks of the spectra larger than the reference values calculated based on the spectra provided by the frequency analysis are sampled, the frequencies between peaks and the frequency components owing to damages of the rotating parts calculated based on the rotational speed signals are compared and checked, presence or absence of abnormalities of the rotating parts are determined and abnormal portions are specified based on a result of the checking and therefore, presence or absence of abnormalities can be determined and abnormal portions can be specified with excellent accuracy even when the rotational speed data used for calculation is deviated from the actual rotational speed in a case in which the actual rotational speed cannot directly be inputted.

Further, according to the abnormality diagnosing apparatus and the abnormality diagnosing method of the invention, presence or absence of abnormalities can be determined and abnormal portions can be specified without disassembling the machine equipment integrated with the rotating parts by a simple constitution, labor required for disassembling or integrating the apparatus can be reduced, and damage of the parts in accordance with disassembling or assembling can be prevented.

Further, according to the abnormality diagnosing apparatus and the abnormality diagnosing method of the embodiment, the signal processing portion is constituted by a microcomputer and therefore, the signal processing portion is unitized and small-sized formation or module formation of the abnormality diagnosing apparatus can be achieved.

Fifth Embodiment

Figure 13:
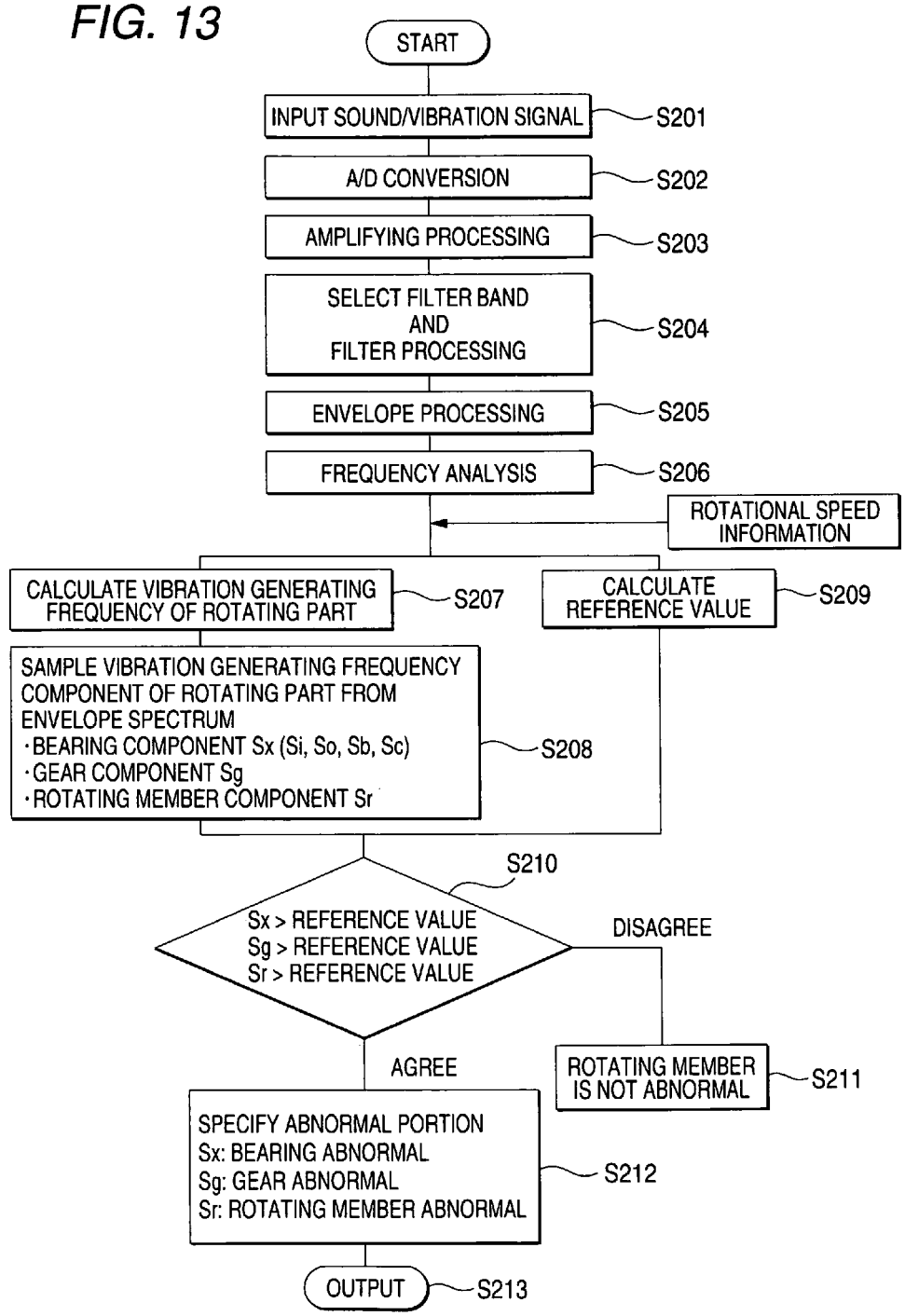
FIG. 13 is a flowchart showing a processing flow of a abnormality diagnosing method according to a fifth embodiment of the invention.

Next, a abnormality diagnosing apparatus according to a fifth embodiment will be explained in reference to FIG. 13. Further, portions equivalent to those of the fourth embodiment are attached with the same notations and an explanation thereof will be omitted or simplified.

The embodiment differs from the fourth embodiment in the processing at the comparing and determining portion 108 of the signal processing portion 82. The comparing and determining portion 108 according to the embodiment compares and checks the frequency components owing to the rolling bearing 62, the gear, the wheel and the frequency components of the measured spectrum data of the vibrations by the vibration analyzing portion 106 with variable allowable widths. According to the embodiment, whereas the comparing and determining portion 108 calculates the reference values (for example, sound pressure level or voltage level) from the measured spectrum data, the comparing and determining portion 108 calculates the frequencies (vibration generating frequency) owing to the damages of the rolling bearing and the gear by using the relationships shown in FIG. 5 and FIG. 6, samples sound pressure levels (or voltage levels) within the ranges of providing the variable allowable widths to the vibration generating frequencies from the measured spectrum data to compare with the reference values. Further, the comparing and determining portion 108 determines presence or absence of the abnormality and specifies the abnormal portion based on a result of the determination.

Further, calculation of the vibration generating frequencies may be carried out therebefore similar to the fourth embodiment and when a similar diagnosis is carried out therebefore, data thereof may be stored to the inner data holding portion 110 and data may be used. Further, specification data of design of the respective rotating parts used for calculation are inputted to store beforehand.

Further, the variable allowable widths in comparing and checking can correspond to a change in the actual rotational speed (a change by influence of wear of the wheel in the railway vehicle or the like) when the variable allowable widths are in cooperation with the frequency bands or the rotational speeds constituting the objects by setting the frequency components such that the higher the frequency component, the larger the variable allowable width.

A specific example of a processing flow of a abnormality diagnosis based on the vibration signal will be explained in reference to FIG. 13.

First, also in the embodiment, processing (step S201 through step S206) similar to step S101 through step S106 of the fourth embodiment are carried out.

Next, from the relationships shown in FIG. 5 and FIG. 6, the vibration generating frequencies generated owing to the abnormalities of the respective rotating parts are calculated based on the rotational speed signal (step S207), sound pressure levels of abnormal frequency bands of respective rotating parts (in the case of the rolling bearing 62, bearing frequency component of damages Sx, that is, inner ring frequency component of damage Si, outer ring frequency component of damage So, rolling element frequency component of damage Sb and retainer frequency component of damage Sc, in the case of the gear, gear frequency component of damage Sg in correspondence with mesh, and in the case of the rotating member of a wheel or the like, wear of the rotating member or unbalance component Sr) having allowable width variable relative to the calculated frequencies are calculated (step S208).

On the other hand, similar to the fourth embodiment, the reference values (for example, sound pressure level or voltage level) used for the abnormality diagnosis are calculated from the frequency spectra provided from the vibration analyzing portion 106 (step S209).

Successively, the sound levels (or voltage levels) of the abnormal frequency bands of the respective rotating parts calculated at step S208 and the reference values calculated at step S209 are compared for the respective rotating parts having different various elements of design in turn (step S210). When all of the components do not coincide therewith, it is determined that the rotating parts are not abnormal (step S211). On the other hand, when any of the components coincide therewith, it is determined that abnormality is present and the abnormal portion is specified (step S212), and a result of the checking is outputted to the controlling portion 84, the outputting unit 90 of the monitor 93, the alarm 94 and the like (step S213)

In this way, according to the embodiment, the frequency components of the measured specter data provided by frequency analysis and the frequency components owing to the rotating parts are compared and checked with variable allowable widths, presence or absence of abnormalities of rotating parts and abnormal portions are determined based on a result of the checking and therefore, presence or absence of abnormalities can be determined and abnormal portions can be specified with excellent accuracy even when the rotational speed data used for calculation is deviated from the actual rotational speed in a case in which the actual rotational speed cannot directly be inputted.

Other constitution and operation are similar to those of the fourth embodiment.

Sixth Embodiment

Figure 14:
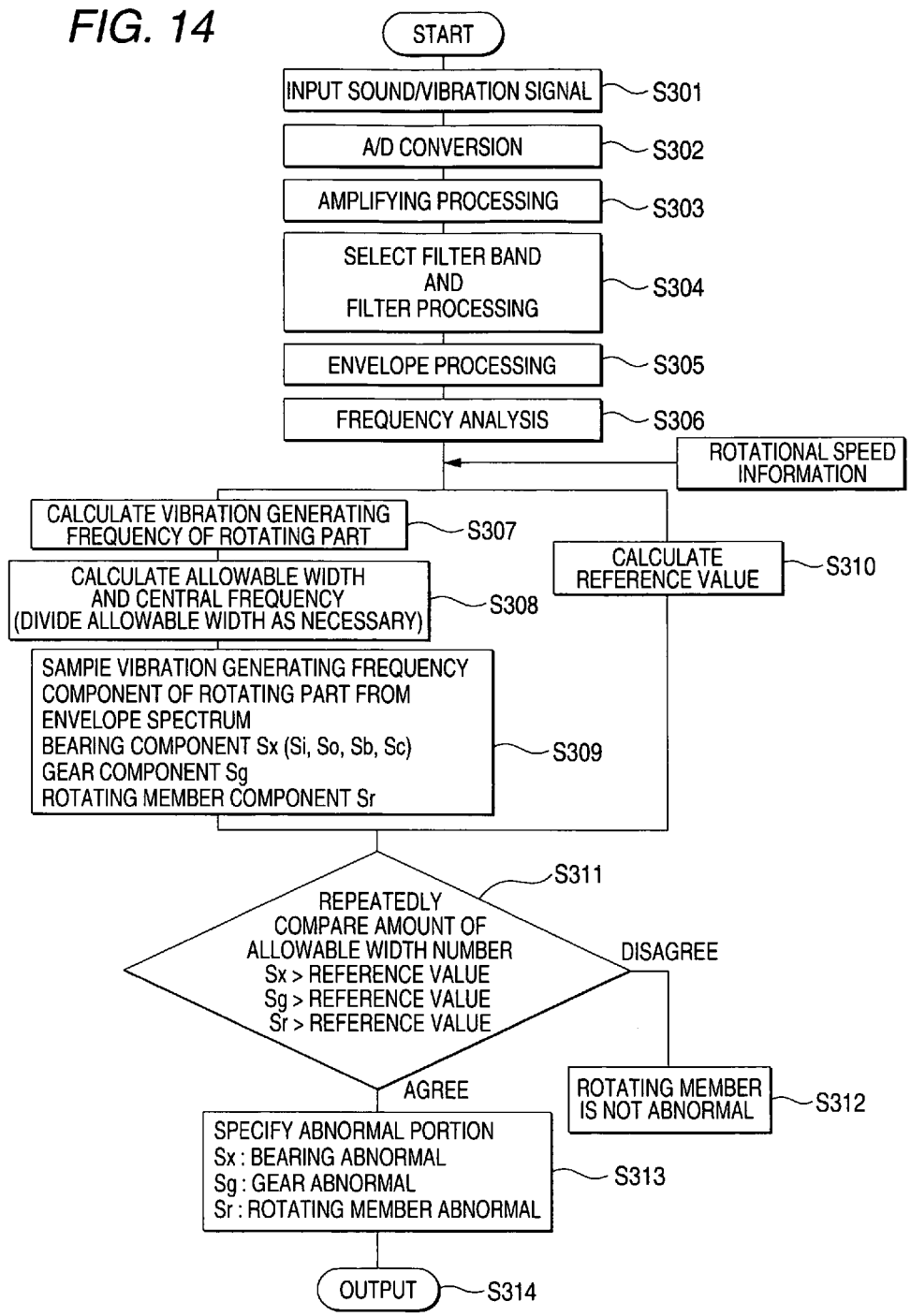
FIG. 14 is a flowchart showing a processing flow of a abnormality diagnosing method according to a sixth embodiment of the invention.

Next, a detailed explanation will be given of a abnormality diagnosing apparatus and a abnormality diagnosing method according to a sixth embodiment of the invention in reference to FIG. 14. Further, portions equivalent to those of the fifth embodiment are attached with the same notations and an explanation thereof will be omitted or simplified.

The embodiment differs from the fifth embodiment in the processing at the comparing and determining portion 108 of the signal processing portion 82. Also in the embodiment, as shown by a processing flow of FIG. 14, step S301 through step S306 are carried out similar to step S101 through step S106 of the fourth embodiment.

Next, from the relationships shown in FIG. 5 and FIG. 6, the vibration generating frequencies generated owing to abnormalities of respective rotating parts are calculated based on the rotational speed signals (step S307). Further, there are calculated allowable widths constituting zones having upper limit frequencies and lower limit frequencies of the frequency component of damages of the rotating parts at respective specification data calculated from the rotational speeds of the rotating parts and dimensional specification of the rotating parts and central frequencies of the widths (step S308). Further, at step S308, as necessary, the allowable width is divided to one or more of widths, central frequencies with regard to the respective widths are calculated, and allowable widths having widths of arbitrary sizes are provided to the central frequencies. Further, the allowable width may be set to increase in correspondence with the frequency band.

Thereafter, there are calculated sound pressure levels of abnormal frequency bands of the rotating parts having allowable widths for frequencies calculated at step S307 (in the case of the rolling bearing 62, bearing frequency component of damages Sx, that is, inner frequency component of damage Si, outer ring frequency component of damage So, rolling element frequency component of damage Sb and retainer frequency component of damage Sc, in the case of the gear, gear frequency component of damage Sg in correspondence with mesh, and in the case of the rotating member of a wheel or the like, wear of the rotating member or unbalance component Sr) (step S309).

On the other hand, similar to the fifth embodiment, reference values (for example, sound pressure levels or voltage levels) used for abnormality diagnosis are calculated from the frequency spectra provided at the vibration analyzing portion 106 (step S310), the sound pressure levels (or voltage levels) of the abnormal frequency bands of the respective rotating parts calculated at step S309 and the reference values calculated at step S310 are compared for respective rotating parts having different various elements of design in turn (step S311). Further, at step S311, comparisons are repeated by an amount of a number of times of dividing the allowable width of the frequency.

Further, when all of the components do not coincide therewith, it is determined that the rotating parts are not abnormal (step S312). On the other hand, when any of the components coincides therewith, it is determined that the abnormality is present and the abnormal portion is specified (step S313), and a result of the checking is outputted to the controlling portion 84 and the outputting unit 90 of the monitor 93, the alarm 94 and the like (step S314).

Further, in a case in which abnormality is present in the rotating part, when the allowable width is divided at step S308, there is a case in which it is determined that abnormality is present at any of the divided allowable widths. Therefore, when diagnosis of an amount of two allowable widths is carried out, at step S311, at a time point of determining that the abnormality is present as a result of diagnosis at a first width, it is possible that the diagnosis at a second width is not carried out, after diagnosing as normal by the first width, the diagnosis at the second width is carried out.

The vibration generating frequencies generated owing to abnormalities of the respective rotating parts at step S309 are provided by the rotational speeds and the dimensional specification data of design as shown by the relationships of FIG. 5 and FIG. 6 and therefore, rotational speed fluctuation and differences in the specification data of dimension of design hamper high accuracy diagnosis. Therefore, it is effective to set the allowable widths as step S308 when the rotating parts are provided with a plurality of rotating parts having dimensional specification different from each other, or when the actual rotational speed signals cannot directly be inputted and the rotational speeds of the rotating parts are varied.

For example, even when the actual rotational speed signal cannot directly be inputted, there is a case in which the width of a fluctuation of the rotational speed when rotated at a constant rotational speed is known. In this case, the allowable width is calculated by calculating a characteristic frequency component owing to the damage of the rotating part based on a lower limit rotational speed and an upper limit rotational speed, when the allowable width is large, a number of frequency components other than the frequency component of damage of the rotating part are included and the diagnosis accuracy is deteriorated. Therefore, the allowable width is divided as necessary, the central frequencies with regard to the respective divided widths are calculated, allowable widths having widths of arbitrary sizes are provided for the central frequencies, comparing and checking are carried out by an amount of a number of the divided allowable widths and the diagnosis can be carried out with high accuracy without being influenced by variations in the rotational speeds.

Therefore, according to the abnormality diagnosing apparatus and the abnormality diagnosing method of the embodiment, a zone having the upper limit value and the lower limit value calculated from the rotational speed of the rotating part and the dimensional specification data of design of the rotating part is divided into at least one zone, central values of the respective divided zones are calculated, comparing and checking are carried out by providing at least one allowable width of an arbitrary size provided to the central value and therefore, even when the plurality of rotating parts having dimensional specification different from each other are integrated to arbitrary portions or even when the rotational speeds of the rotating parts are varied, presence or absence of abnormality or the abnormal portion can firmly be specified, and the diagnosis can be carried out with high accuracy. Further, thereby, labor in which parts having the same various elements need to be assembled as in the background art can be saved, even when parts of different various elements are assembled, the diagnosis can be carried out and therefore, the operational efficiency can be promoted and effective maintenance can be carried out.

Further, the abnormality diagnosis of the embodiment is effective even in a case of a machine equipment in which rotating parts are provided with a plurality of rotating parts having dimensional specification design different from each other and rotational speeds of the rotating parts are varied.

Further, in the abnormality diagnosis of the bearing, respective frequency components shown in FIG. 5 are constituted by multiplications of the rotational frequency by an integer and therefore, when various elements of the bearing are previously known, the central frequencies can also be calculated without calculating the upper and the lower frequencies in accordance with variations in the rotational speed.

Further, the abnormality diagnosis of the embodiment is not applied only to the frequency spectrum of carrying out the envelope processing but is applicable to any method of diagnosing presence or absence of the frequency component owing to the damage of a rotating part from information of the rotational speed.

Seventh Embodiment

Next, a abnormality diagnosing apparatus according to a seventh embodiment will be explained in reference to FIG. 15 and FIG. 16. Further, portions equivalent to those of the fourth embodiment are attached with the same notations and an explanation thereof will be omitted or simplified.

Figure 15:
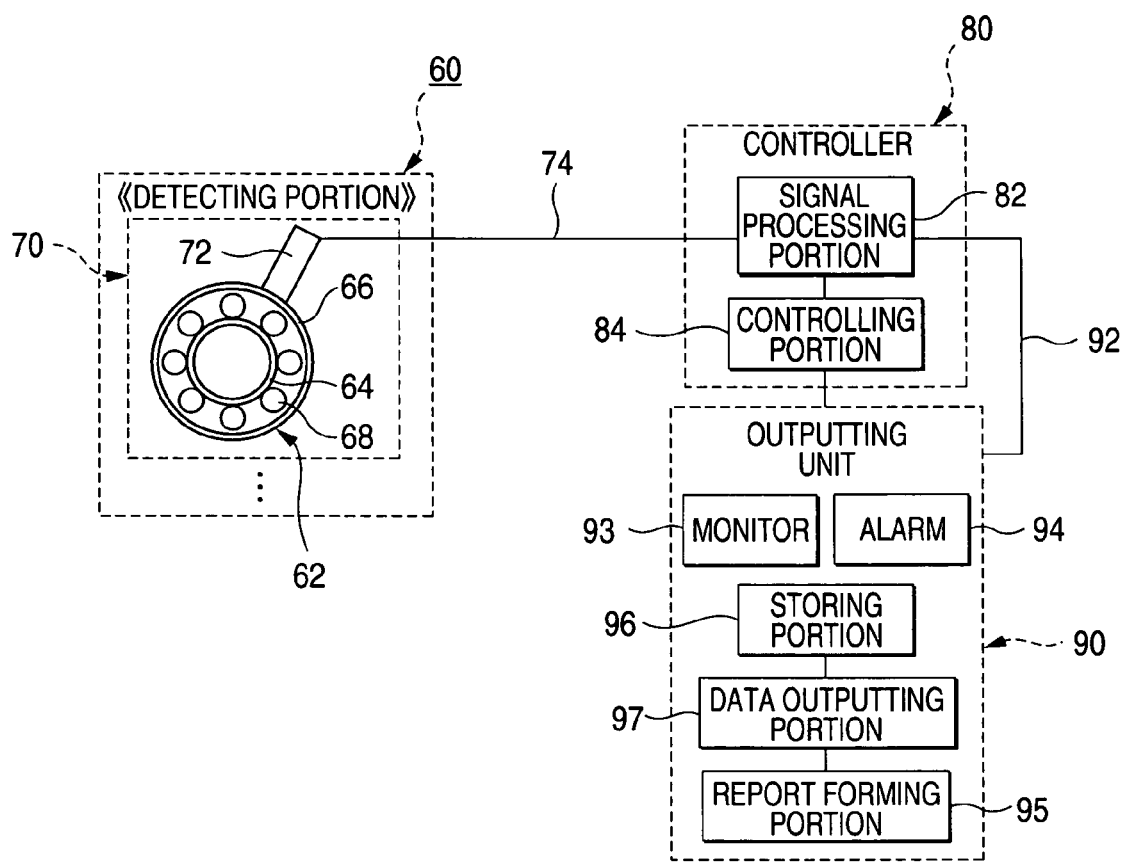
FIG. 15 is an outline diagram of a abnormality diagnosing apparatus according to a seventh embodiment of the invention.

As shown by FIG. 15, the abnormality diagnosing apparatus includes the detecting portion 70 for detecting the signal generated from the machine equipment 60, the controller 80 including the signal processing portion 82 having a constitution similar to that of FIG. 11 for determining a state of abnormality or the like of the machine equipment 60 from the electric signal outputted by the detecting portion 70 and the controlling portion 84 for controlling to drive the machine equipment 60, and the outputting unit 90 of the monitor 93, the alarm 94, the report forming portion 95 and the like.

The comparing and determining portion 108 of the signal processing portion 82 compares and checks the frequency components owing to the rolling bearing 62, the gear, the wheel and the frequency components of measured spectrum data of vibrations by the vibration analyzing portion 106. According to the embodiment, whereas the comparing and determining portion 108 calculates a reference value (for example, sound pressure level or voltage level) from a limited frequency range of measured specter data, the comparing and determining portion 108 calculates the frequency (vibration generating frequency) owing to damage of the rolling bearing or the gear by using the relationships shown in FIG. 5 and FIG. 6, samples the sound pressure level at the vibration generating frequency from measured spectrum data to compare with the reference value. Further, the comparing and determining portion 108 determines presence or absence of abnormality and specifies the abnormal portion based on a result of determination.

Further, calculation of the vibration generating frequency may be carried out therebefore, when a similar diagnosis is carried out therebefore, date may be stored to the inner data holding portion 110 and the data may be used. Further, various element data of design of respective rotating parts used for calculation are inputted to store beforehand.

Further, a result of determination by the comparing and determining portion 108 may be held at the inner data holding portion 110 of the memory, HDD or the like or may be transmitted to the outputting unit 90 by way of the data transmitting unit 92. Further, a result of determination may be outputted to the controlling portion 84 for controlling operation of the mechanism of driving the machine equipment 60 and the control signal in accordance with the result of determination may be fed back.

Further, the outputting unit 90 may display the result of determination at the monitor 93 or the like in real time, or may notify abnormality by using the alarm 94 of light, buzzer or the like when abnormality is detected.

Further, the outputting unit 90 includes the storing portion 96 for storing a result of diagnosis of presence or absence of abnormality, an abnormal portion, spectrum waveform (measured spectrum data) in diagnosis provided by the signal processing portion 82, the data outputting portion 97 for outputting the result of diagnosis by a predetermined style, and the report forming portion 95 for forming a report based on at least one program from a result of output outputted by the data outputting portion 97. Thereby, the report forming portion 95 can easily carry out operation of forming the report based on a result of diagnosis.

Here, the predetermined style is a style requested for processing at the report forming portion 95. Further, all of the object data may be outputted to be selected by the report forming portion 95 or object data may be selected and thereafter outputted at the data outputting portion 97.

Next, an explanation will be given of a specific example of a processing flow of abnormality diagnosis based on the vibration signal in reference to FIG. 16.

Figure 16:
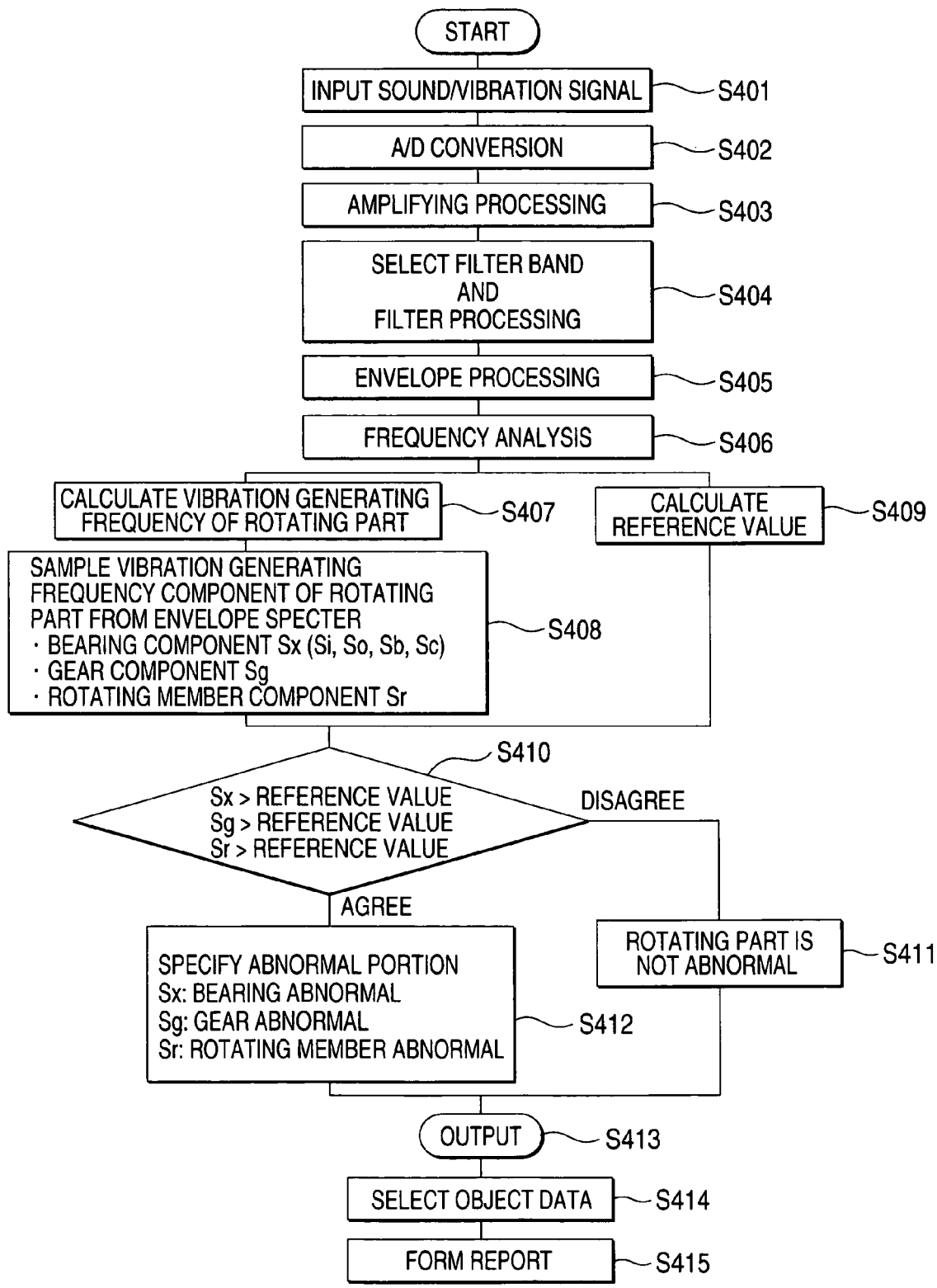
FIG. 16 is a flowchart showing a processing flow of a abnormality diagnosing method according to the seventh embodiment of the invention.

Also in the embodiment, as shown by a processing of FIG. 16, step S401 through S406 are carried out similar to step S101 through step S106 of the fourth embodiment.

Next, from the relationships shown in FIG. 5 and FIG. 6, vibration generating frequencies generated owing to abnormalities of respective rotating parts are calculated based on rotational speed signals (step S407), there are calculated sound pressure levels of abnormal frequency bands of respective rotating parts in correspondence with calculated frequencies (in the case of the rolling bearing 62, bearing frequency component of damages Sx, that is, inner ring frequency component of damage Si, outer ring frequency component of damage So, rolling element frequency component of damage Sb and retainer frequency component of damage Sc, in the case of the gear, gear frequency component of damage Sg in correspondence with mesh, and in the case of the rotating member of the wheel or the like, wear of the rotating member or unbalance component Sr) (step S408).

On the other hand, reference values (for example, sound pressure levels or voltage levels) used for abnormality diagnosis are calculated from frequency spectra provided by the vibration analyzing portion 106 (step S409). Here, the reference value of the embodiment is calculated by using a limited frequency range of the measured spectrum data at arbitrary time. That is, the reference value may be an root-mean-square value (root mean square of frequency spectrum) of spectrum data in a predetermined frequency range calculated by eliminating a plurality of spectra from the provided frequency range (for example, upper 10 pieces and lower 10 pieces) in order to reduce influence of noise of a DC component or the like, or may be calculated based on Equations (1) and (2) shown below based on the root-mean-square value.

(reference value)=(root-mean-square value)+α (1)

(reference value)=(root-mean-square value)×β (2)

where α, β: predetermined values variable by kinds of data.

Further, the reference value may be calculated by using an average value or a peak value of measured spectrum data arbitrary time in place of the root-mean-square value.

Successively, sound pressure levels (or voltage levels) of the abnormal frequency bands of respective rotating parts calculated at step S408 and the reference values calculated at step S409 are compared for respective rotating parts having different various elements of specification design in turn (step S410). When all of the components do not coincide therewith, it is determined that the rotating parts are not abnormal (step S411). Meanwhile, when any of the components coincides therewith, it is determined that there is abnormality and the abnormal portion is specified (step S412) and a result of the checking is outputted to the controlling portion 84 and the outputting unit 90 of the monitor 93, the alarm 94 and the like (step S413). Further, at step S413, a result of diagnosis provided at steps S411, S412 is stored to the storing portion 96 of the outputting unit 90. Further, when a report is formed, a result of diagnosis stored to the storing portion 96 is transmitted to the data outputting portion 97, and object data is selected from data transmitted to the data outputting portion 97 (step S414). Further, selected object data is transmitted to the report forming portion 95 having a report forming program and the report based on the result of diagnosis is formed (step S415).

In this way, according to the embodiment, when the frequency component of the measured specter data and the frequency component owing to the part are compared and checked, the reference value used in comparing and checking is calculated by the root-mean-square value, the average value, or the peak value based on the limited frequency range of the measured spectrum data and therefore, diagnosis accuracy can be promoted by making influence of noise of a DC component or the like difficult to be effected, presence or absence of abnormality can be determined and the abnormal portion can be specified.

Further, according to the abnormality diagnosing apparatus and the abnormality diagnosing method of the embodiment, there are provided the storing portion 96 for storing the result of diagnosis of presence or absence of abnormality, the abnormal portion, spectrum waveform in diagnosing (measured spectrum data) provided by the signal processing portion 82, the data outputting portion 97 for outputting the result of diagnosis by a predetermined style, and the report forming portion 95 of forming the report based on at least one program from the output result outputted by the data outputting portion 97 and therefore, the report can simply be formed by outputting the result of diagnosis accumulated by a large amount in a predetermined style of data of a portion constituting an object as necessary.

Other constitution and operation are similar to those of the fourth embodiment.

Further, although according to the embodiment, the storing portion 96 for storing the result of diagnosis is provided at inside of the outputting unit 90, the storing portion 96 may be provided at inside of the controller 80 and the result of diagnosis may be transmitted to the data outputting portion 97 by way of the data transmitting unit 92 in forming the report.

Eighth Embodiment

Figure 17:
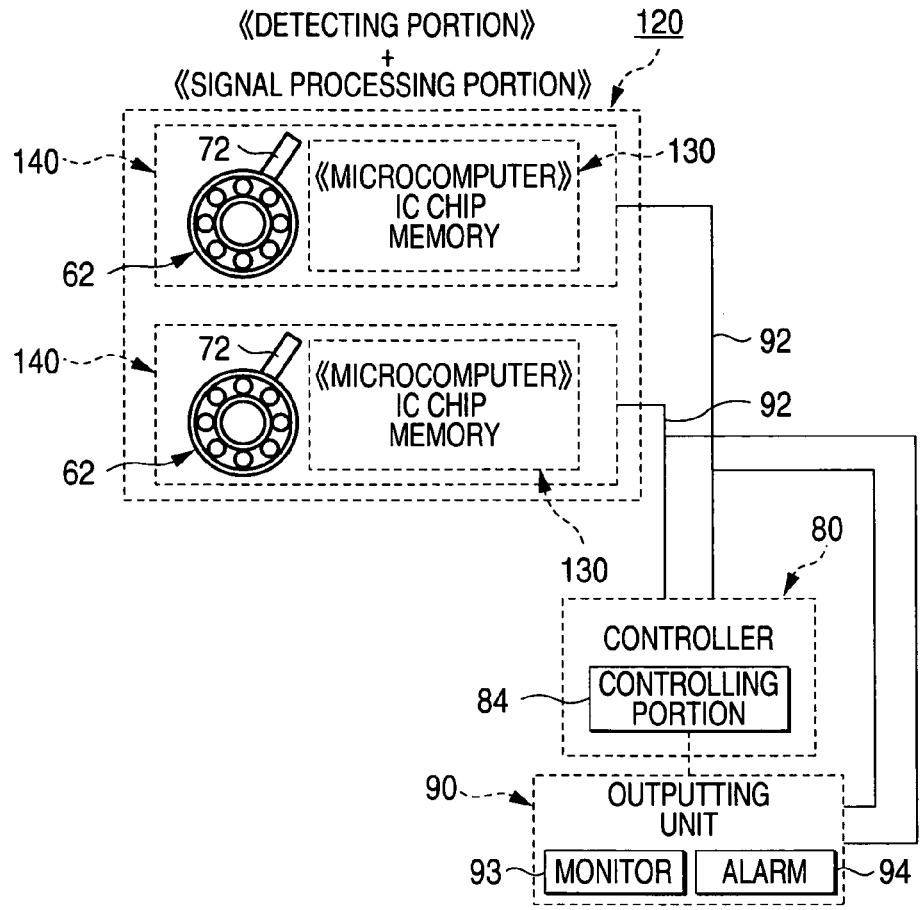
FIG. 17 is an outline diagram of a abnormality diagnosing apparatus according to an eighth embodiment of the invention.

Next, a detailed explanation will be given of a abnormality diagnosing apparatus and a abnormality diagnosing method according to an eighth embodiment of the invention in reference to FIGS. 17 through 19. Further, portions equivalent to those of the fourth embodiment are attached with the same notations and an explanation thereof will be omitted or simplified.

According to the embodiment, as a abnormality diagnosing apparatus of a machine equipment 120 including a plurality of the rolling bearings 62, 62, a single processing unit 140 installed in a detecting portion including the sensor 72 and a signal processing portion comprising a microcomputer 130 is assembled into a bearing unit of the rolling bearing 62. Thereby, the abnormality diagnosing apparatus can concentratedly carry out a control and therefore, efficient monitoring can be carried out. Further, by integrating the single processing unit to inside of the bearing unit, an advantage of making a total of the apparatus compact is achieved, which is preferable. Further, compact formation may be achieved by integrating the single processing unit to inside of the machine equipment, further, the single processing unit may be constituted for a plurality of the rolling bearings.

Figure 18:
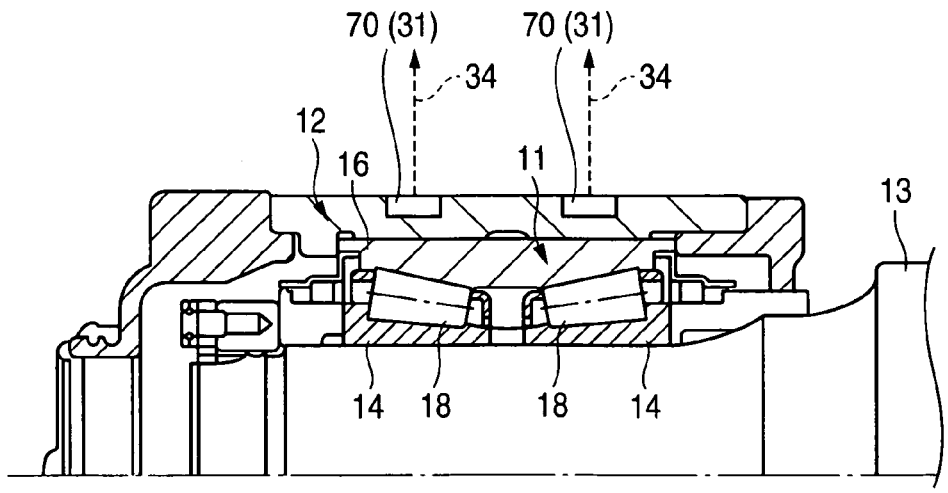
FIG. 18 is a sectional view of a bearing unit for a railway vehicle which is a machine equipment integrated with a detecting portion of a abnormality diagnosing apparatus.
Figure 19:
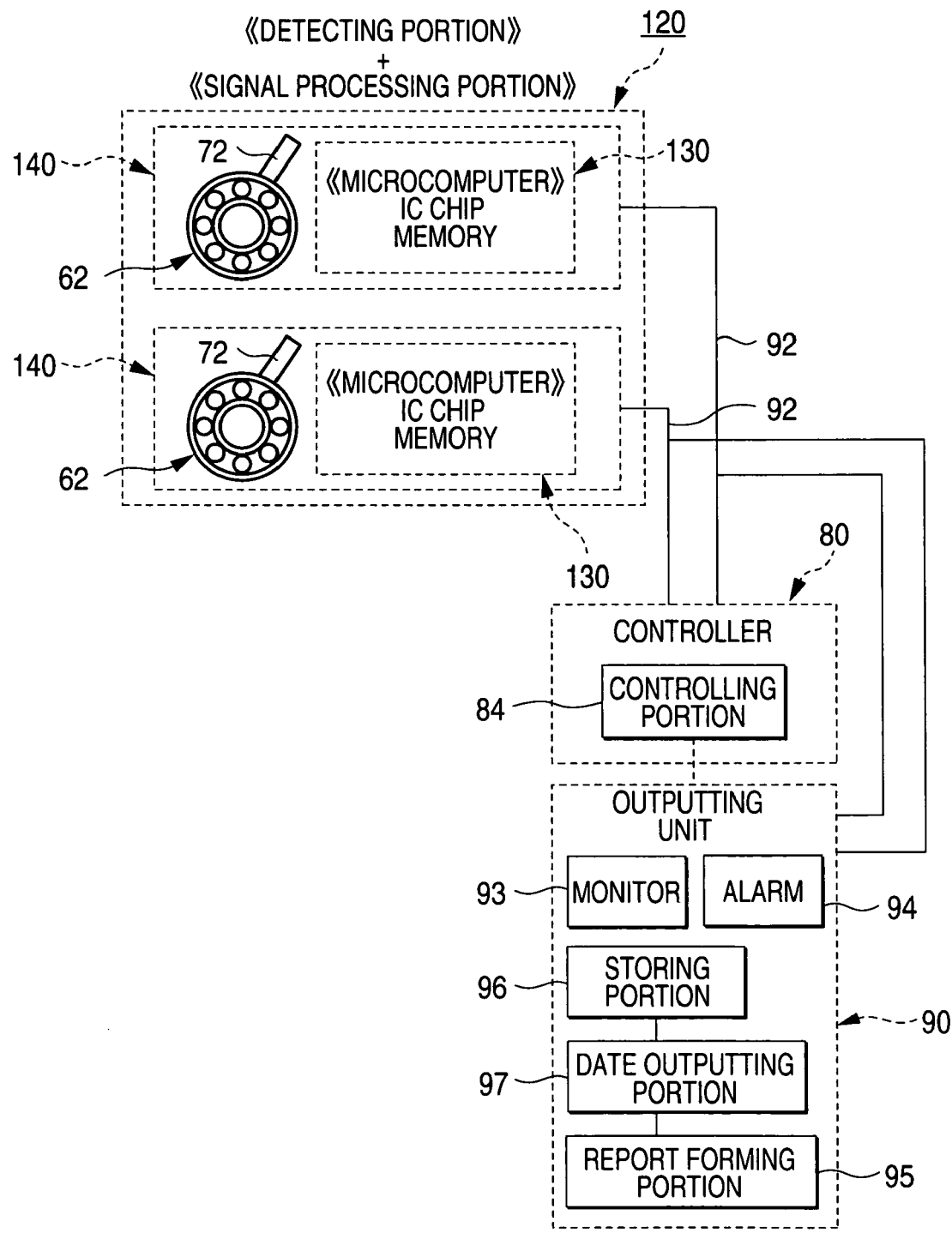
FIG. 19 is an outline diagram of a abnormality diagnosing apparatus integrated with the eighth embodiment and the seventh embodiment of the invention.

For example, according to a bearing unit for a railway vehicle shown in FIG. 18, the axle 13 is rotatably supported by the bearing box 12 constituting a portion of the carriage for the railway vehicle by way of the double row tapered roller bearing 62 (11), detecting portions 70 (31), 70 (31) are fixed to the loaded zone of the radial load of the bearing box 12, and abnormality is diagnosed by detecting vibration of the bearing box 12. Also in this case, electric signals from the respective detecting portions 70 (31), 70 (31) can be processed by the single processing unit 140.

Other constitution and operation are similar to those of the fourth embodiment and are applicable also to those of the fifth through the seventh embodiments. Further, FIG. 19 shows an example of applying the embodiment to the seventh embodiment.

Ninth Embodiment

Next, a detailed explanation will be given of a abnormality diagnosing apparatus and a abnormality diagnosing method according to a ninth embodiment of the invention in reference to FIG. 20 through FIG. 23.

As shown by FIG. 20, the one railway vehicle 200 is supported by two front and rear carriages, and each carriage is attached with 4 pieces of the wheels 204. A bearing box of each wheel 204 is attached with the vibration sensor 201 constituting a detecting portion comprising a piezoelectric type acceleration sensor or the like for outputting a vibration acceleration in a direction orthogonal to the ground face. Further, a vibration sensor for measuring a vibration acceleration in an advancing direction of the railway vehicle 200 or in an axial direction of the wheel may further be attached.

Figure 21:
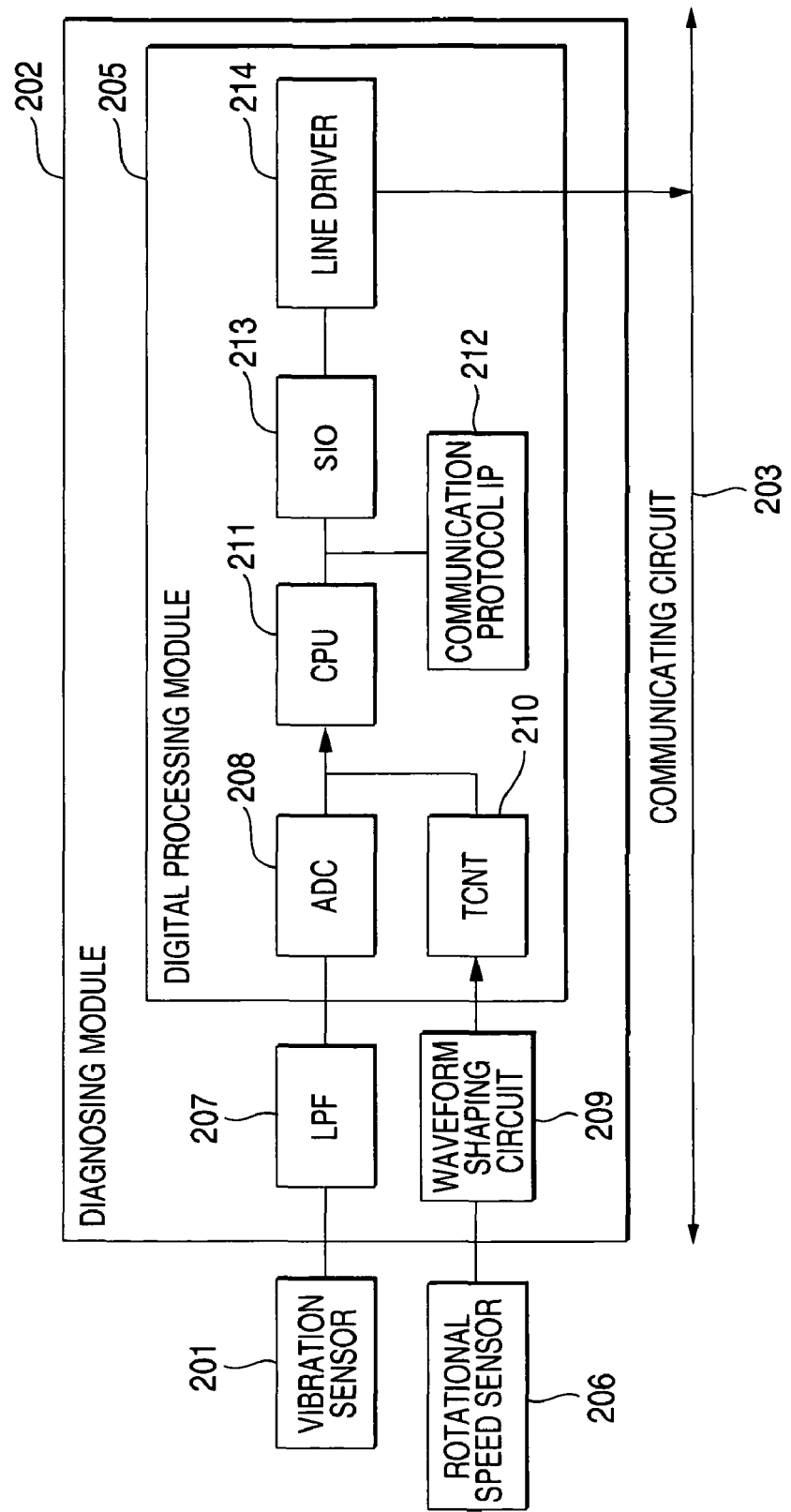
FIG. 21 is a block diagram of a abnormality diagnosing module shown in FIG. 20.

The output of the vibration sensor 201 is processed by the abnormality diagnosing module 202 constituting a signal processing portion installed at a control panel of the vehicle 200. As shown by FIG. 21, the abnormality diagnosing module 202 includes the digital processing module 205 for diagnosing a abnormality by a digital processing. A vibration waveform detected by the vibration sensor 201 is converted into a discrete value by the AD converter (ADC) 208 by way of the low pass filter (LPF) 207 and is inputted to CPU 211. Here, a frequency of a vibration generated by flat constituting a abnormality of the wheel 204 is concentrated to a frequency zone lower than 1 kHz in power thereof and is widened also to a zone higher than 1 kHz. The low pass filter 207 promotes an S/N ratio by attenuating the frequency equal to or larger than 1 kHz having a large noise component.

Further, a pulse signal detected by the rotational speed sensor 206 of an encoder or the like is shaped into a pulse by the waveform shaping circuit 209, by counting the pulse by the time counter (TCNT) 210, a rotational speed signal is inputted to CPU 211 and CPU 211 analyzes abnormality diagnosis based on the vibration waveform and the rotational speed signal.

Further, a result of diagnosis diagnosed by CPU 211 is transmitted from the serial interface (SIO) 213 of, for example, USB or the like to the communication network 203 by way of the line driver 214 based on the communication protocol IP 212 configuring the transmitting unit. Therefore, according to the embodiment, the digital processing module 205 is constituted by the AD converter 208, the timer counter 210, CPU 211, the communication protocol IP 212, the serial interface 213, the line driver 214.

CPU 211 detects flat of the wheel 204 by processing waveform block data in which a sampling frequency fs and a sample number Ns are made to be constant when the rotational speed signal detected by the rotational speed sensor 206 is substantially a constant predetermined speed (185 through 370 $\min^{-1}$ according to the embodiment). Specifically, when fs=2 kHz, Ns=2000, a section length of block data=1 sec. By comparing a number of times of counting vibration waveform pulses by flat of the wheel in 1 second and a number of times of rotating the wheel 204 in 1 second derived from a vehicle speed detected by the rotational speed sensor 206, flat of the wheel is detected.

A vibration acceleration in a state of bringing about flat at the wheel 204 is frequently large, and a value of a vibration acceleration brought about by a vibration of a normal vehicle is frequently smaller than the above-described vibration frequency. Further, a vibration of a rail joint constitutes a level of a vibration acceleration equivalent to or larger than that of flat of the wheel. Further, also a level of a vibration acceleration derived from friction between a rail and the wheel 204 at a curve of the rail is also equivalent to those of flat of the wheel and the rail joint.

On the other hand, whereas an impact is brought about by flat of the wheel by one time per one rotation, in the case of an impact by the joint of the rail, the impact is brought about by a longer period, in the case of an impact by friction with the rail, the impact is not periodically brought about. Hence, according to the embodiment, attention is paid to a regularity of bringing about the impact (pulse) exceeding a threshold of the vibration acceleration particular to flat, a number of times of shockwaves per unit time at substantially constant speed is counted, and when a count number thereof coincide with a number of rotation of the wheel, a abnormality is diagnosed such that there is a high possibility of bringing about flat.

Further, according to the embodiment, there is designed as algorism of processing to diagnose the same wheel 204 repeatedly by using the sensors 201, 206, and the abnormality diagnosing module 202 mounted to the vehicle 200, and reliability of a abnormality diagnosis is promoted by a statistical determining method in consideration of a variation in a number of counting the pulse number, an influence of noise or the like.

Figure 22:
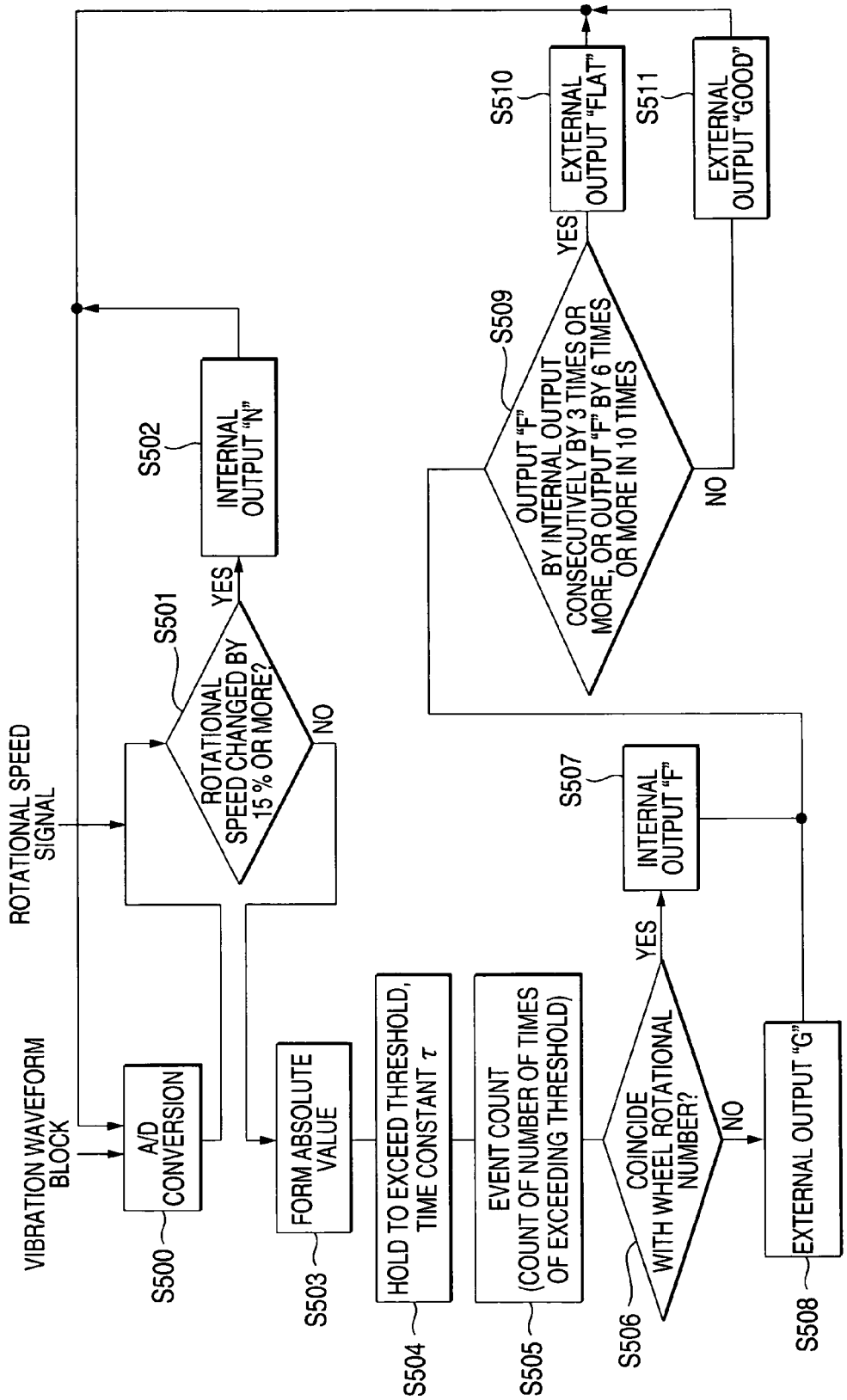
FIG. 22 is a flowchart showing a processing flow of the abnormality diagnosing module shown in FIG. 20.

A detailed explanation will be given of a abnormality diagnosing method of carrying out such processing in reference to a flowchart of FIG. 22.

First, the signal detected by the vibration sensor 201 is converted into a digital signal by the AD converter 208 (step S500), and the rotational speed signal is inputted from the rotational speed sensor 206. The abnormality diagnosis of the embodiment is executed in a section of running substantially at constant speed when the rotational speed falls in a range of 185 through 370 $\min^{-1}$ and therefore, it is determined whether the rotational speed in the section length of data is changed by 15% or more by rapid acceleration or deceleration (step S501). Further, when the rotational speed is changed by 15% or more, an internal output "N" is outputted and the abnormality diagnosis is not carried out (step S502).

On the other hand, when it is determined that the vehicle runs substantially at a constant speed, the digital signal converted by the AD converter 208 is formed into an absolute value to constitute an all wave rectified waveform (step S503), and data exceeding a threshold is held to a value exceeding the threshold by only a constant time period (τ) by a peak hold processing (step S504). The holding time period (τ) is determined by a rotational speed of a wheel and is made to be a value shorter than an amount of rotating the wheel by one time. A peak can be measured stably by the peak hold processing for forming the data into the absolute value to hold the constant period of time.

Further, a number of times of pulses exceeding the threshold is counted as an event count processing (step S505), and it is determined whether the count number coincides with the rotational number of the wheel (step S506). When the count number is recognized to coincide with the rotational number of the wheel, flat is determined to be present and an internal output "F" (Flat of the wheel) is outputted (step S507), and when the count number does not coincide with the rotational number of the wheel, flat is determined not to be present and "G" (Good) is outputted to outside (step S508). Further, according to the embodiment, there is a case of being influenced by the rail joint and therefore, also a count number of (wheel rotational number +1) is regarded to coincide with the wheel rotational number.

Figure 23A:
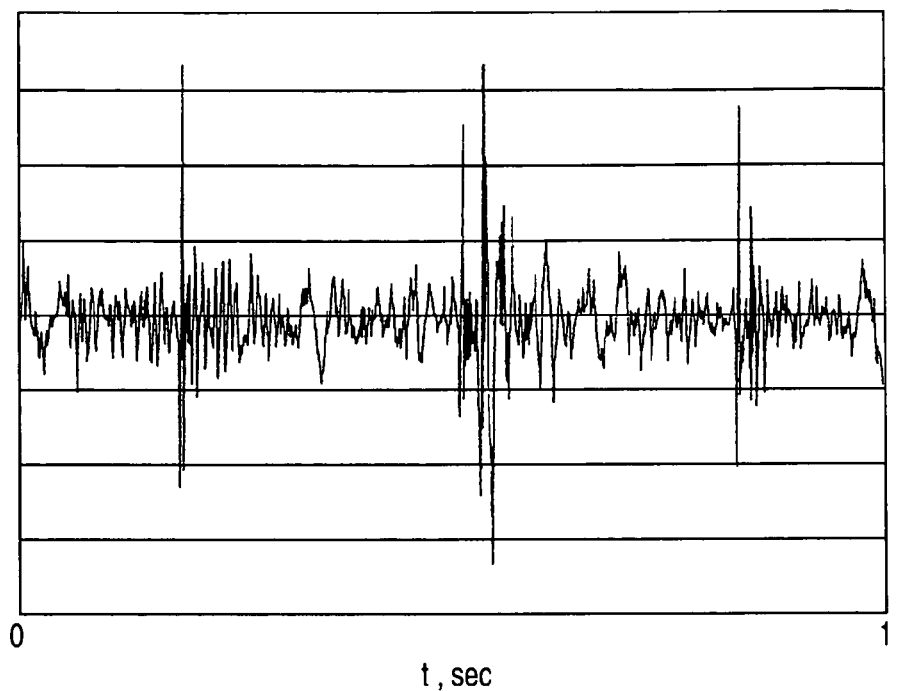
FIGS. 23A and 23B illustrate diagrams for explaining a processing waveform of a abnormality diagnosis according to the ninth embodiment of the invention.
Figure 23B:
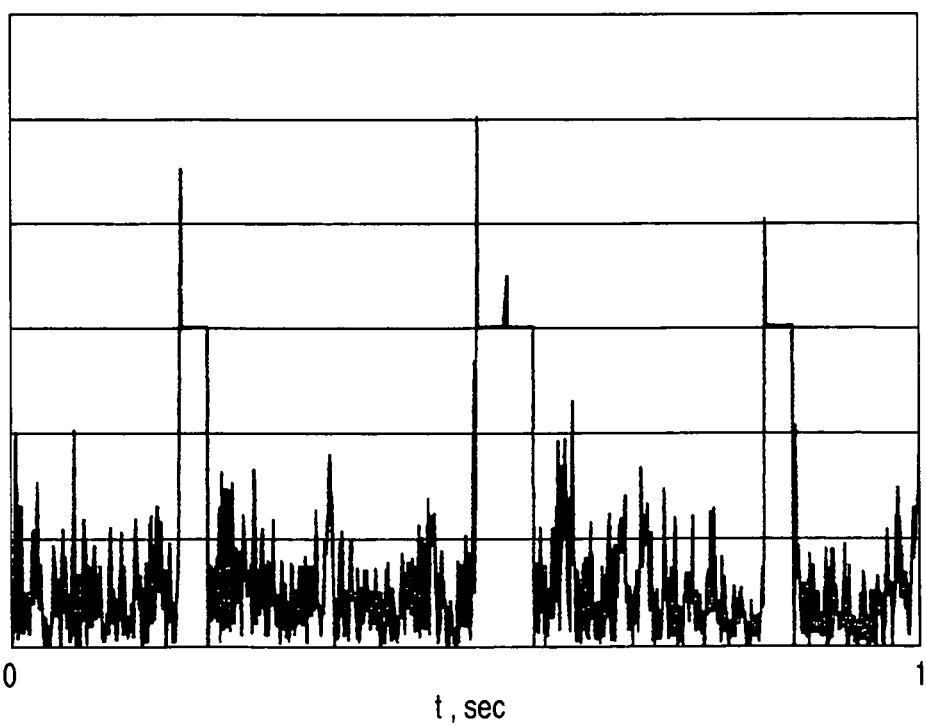

For example, the rotational speed of the wheel is substantially constant to be 185 $min^{-1}$, that is, about 3 rotations per second, and FIG. 23A shows a behavior of generating 3 times of shockwaves in a waveform of one second. According to the abnormality diagnosis, the peak holding time period τ is made to be 30 ms, during 30 ms in which the absolute value of the shockwave exceeds threshold once, the absolute value is held at the value of exceeding the threshold regardless of original data. When 30 ms has elapsed from a time point of exceeding the threshold first, the same processing is repeated, and when data reaches an amount of 1 second, a number of times of exceeding the threshold is counted from the converted waveform (threshold holding waveform). A waveform of FIG. 23B is produced by subjecting the waveform of FIG. 23A to the absolute value processing and the peak hold processing.

Further, according to the embodiment, a simple statistical determination based on, for example, any of following conditions is carried out by using the output provided by one time per second such that a diagnosis result with high reliability is achieved (step S509).

(1) Consecutive 3 times of "F" are outputted.

(2) In an effective data of past 10 times, 6 times or more of "F" are outputted.

In a case in correspondence with (1), (2), the wheel is firmly determined to bring about flat, "F" is outputted finally as an external output (step S510), in a case other than (1), (2), "G" is outputted as external output (step S511).

Further, a case of outputting "F" even when flat is not brought about is a case owing to an influence of noise of sound of friction between the wheel and the rail or the like, or an influence propagated from the wheel bringing about flat to a normal wheel by way of the axel or the rail or the like. In this case, a frequency of outputting "F" is smaller than that of the wheel bringing about flat of the wheel and therefore, an accurate determination can be carried out by a plurality of times of statistical processing as in (1), (2).

Further, when at step S510, "F" is outputted as the external output, a abnormality signal is outputted from the serial interface 213, the line driver 214 by way of the communication network 203 to alarm occurrence of a abnormality of flat of the wheel or the like from an outputting apparatus of the alarm or the like.

Therefore, according to the abnormality diagnosing apparatus and the abnormality diagnosing method of the embodiment, in the waveform of the vibration acceleration per unit time subjected to the low pass filtering during a time period of rotating the wheel 204 by N derived from the waveform of the vibration acceleration by the vibration sensor 201 attached to the bearing box of the wheel 204 and the rotational speed signal of the wheel 204 by the rotational speed sensor 206, in the waveform of holding a state of exceeding the threshold by a certain time period in accordance with the rotational speed when a previously set threshold is exceeded, the number of times of exceeding the threshold is counted, and occurrence of a abnormality of occurrence of flat of the wheel is alarmed by recognizing that the number of times of counting coincides with the rotational number of the wheel and therefore, the abnormality of the rotational part can accurately be specified by a comparatively simple circuit or a software.

Further, according to the embodiment, the abnormality is diagnosed based on the all wave rectified waveform after forming the absolute value without converting the waveform of flat to an envelope detecting waveform and therefore, an amount of operation is small and the diagnosis can be carried out simply.

Further, although according to the embodiment, the low pass filter (LPF) 207 is inserted between the vibration sensor 201 and the AD converter 208, according to a type of including LPF at inside of a sensor, the LPF 207 can simply be constituted by an LC filter or the like, further, when a frequency component other than flat of the wheel is restrained, a digital filter can also be provided at inside of the digital processing module 205. In this case, the digital filter can also be realized as the software of CPU.

Tenth Embodiment

Next, a detailed explanation will be given of a abnormality diagnosing apparatus and a abnormality diagnosing method according to a tenth embodiment of the invention in reference to FIG. 24 and FIG. 25. Whereas according to the ninth embodiment, the digital signal after the A/D conversion processing is subjected to peak hold by a bit processing, according to the embodiment, a peak hold processing is carried out at a stage of an analog signal before the A/D conversion processing. Further, portions equivalent to those of the ninth embodiment are attached with the same notations and an explanation thereof will be omitted or simplified.

Figure 24:
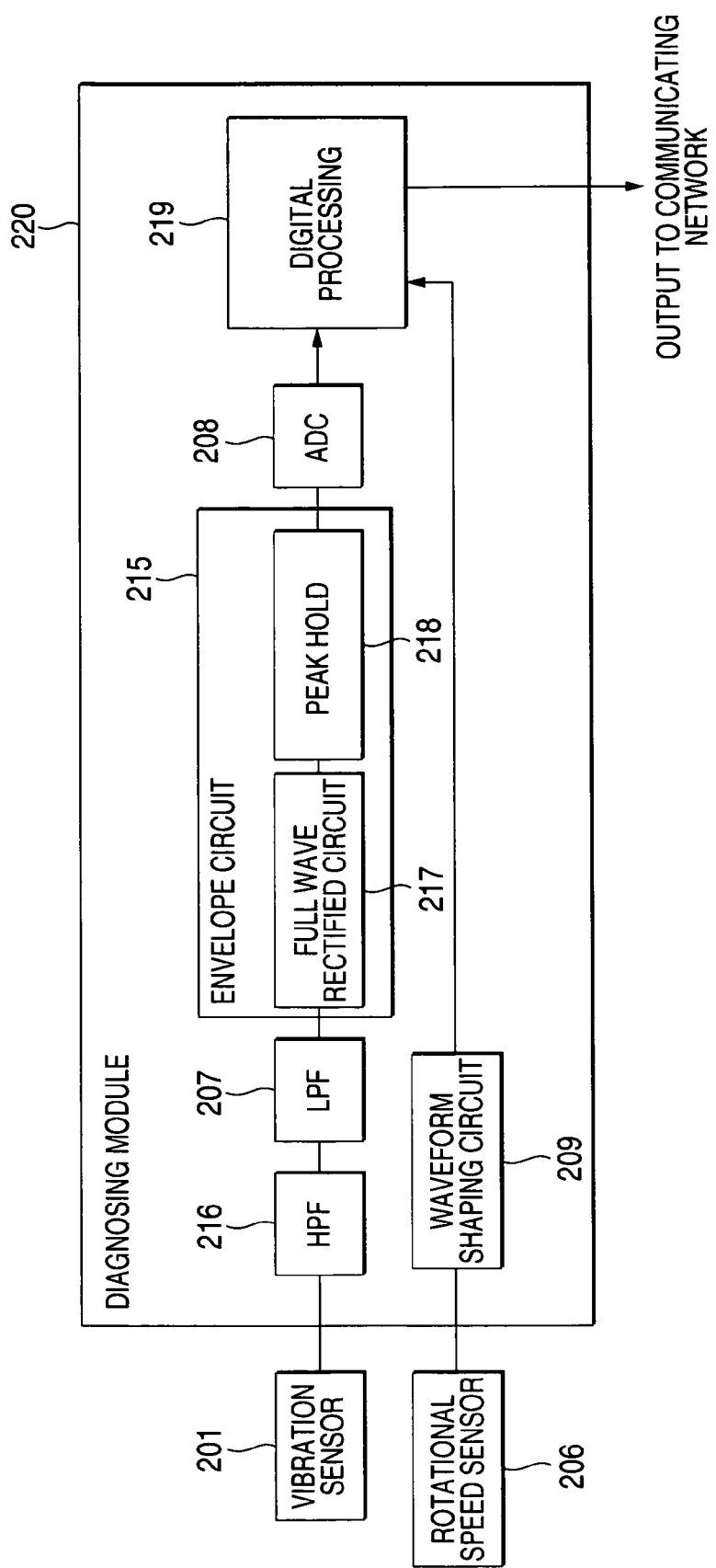
FIG. 24 is a block diagram of a abnormality diagnosing module according to a tenth embodiment of the invention.

The diagnosing module 220 according to the tenth embodiment is constructed by a constitution of inserting the envelope circuit 215 of analog processing between the vibration sensor 201 and ADC 208, as shown in the block diagram of the abnormality diagnosing module of FIG. 24. The envelope circuit 215 is constituted by a low pass filter, the full wave rectifier 217 as the absolute value circuit, the peak hold circuit 218 for analog and the like.

Therefore, according to the embodiment, the absolute value processing and the peak hold processing at step S503 and step S504 are carried out before A/D conversion (step S500), the digital processing portion 219 carries out processing similar to those of steps S501, S502, S505 through S511 of the ninth embodiment, a number of times of exceeding the threshold within a constant period of time is counted and in a case of a value in accordance with the rotational speed of the wheel an alarm signal is outputted by determining that the value constitutes flat of the wheel.

According to the embodiment, in comparison with the ninth embodiment, although the analog circuit is separately needed, the processing after having been digitized is simplified, and a sampling rate of A/D conversion at the AD converter 208 including the peak hold circuit can be made to be low.

An shockwaveform having a band up to about 1 kHz is constituted by flat of the wheel and therefore, in a case of the waveform constituted by passing through the low pass filter 207 as in the ninth embodiment, there is a concern of lowering the peak of the impact acceleration unless a sampling rate of about 2 kHz is adopted, however, when the peak hold circuit 218 is inserted to the analog circuit at a preliminary stage of the AD converter 208 as in the embodiment, even by sampling at about 200 Hz, a sufficient speed can be obtained for detecting flat of the wheel.

Also a time constant (τ) of the peak hold circuit 218 in this case is pertinently selected in accordance with a vehicle speed range between several ms through several tens ms. It is preferable to cut noise by inserting the low pass filter 207 to the preliminary stage of the AD converter 208 also for the waveform detected by envelope detection by the full wave rectifier 217.

Further, according to the embodiment, the high pass filter (HPF) 216 is provided at a preliminary stage of the envelope circuit 215. The high pass filter 216 is inserted for removing the DC component and a low frequency component extremely proximate thereto and may be a simple AC coupling capacitor. A ripple by the DC component of the envelope waveform can be restrained by the high pass filter 216.

Figure 25:
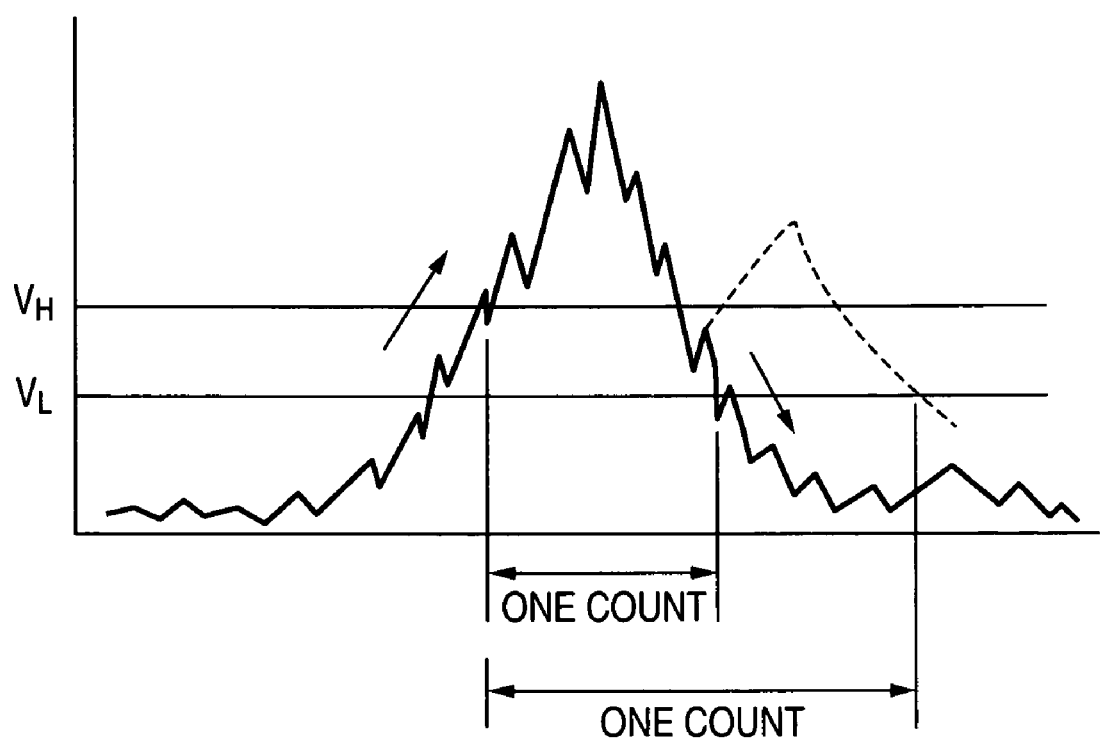
FIG. 25 is an explanatory diagram of an erroneous operation of the abnormality diagnosing module shown in FIG. 24.

Further, although according to a waveform designated by a dotted line in FIG. 25, there is a case of bringing about erroneous operation in counting a number of times of exceeding the threshold by an influence of ripple, the erroneous operation can be avoided by changing a height of the threshold such as rise $V_H$ and fall $V_L$. According to the embodiment, as shown in FIG. 25, when one time count is constituted after crossing $V_H$ in rising and successively crossing $V_L$ set to be lower than $V_H$ in falling, even the waveform as shown by the dotted line can accurately be counted. Naturally, such a processing stays to be equivalent even when counting is carried out by a hardware.

Further, other constitution and operation are similar to those of the ninth embodiment.

Eleventh Embodiment

Next, a detailed explanation will be given of a abnormality diagnosing apparatus and a abnormality diagnosing method according to an eleventh embodiment of the invention in reference to FIG. 26. According to the embodiment, a digital processing is made to substitute for the envelope circuit according to the tenth embodiment. Further, portions equivalent to those of the tenth embodiment are attached with the same notations and an explanation thereof will be omitted or simplified.

Figure 26:
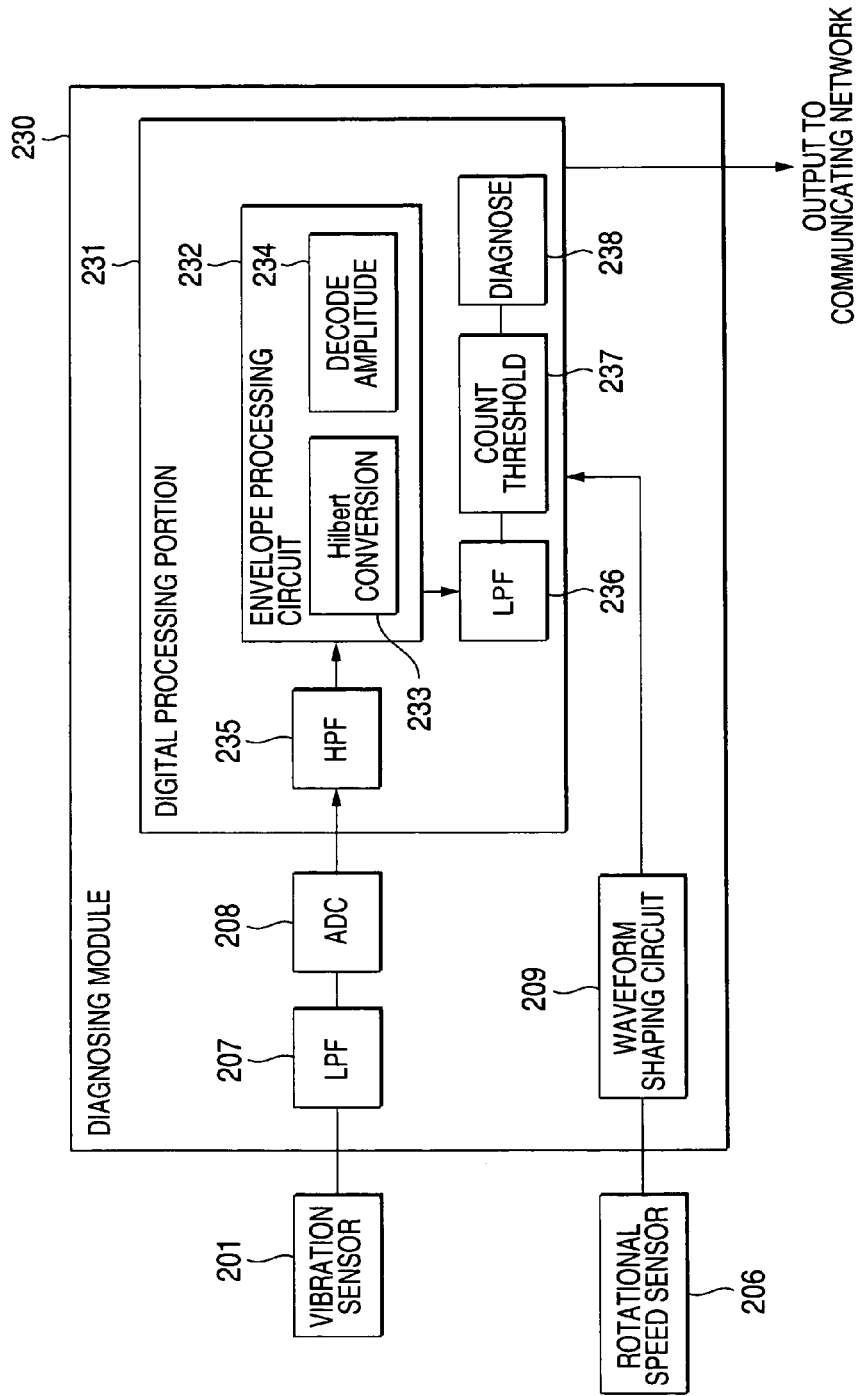
FIG. 26 is a block diagram of a abnormality diagnosing module according to an eleventh embodiment of the invention.

According to a diagnosing module 230 of the eleventh embodiment, as shown by FIG. 26, a digital processing portion 231 at a post stage of the AD converter 208 is constituted by a high speed processor of DSP or the like, a low frequency component is removed by the digital high pass filter (HPF) 235, the amplitude is decoded by the amplitude decoding 234 for calculating root mean square value from a complex signal of a real number portion and an imaginary number portion by the Hilbert conversion filter 233 of the envelope processing circuit 232 to provide an envelope waveform, further, remaining noise is cut by the digital LPF 236, a number of times is counted by the threshold counter 237 and presence or absence of flat of the wheel is determined by the diagnosing portion 238.

Figure 27A:
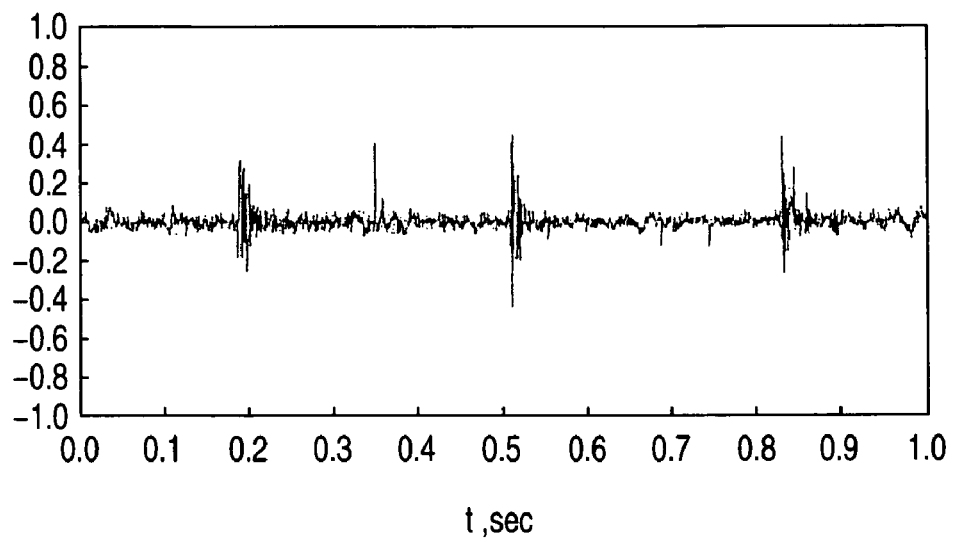
FIGS. 27A and 27B; illustrates diagrams for explaining a processing waveform of a digital processing portion shown in FIG. 26.
Figure 27B:
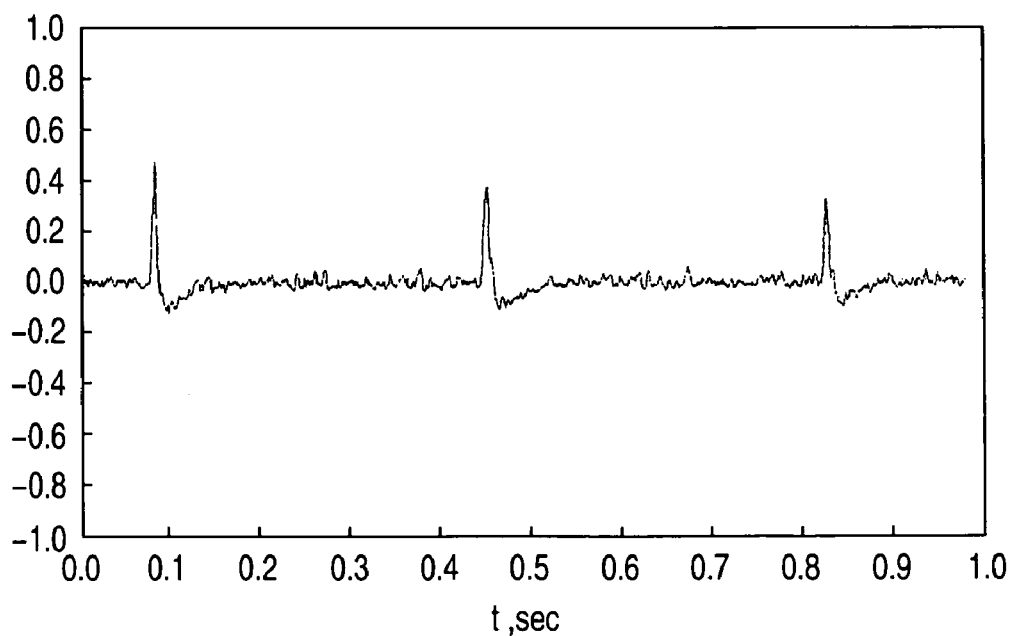

The digital processing portion 231 of the embodiment constituted as described above can execute a software of providing an envelope waveform by using a high speed processor of DSP or the like in real time without preventing a diagnosis time period. A waveform of FIG. 27B is constituted by a waveform produced by generating an envelope waveform by subjecting an input waveform shown in FIG. 27A removing a low frequency component by the high pass filter 235 at the preliminary stage to the envelope processing 232 and removing noise by the low pass filter 236. The waveform processed in this way is subjected to a processing of determining flat of the wheel or the like similar to the tenth embodiment by the threshold counting 237 and the diagnosing portion 238. Specifically, it is known that 3 times of shockwaves are generated in 1 second by the waveform shown in FIG. 27B.

Further, other constitution and operation are similar to those of the tenth embodiment.

Further, the invention is not limited to the above-described embodiments but can pertinently be modified within the range not deviated from the gist of the invention.

The machine equipment of the invention may include a rotating or sliding part constituting an object of diagnosing a abnormality and includes a bearing unit for a railway vehicle, a bearing unit for a windmill, a bearing unit for a spindle of a machine tool and the like.

Further, the rotating or sliding part may be a rotating part of a rolling bearing, a gear, an axle, a wheel, a ball screw or the like, or a sliding part of a linear guide, a linear ball bearing or the like and may be a part of generating a periodic vibration by damage. Further, although as a speed signal for calculating a frequency component owing to damage of a rotating part, the rotational speed signal is used, as a speed signal in a case of a sliding part, a moving speed signal is used.

Further, the outer ring of the rolling bearing fixed to the bearing box is included in the rolling bearing which is a rotating or sliding part relative to a stationary member.

Further, a signal detected by a detecting portion includes sound, vibration, ultrasonic wave (AE), stress, displacement, strain or the like and in these signals, when a defect or a abnormality is present in a machine equipment including a rotating or sliding part, the signal includes a signal component indicating the defect or the abnormality.

Further, the above-described embodiments can be embodied by pertinently combining various embodiments.

EXAMPLES

Test 1

A abnormality of a rolling bearing is diagnosed twice by using the abnormality diagnosing apparatus according to the first embodiment of the invention as follows. As a rolling bearing of Examples 1 and 2, a ball bearing having an outside diameter of 62 mm, an inside diameter of 30 mm, a width of 16 mm and a number of balls of 7 is used, the vibration sensor is fixed to the bearing box, and the temperature sensor is attached to the outer peripheral surface of the outer ring of the bearing. The inner ring is rotated by 3000 $\text{min}^{-1}$ and the bearing is loaded with a radial load.

Table 1 and Table 2 show measured values of vibration and temperature at respective measuring points A, B, C in correspondence with FIG. 3 and FIG. 4 in Example 1 and rates of changes over time (amplification factors relative to measured values at preceding time), Table 3 and Table 4 show measured values of vibration and temperature at respective measuring points A, B, C in Example 2 and rates of changes over time. Further, Table 1 through Table 4 presence or absence of a frequency component owing to damage (flaking) of the bearing from a result of subjecting a vibration waveform to envelope analysis in addition to predetermined values (predetermined values) to the measured values of vibration and temperature (Table 1, Table 3) and the change rates (Table 2, Table 4).

TABLE 1

|  | A point | B point | C point | predetermined value | frequency component of damage |
|---|---|---|---|---|---|
| vibration (G) | 0.24 | 0.67 | 1.5 | 0.48 | not present |
| temperature (° C.) | 143 | 141 | 205 | 172 |  |

TABLE 2

|  | A-B | B-C | predetermined value | frequency component of damage |
|---|---|---|---|---|
| vibration | 2.8 | 2.3 | 2 | not present |
| temperature | 0.99 | 1.4 | 1.2 | |

TABLE 3

|  | A point | B point | C point | predetermined value | frequency component of damage |
|---|---|---|---|---|---|
| vibration (G) | 0.32 | 0.74 | 1.68 | 0.64 | present |
| temperature (° C.) | 115 | 118 | 112 | 150 | |

TABLE 4

|  | A-B | B-C | predetermined value | frequency component of damage |
|---|---|---|---|---|
| vibration | 2.3 | 2.3 | 2 | present |
| temperature | 1.0 | 0.9 | 1.3 | |

In Example 1, as shown by Table 1, measured values of vibration exceed the predetermined value both at B point, C point and at C point, also the measured value of the temperature exceeds the predetermined value. Further, the frequency component of damage of the bearing is not present in vibration and therefore, it is known that seizure abnormality is brought about at the bearing and it is known that the bearing needs to be interchanged urgently. Further, according to the Example 1, a similar determination can be carried out also from the change rate of Table 2.

Further, in Example 2, as shown by FIG. 3, although the measured value of vibration exceeds the rectified value both at B point, C point, a change is not recognized in temperature. Further, the frequency component of damage of bearing is present in vibration and therefore, it is known that flaking abnormality is brought about at the bearing. Further, according to Example 2, a similar determination can carried out also from the change rate of FIG. 4.

Therefore, according to the example, by combining the measured values or the change rates of vibration and temperature, presence or absence of abnormality is diagnosed by a plurality of times to determine and therefore, even when the measured value is increased rapidly by abrupt noise as in the background art, the abnormality is not determined and abnormality diagnosis having reliability higher than that of the background art can be carried out.

Test 2

Here, in order to confirm reliability of a result of diagnosis when the abnormality diagnosing apparatus according to the second embodiment of the invention is used, Test 2 is carried out as follows. In Test 2, a tapered roller bearing (outside diameter=245 mm, inside diameter=130 mm, width=170 mm) having a defect at an outer ring raceway surface is assembled to a housing of a bearing box, vibration generated when the inner ring is rotated by 150 $min^{-1}$ is detected by a piezoelectric insulting type acceleration sensor attached to the housing, and a signal after amplification is subjected to frequency analysis (envelope analysis) to compare.

Figure 28:
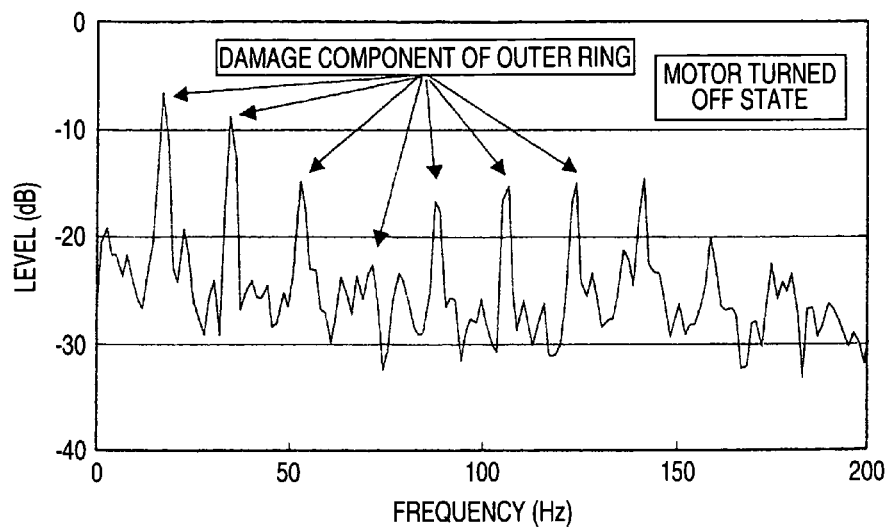
FIG. 28 is a graph showing a vibration waveform by a vibration sensor when power electricity of a motor is not turned off in test 2 according to the second embodiment of the invention.

FIG. 28 shows an example of a result of subjecting vibration of the housing to frequency analysis (envelope analysis) when the bearing is rotated by inertia by bringing the drive motor for transmitting rotation to the bearing into the turning off state (OFF state) when the inner ring of the bearing is at 150 $min^{-1}$. Further, FIG. 29 shows an example of a result of subjecting vibration of the housing to frequency analysis (envelope analysis) when the bearing is driven to rotate by bringing the drive motor for transmitting rotation to the bearing into the turned on state (ON state) when the inner ring of the bearing is at 150 $min^{-1}$.

Figure 29:
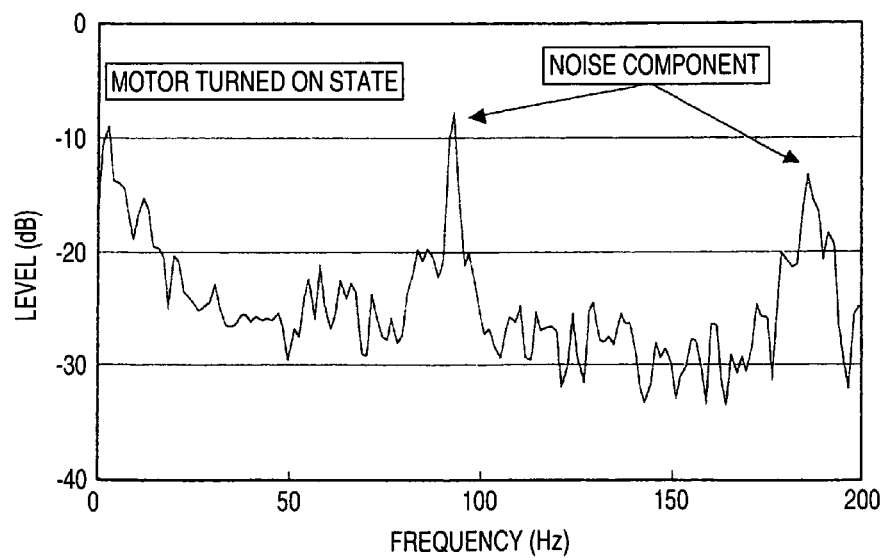
FIG. 29 is a graph showing a vibration waveform by the vibration sensor when power electricity of the motor is turned on in test 2 according to the second embodiment.

It is known from FIG. 28 and FIG. 29 that there are significantly present a plurality of frequency components owing to damage of the outer ring in a vibration waveform when the bearing is rotated by inertia by bringing the drive motor into the turning off state (OFF state), and in the vibration waveform when the bearing is driven to rotate by bringing the drive motor into the turning on state (ON state), the influence of the electromagnetic component by driving the drive motor is considerable and the above-described significant noise component is generated.

Therefore, it is known that the abnormality diagnosis having high SN ratio can be carried out without being influenced by disturbance noise by the vibration by detecting the vibration in the zone of rotating by inertia when the rotation driving unit is not operated by the rotational state determining portion.

Test 3

Next, in order to confirm reliability of a result of diagnosis when the abnormality diagnosing apparatus according to the third embodiment of the invention is used, Test 3 is carried out as follows. In Test 3, a tapered roller bearing (outside diameter=208 mm, inside diameter=130 mm, width=152 mm) having a defect at an outer ring raceway surface is assembled to a housing of a bearing box, the vibration generated when the inner ring is rotated at 50 through 2000 $min^{-1}$ is detected by a piezoelectric insulating type acceleration sensor attached to the load zone of the housing and a signal after amplification is subjected to a frequency analysis (envelope analysis).

Whether the defect can be detected is determined by whether the characteristic frequency component owing to the outer ring defect is present at respective rotational speeds calculated by using the equations of FIG. 5.

Figure 30:
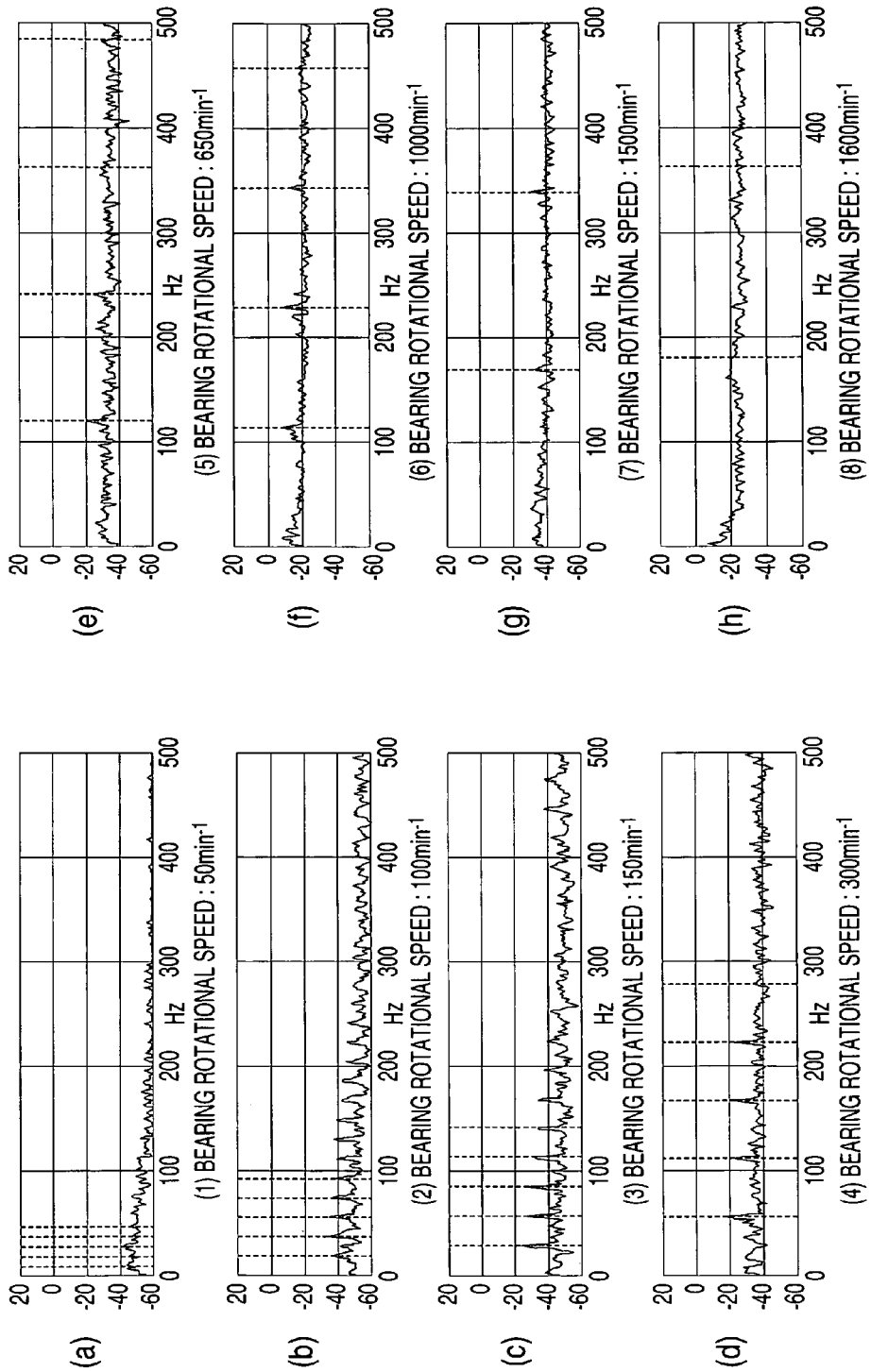
FIG. 30 illustrate graphs of analyzing a frequency of a vibration of a housing when a rotational speed is changed in test 3 according to the third embodiment of the invention.

FIG. 30 shows an example of a result of subjecting the vibration of the housing to frequency analysis (envelope analysis) when the inner ring of the bearing is rotated at 50 $min^{-1}$, 100 $min^{-1}$, 150 $min^{-1}$, 300 $min^{-1}$, 650 $min^{-1}$, 1000 $min^{-1}$, 1500 $min^{-1}$, 1600 $min^{-1}$.

Here, a solid line designates an envelope frequency specter based on vibration data, and a dotted line designates a frequency component owing to the outer ring damage based on various elements of design of the bearing shown in FIG. 5. It is known from the result that although a significant peak is not present when the inner ring is rotated at 50 $min^{-1}$, 1600 $min^{-1}$, a significant peak is present on a frequency component owing to the outer ring damage at 100 $min^{-1}$ through 1500 $min^{-1}$ and the outer ring is damaged.

Table 5 summarizes a result of determining presence or absence of abnormality based on the analysis at respective rotational speeds. ○ indicates a case in which the characteristic frequency component owing to the outer ring defect is present in the analysis, and x designates a case in which the characteristic frequency component is not present.

TABLE 5

| | rotational speed (min⁻¹) | | | | | | | | | | | |
|---|---|---|---|---|---|---|---|---|---|---|---|---|
| | 50 | 100 | 150 | 250 | 350 | 450 | 550 | 650 | 1000 | 1500 | 1600 | 2000 |
| diagnosis result | X | ○ | ○ | ○ | ○ | ○ | ○ | ○ | ○ | ○ | X | X |

It is known from the above-described result of analysis that although a plurality of components owing to the outer ring damage are significantly present in vibration waveforms when the rotational speed is at 100 min⁻¹ through 1500 min⁻¹, the characteristic frequency component is not present in the vibration waveforms other than those in the rotational speed zone. Therefore, by detecting vibration when the tapered roller bearing is rotated in the rotational speed zone, the abnormality can be diagnosed with high SN ratio without being influenced by disturbance noise or the like.

Test 4

A specific example is shown with regard to abnormality diagnosis of a rotating part using the abnormality diagnosing apparatus and a method thereof according to the fourth embodiment of the invention as follows.

Figure 31:
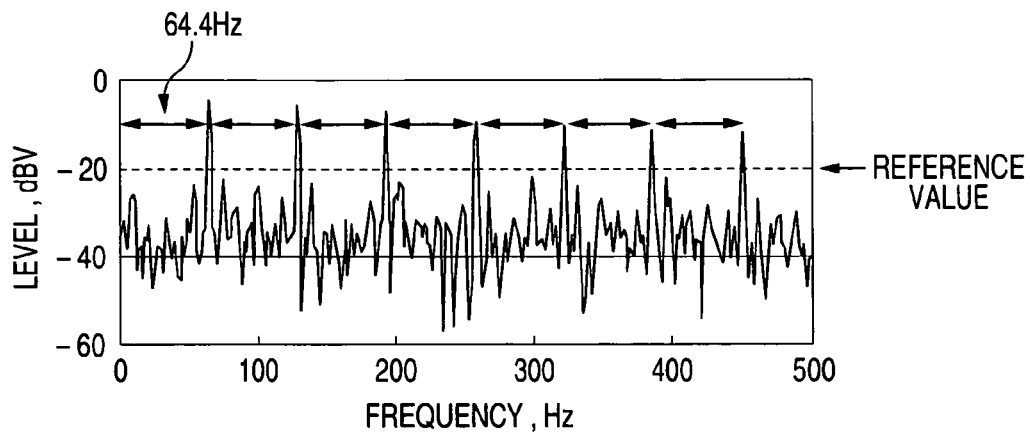
FIG. 31 is a diagram for explaining a abnormality diagnosis of Example 3 in test 4 according to the fourth embodiment of the invention.

FIG. 31 shows a result of subjecting a vibration of a housing to a frequency analysis after an envelope processing when a single row deep groove ball bearing having a defect at an outer ring raceway surface is rotated at 1500 min⁻¹ as Example 3. In the drawing, solid line designates an envelope frequency spectrum based on measured vibration data, and a dotted line designates a reference value.

It can be diagnosed from a result of FIG. 31 that a peak component exceeding the reference value is present in the frequency spectrum, a frequency value between the peaks coincides with a frequency component (64.4 Hz) owing to the outer ring damage and therefore, the outer ring of the bearing is damaged.

Figure 32:
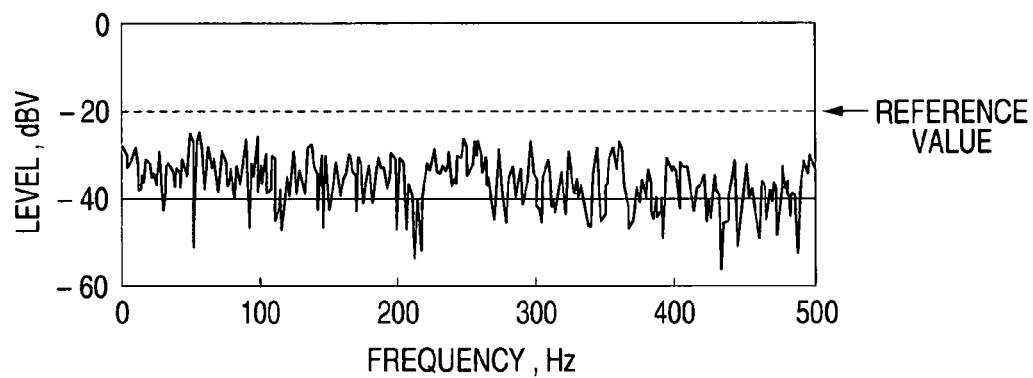
FIG. 32 is a diagram for explaining a abnormality diagnosis of Example 4 in the test 4 according to the fourth embodiment.

FIG. 32 shows a result of subjecting a vibration of a housing to a frequency analysis after an envelope processing when a normal single row deep groove ball bearing is rotated at 1500 min⁻¹ as Example 4. As a result, it is known that a peak component exceeding the reference value is not present in the frequency specter and the bearing is not abnormal.

Figure 33:
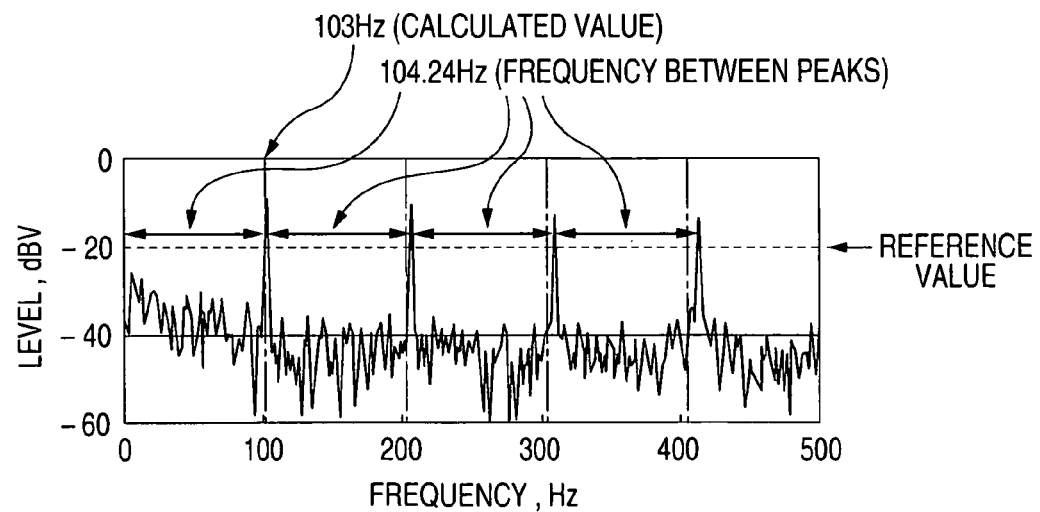
FIG. 33 is a diagram for explaining a abnormality diagnosis of Example 5 in the test 4 according to the fourth embodiment.

FIG. 33 shows a result of subjecting a vibration of a housing to a frequency analysis after an envelope processing when a single row deep groove ball bearing having a defect at an outer ring raceway surface is actually rotated at 2430 min⁻¹ as Example 5. However, rotational speed data used in calculation is at 2400 min⁻¹ which is deviated from the actual rotational speed, and a one-dotted chain line designates a frequency component owing to the outer ring damage based on the rotational speed of 2400 min⁻¹.

As is seen in FIG. 33, it is known that when a difference between the actual rotational speed and the rotational speed used in diagnosis is large, a high frequency component of a generated frequency is considerably deviated to effect an influence on accuracy of diagnosis. However, it is known that when the diagnosing apparatus and the method of the invention are applied, presence or absence of abnormality is determined and the abnormal portion is specified by using a frequency value between peaks and therefore, the influence of the deviation from actual rotational speed is reduced and a diagnosis having excellent accuracy is carried out.

Test 5

A specific example will be shown with regard to a abnormality diagnosis of a rotating part using the abnormality diagnosing apparatus and a method thereof according to the fifth embodiment of the invention.

Figure 34:
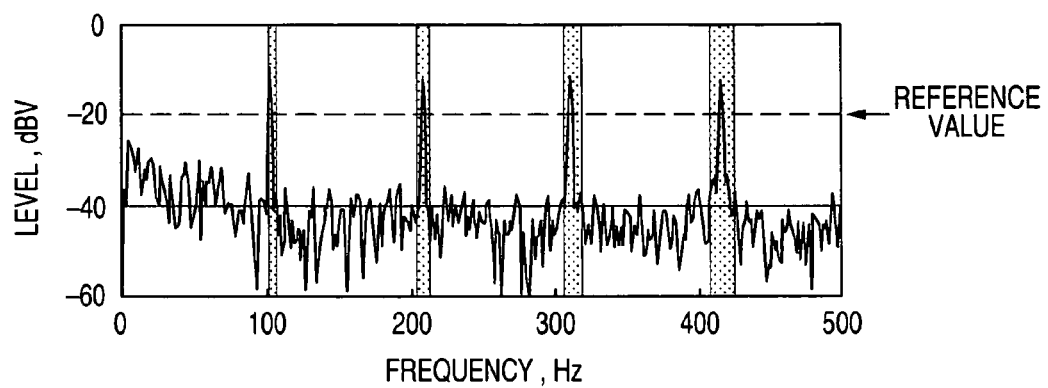
FIG. 34 is a diagram for explaining a abnormality diagnosis of in test 5 according to the fifth embodiment of the invention.

FIG. 34 shows a result of subjecting a vibration of a housing to a frequency analysis after an envelope processing when a single row deep groove ball bearing having a defect at an outer ring raceway surface is actually rotated at 2430 min⁻¹. However, rotational speed data used in calculation is at 2400 min⁻¹ which is deviated from an actual rotational speed. In the drawing, a solid line shows an envelope frequency spectrum based on measured vibration data, and a dotted line designates a reference value. Further, respective netted ranges indicate frequency components owing to the outer ring damage based on the rotational speed of 2400 min⁻¹ and high frequency wave thereof and allowable widths of comparing and checking are increased in correspondence with frequency bands. As a result, a peak exceeding the reference value coincides with the frequency component owing to the outer ring damage having a variable allowable width and therefore, it can be diagnosed that the outer ring of the bearing is damaged.

Figure 35:
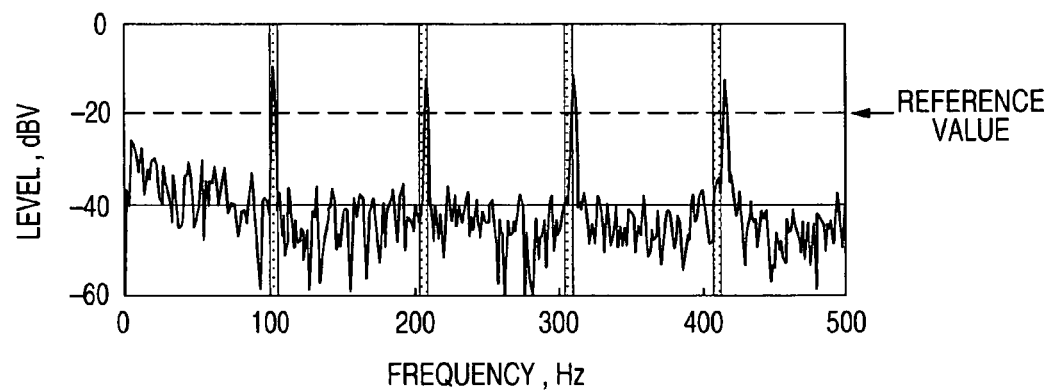
FIG. 35 is a diagram for explaining a abnormality diagnosis of a background art in test 5 according to the fifth embodiment.

On other hand, FIG. 35 shows a case of fixing an allowable width of comparing and checking (1 Hz) under the condition the same as that in the case of FIG. 34. As a result, a peak exceeding the reference value does not coincide with a frequency component owing to the outer ring damage and therefore, there is a concern that the abnormality is determined not to be present. That is, it is known that when the difference between the actual rotational speed and the rotational speed used in the diagnosis is large, the high frequency component of the generated frequency is considerably deviated to effect an influence on accuracy of diagnosis.

It is known from the result, that presence or absence of abnormality of a rotating part can be determined and an abnormal portion can be specified with excellent accuracy by carrying out the abnormality diagnosis based on the fifth embodiment.

Test 6

Next, a specific example will be shown with regard to abnormality diagnosis of a rotating part using the abnormality diagnosing apparatus and a method thereof according to the sixth embodiment of the invention.

As rotating parts, there are prepared tapered roller bearings of three kinds (A, B, C) having different various elements of specification design of an inner portion although inside and outside diameter dimensions are the same (bearing outside diameter: 220 mm, bearing inside diameter: 120 mm, bearing width: 150 mm), and defects are attached to respective outer raceway surfaces of the bearings and the individual bearings are assembled to a housing. Further, a vibration generated when the inner ring is rotated at 200 min⁻¹ is detected by a piezoelectric insulating type acceleration sensor attached to the housing, and a signal after amplification is subjected to a frequency analysis (envelope analysis) to compare based on the processing flow according to the sixth embodiment.

Figure 36:
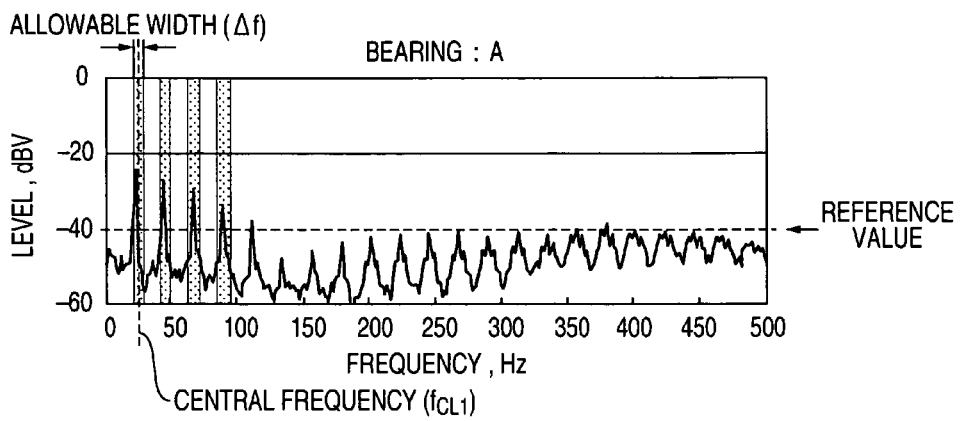
FIGS. 36 (a) (b) and (c); illustrates diagrams for explaining a abnormality diagnosis in test 6 according to the sixth embodiment of the invention.
Figure 36:
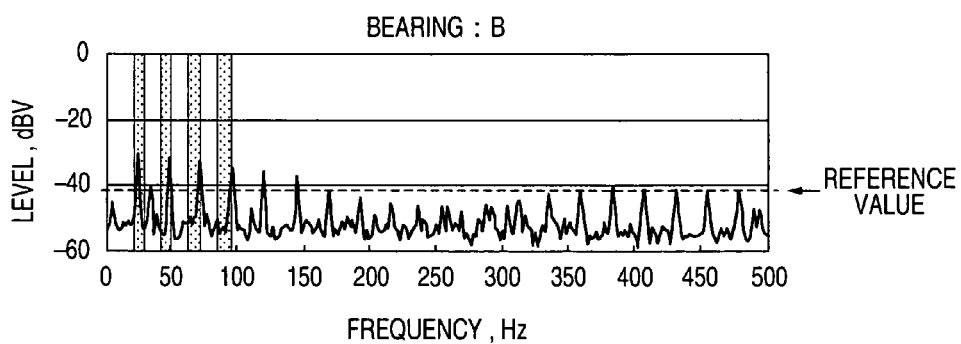
Figure 36:
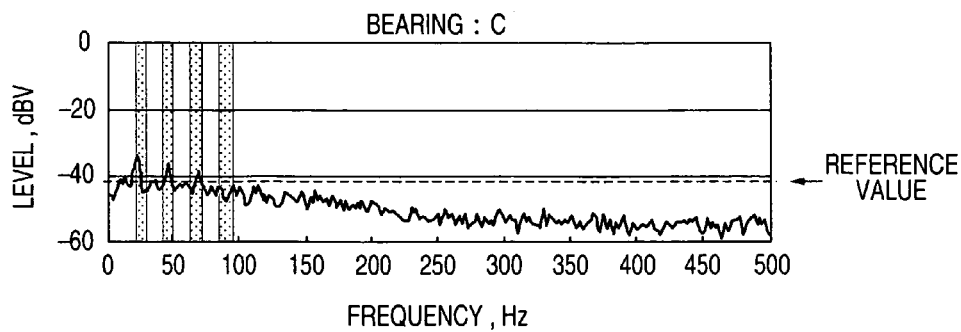

FIG. 36 shows a result of subjecting vibrations of the housing to the frequency analysis after an envelope processing when three kinds of the bearings are rotated. Here, a solid line designates an envelope frequency specter based on measured vibration data, and a dotted line designates a reference value.

Further, respective netted ranges show allowable widths for central frequencies of lower limit frequencies and upper limit frequencies of frequency components owing to the outer ring damage based on the rotational speed of 200 $min^{-1}$ and various elements of inner portions of 3 kinds (A, B, C) of the bearings, and the allowable widths of comparing and checking are increased in correspondence with frequency bands.

According to the test, the frequency components owing to the outer ring damage based on the various elements of the bearings are calculated from FIG. 5, central frequencies $f_{CL1}$ between the lower limit frequencies and the upper limit frequencies are calculated, further, an allowable width $\Delta f$ is provided for the central frequencies $f_{CL1}$. Further, the allowable width $\Delta f$ is set to 2 Hz in correspondence with the frequency band.

It can be diagnosed from the result that a plurality of peaks exceeding the reference values are present in any of the bearings although frequencies thereof differ, further, the peaks are included in frequencies owing to the outer ring damages indicated by the netted ranges and therefore, it can be diagnosed that the outer rings are damaged in any of the bearings having different various elements of the specification design.

Figure 37:
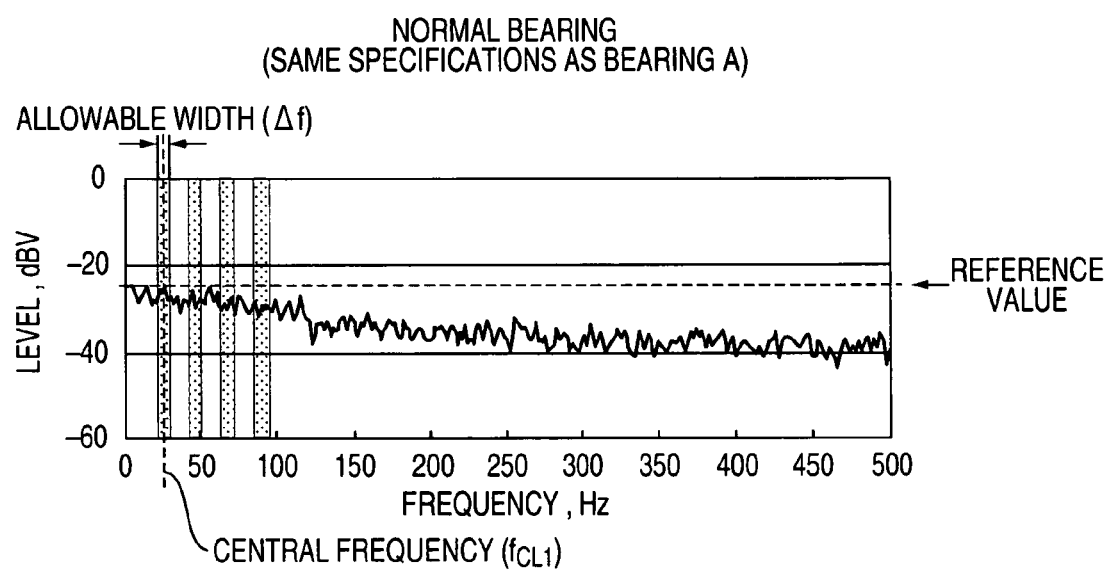
FIG. 37 is other diagram for explaining the abnormality diagnosis in test 6 according to the sixth embodiment.

On the other hand, FIG. 37 shows a case of applying the abnormality diagnosis of the sixth embodiment to a normal bearing without damage. Further, the specification design of the bearing is similar to those of the bearing A.

It can be diagnosed from the result shown in FIG. 37 that in the normal bearing, the outer ring is not damaged since a significant peak exceeding the reference value is not included in the frequency owing to the outer ring damage indicated by the netted range.

Test 7

Next, a test is carried out by using the processing flow of the sixth embodiment when the rotational speed is varied slightly although various elements of specification design of an inner portion of the bearings are the same.

Figure 38:
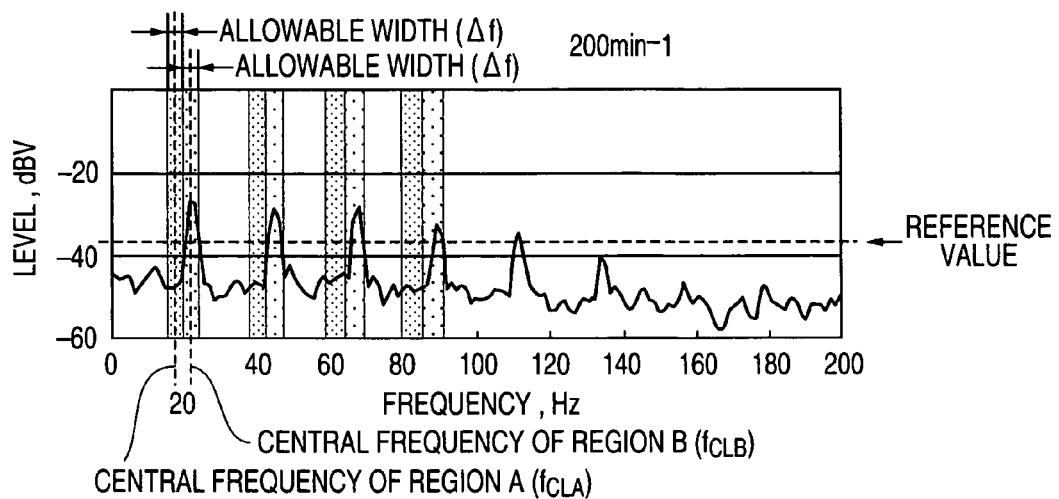
FIGS. 38 (a) and (b) illustrates diagrams for explaining a abnormality diagnosis in test 7 according to the sixth embodiment.
Figure 38:
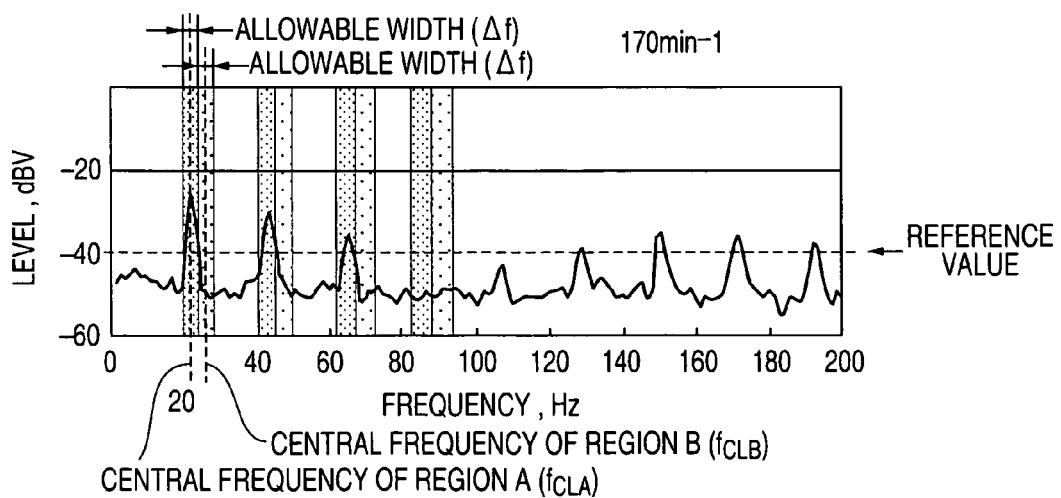

FIG. 38 shows a result of making a defect to the outer ring raceway surface of the tapered roller bearing, detecting a vibration generated when an inner ring is rotated at 200 $min^{-1}$ and 170 $min^{-1}$ is detected by a piezoelectric insulting type acceleration sensor attached to a housing and subjecting a signal after amplification to a frequency analysis (envelope analysis) to compare. Further, in FIG. 38, respective netted ranges show allowable widths with regard to central frequencies of frequency components owing to outer ring damage based on various elements of specification design of an inner portion of the bearing and a high frequency wave width thereof and the allowable width of comparing and checking is increased in correspondence with frequency bands. Further, the netted range depends on a width of varying the rotational speed and is set such that when a rotation carrying width is large, the netted range is widened.

Although the abnormality diagnosis may be carried out by presence or absence of a component included in the netted range under the state, when the netted range is widened, a number of frequency components other than the bearing frequency component of damage are included and therefore, there is a possibility of deteriorating accuracy of diagnosis. Therefore, according to the test, the corresponding netted range is divided into two zones (A, B), central frequencies ($f_{CLA}$, $f_{CLB}$) in correspondence with the zone widths are calculated, further, an allowable width $\Delta f$ with regard to a central frequency thereof is provided.

Specifically, according to the test, based on a width of varying the rotational speed of 170 through 200 $min^{-1}$, the lower limit and the upper limit frequencies and the central frequency are calculated, the allowable width $\Delta f$ is set to 2 Hz and the allowable width is set to be large in correspondence with the frequency band.

As a result, in a case of the rotational speed of 200 $min^{-1}$, a peak owing to the damage is not present in the zone A, however, a peak is present in the zone B and therefore, the peak can be determined as the outer ring damage. On the other hand, in a case of a rotational speed of 170 $min^{-1}$, a peak owing to the damage is present in the zone A and therefore, it can be determined that the outer ring is damaged although a peak is not present in the zone B.

Test 8

Next, a specific example will be shown with regard to abnormality diagnosis of a rotating part using the abnormality diagnosing apparatus and a method thereof according to the seventh embodiment of the invention.

Figure 39:
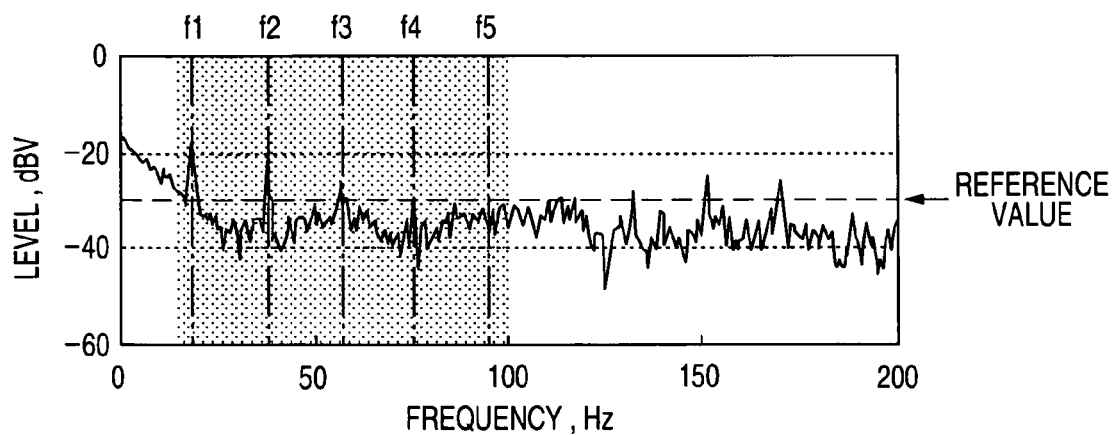
FIG. 39 is a diagram for explaining a abnormality diagnosis in test 8 according to the seventh embodiment of the invention.

FIG. 39 shows a result of subjecting a vibration of a housing to a frequency analysis after an envelop processing when noise is included in rotating a tapered roller bearing having a defect at an outer ring raceway surface at 200 $min^{-1}$. In the drawing, a solid line designates an envelope frequency spectrum based on measured vibration result, a dotted line designates a reference value (here, root-mean-square value +6 dB), and one-dotted chain lines designates frequency components ($f_1$ through $f_5$) owing to outer ring damage based on a rotational speed of 200 $min^{-1}$. Further, netted ranges show frequency ranges used for calculating reference values, here, $f_1$−3 Hz through $f_5$+3 Hz. It can be determined from the result that the outer ring of the bearing is damaged since a peak exceeding the reference value coincide with the frequency component owing to the outer ring damage.

Figure 40:
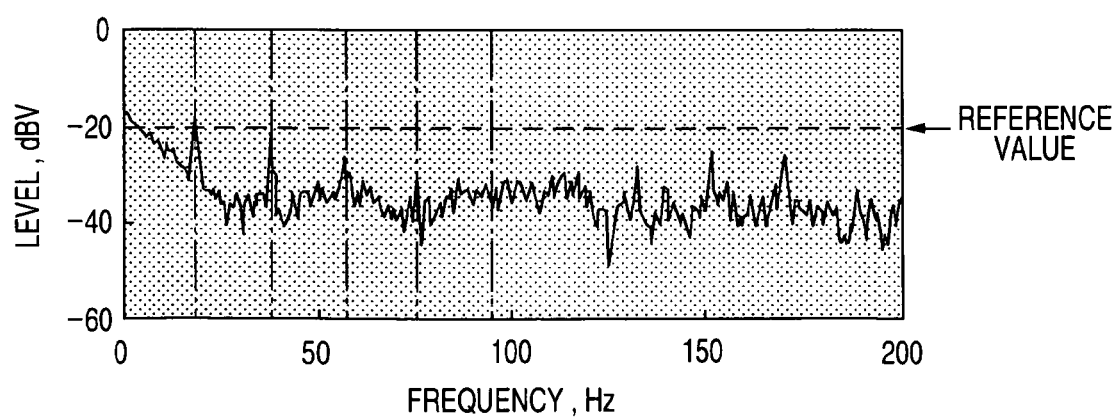
FIG. 40 is a diagram for explaining a abnormality diagnosis of a background art in test 8 according to the seventh embodiment.

On the other hand, FIG. 40 shows a case in which the frequency range used for calculating the reference value is constituted by a total zone of a result of a frequency analysis provided under the condition the same as that in the case of FIG. 39. In FIG. 40, the frequency component owing to outer ring damage does not exceed the reference value and therefore, there is a concern of determining that the abnormality is not present. Therefore, it can be confirmed from the result of FIG. 39 and FIG. 40 that by calculating the reference value used for comparing and checking from a limited range of measured spectrum data, an influence of noise is difficult to be effected and diagnosis having excellent accuracy can be carried out.

Although an explanation has been given of the invention in details and in reference to the specific embodiments, it is apparent for the skilled person that the invention can variously be changed or modified without deviating from the spirit and the range of the invention.

The application is based on Japanese Patent Application (Japanese Patent Application No. 2004-265009) filed on Sep. 13, 2004, Japanese Patent Application (Japanese Patent Application No. 2004-265219) filed on Sep. 13, 2004, Japanese Patent Application (Japanese Patent Application No. 2005-004128) filed on Jan. 11, 2005,
Japanese Patent Application (Japanese Patent Application No. 2005-018338) filed on Jan. 26, 2005,
Japanese Patent Application (Japanese Patent Application No. 2005-018339) filed on Jan. 26, 2005,
Japanese Patent Application (Japanese Patent Application No. 2005-018340) filed on Jan. 26, 2005,
Japanese Patent Application (Japanese Patent Application No. 2005-168204) filed on Jun. 8, 2005,
Japanese Patent Application (Japanese Patent Application No. 2005-176505) filed on Jun. 16, 2005,
Japanese Patent Application (Japanese Patent Application No. 2005-176507) filed on Jun. 16, 2005,
a content thereof is in cooperated here by reference.

INDUSTRIAL APPLICABILITY

A abnormality of a rotating or a sliding part used in a machine equipment such as an axle or a gear box of a railway vehicle or a reduction gear of a power generating windmill can be diagnosed while ensuring accuracy of diagnosis in an actual operating state without disassembling the machine equipment.

The invention claimed is:

1. An abnormality diagnosing apparatus used in a machine equipment including at least one rotating or sliding part, the abnormality diagnosing apparatus comprising:
at least one detecting portion for outputting a signal generated from the machine equipment as an electric signal; and
a signal processing portion for determining presence or absence of an abnormality and an abnormal portion of the part based on a frequency of a shockwave in which a waveform of the electric signal per unit time exceeds a threshold, and a rotational speed signal or a moving speed signal,
wherein the signal processing portion subjects the waveform of the electric signal to a filter processing and converts the waveform to an all time rectified waveform,
wherein whenever the waveform exceeding the threshold, the signal processing portion makes a waveform which is converted so as to hold the waveform at a value exceeding the threshold for a predetermined period of time according to the rotational speed signal, and
wherein the processing portion informs a possibility of bringing about the abnormality in the part according to a number of times in which the waveform exceeds the threshold per a predetermined rotational number.

2. The abnormality diagnosing apparatus according to claim 1, wherein the signal processing portion determines true or false of the possibility of bringing about the abnormality in the part according to the number of times in which the waveform converted to hold the threshold exceeds the threshold per the predetermined rotational number by a plurality of times of statistical determinations.

3. An abnormality diagnosing apparatus used in a machine equipment including a rotating part, the abnormality diagnosing apparatus comprising:
at least one detecting portion for outputting a signal generated from the machine equipment as an electric signal; and
a signal processing portion for:
analyzing a frequency of a waveform of the electric signal,
comparing and checking a frequency component of a measured spectrum data provided by analyzing the frequency and a frequency component owing to the rotating part with an allowable width; and
determining presence or absence of an abnormality and an abnormal portion of the rotating part based on a result of the checking;
wherein a zone having un upper limit and lower limit, both of which are calculated from the rotational speed of the rotating part and dimensional specification of the rotating part, is divided into at least one zone, a central value in the divided zone is calculated, and the allowable width is set as at least a zone having an arbitrary size which is given with respect to the central value, and
wherein the signal processing portion compares and checks the frequency component of the measured spectrum data and the frequency component owing to the rotating part at least at each of the allowable width.

4. The abnormality diagnosing apparatus according to claim 3, wherein the allowable width is given to at least one of a case where the rotating part includes a plurality of rotating parts having different dimensional specification design from each other; and a case where the rotational speed of the rotating part is varied.

5. An abnormality diagnosing method used in a machine equipment including a rotating part, the abnormality diagnosing method comprising the steps of:
detecting a signal generated from the machine equipment and outputting the signal as an electric signal;
analyzing a frequency of a waveform of the detected signal;
setting at least one allowable width such that: a zone having an upper limit and lower limit, both of which are calculated from the rotational speed of the rotating part and dimensional specification design of the rotating part, is divided into at least one zone, a central value in the divided zone is calculated, and the allowable width is set as at least a zone having an arbitrary size which is given with respect to the central value
comparing and checking a frequency component of a measured spectrum data provided by analyzing the frequency and a frequency component owing to the rotating part at each of at least one of the allowable width; and
determining presence or absence of an abnormality and an abnormal portion of the rotating part based on a result of the checking at the comparing step.

* * * * *